US007098976B2

(12) United States Patent
Minoura et al.

(10) Patent No.: US 7,098,976 B2
(45) Date of Patent: *Aug. 29, 2006

(54) MICRO CORNER CUBE ARRAY, METHOD OF MAKING THE MICRO CORNER CUBE ARRAY AND REFLECTIVE TYPE DISPLAY DEVICE

(75) Inventors: Kiyoshi Minoura, Tenri (JP); Shun Ueki, Nara (JP); Yasuhisa Itoh, Tenri (JP); Ichiroh Ihara, Nishinomiya (JP); Yutaka Sawayama, Tenri (JP); Kohji Taniguchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 227 days.

This patent is subject to a terminal disclaimer.

(21) Appl. No.: 10/171,651

(22) Filed: Jun. 17, 2002

(65) Prior Publication Data

US 2003/0053015 A1   Mar. 20, 2003

(30) Foreign Application Priority Data

Jun. 15, 2001 (JP) .............................. 2001-181267
Oct. 2, 2001 (JP) .............................. 2001-306052
Mar. 26, 2002 (JP) .............................. 2002-087135

(51) Int. Cl.
*G02F 1/1335* (2006.01)
*G02B 5/122* (2006.01)
*G02B 5/124* (2006.01)

(52) U.S. Cl. ...................... 349/113; 359/529; 359/530
(58) Field of Classification Search ................ 349/113, 349/187; 359/529, 530, 833, 851; 430/5, 430/321, 323; 438/689

See application file for complete search history.

(56) References Cited

U.S. PATENT DOCUMENTS

| 3,905,682 | A |   | 9/1975 | Meyerbhofer |
|-----------|---|---|--------|--------------|
| 4,066,331 | A |   | 1/1978 | Lindner |
| 4,526,439 | A |   | 7/1985 | Okoshi et al. |
| 4,703,999 | A |   | 11/1987 | Benson |
| 4,992,699 | A | * | 2/1991 | McClure et al. ............ 313/525 |
| 5,132,823 | A |   | 7/1992 | Kamath et al. |

(Continued)

FOREIGN PATENT DOCUMENTS

JP          54-105998 A       8/1979

(Continued)

OTHER PUBLICATIONS

Neudeck, G. et al; "Precision Crystal Corner Cube Arrays for Optical Gratings Formed by (100) Silicon Planes with Selective Epitaxial Growth"; Applied Optics, vol. 35, No. 19, Jul. 1, 1996, pp. 3466-3470.

(Continued)

*Primary Examiner*—Toan Ton
*Assistant Examiner*—Tai Duong
(74) *Attorney, Agent, or Firm*—Nixon & Vanderhye P.C.

(57) ABSTRACT

A method of making a micro corner cube array includes the steps of: preparing a substrate, at least a surface portion of which consists of cubic single crystals and which has a surface that is substantially parallel to {111} planes of the crystals; and etching the surface of the substrate anisotropically, thereby forming a plurality of unit elements for the micro corner cube array on the surface of the substrate. Each of these unit elements is made up of a number of crystal planes that have been formed at a lower etch rate than the {111} planes of the crystals.

32 Claims, 34 Drawing Sheets

U.S. PATENT DOCUMENTS

| | | | |
|---|---|---|---|
| 5,182,663 | A | 1/1993 | Jones |
| 5,346,581 | A | 9/1994 | Tsang |
| 6,819,507 | B1 * | 11/2004 | Minoura et al. ............ 359/727 |
| 2001/0040717 | A1 | 11/2001 | Minoura et al. |
| 2002/0154408 | A1 * | 10/2002 | Minoura et al. ............ 359/529 |
| 2003/0053015 | A1 | 3/2003 | Minoura et al. |
| 2003/0124849 | A1 | 7/2003 | Ihara et al. |

FOREIGN PATENT DOCUMENTS

| | | |
|---|---|---|
| JP | 02-181923 | 7/1990 |
| JP | 3-186816 | 8/1991 |
| JP | 7-205322 | 8/1995 |
| JP | 8-321483 A | 12/1996 |
| JP | 9-076245 | 3/1997 |
| JP | 10-206611 | 8/1998 |
| JP | 11-007008 | 1/1999 |
| JP | 2000-019490 | 1/2000 |
| JP | 2000-221497 | 8/2000 |
| JP | 2001-013310 | 1/2001 |
| WO | 98/56966 A1 | 12/1998 |
| WO | 98/57212 | 12/1998 |

OTHER PUBLICATIONS

Korean Office Action dated May 20, 2004 (w/English translation).

U.S. Appl. No. 10/171,651, filed Jun. 17, 2002.

U.S. Appl. No. 09/821,686, filed Mar. 30, 2001.

Kaneko, Control of Atomic Arrangement by Inverse Epitaxy (Semiconductor Atomic Layer Process by On-the-Spot Etching Technique), "Reports of Research and Development Results in 1998 Academic Research Backup Project", Published by Hyogo Science and Technology Association, Nov. 1999 and partial English translation thereof.

Japanese Office Action issued Dec. 27, 2005 (w/English translation thereof).

Japanese Office Action issued Dec. 27, 2005 (w/English translation thereof).

* cited by examiner

C3

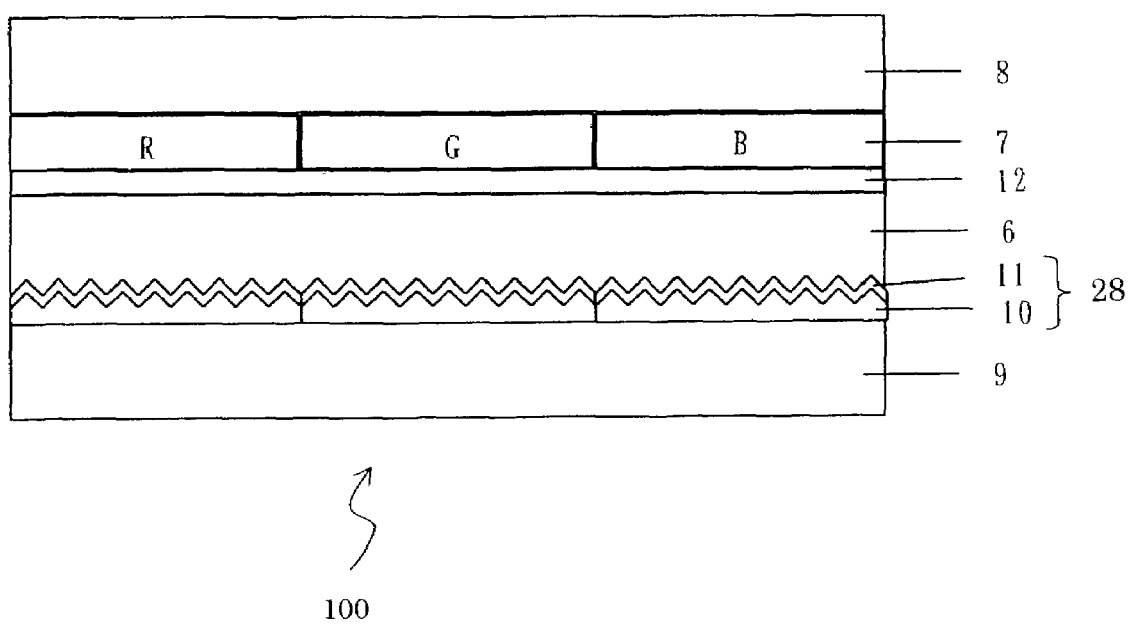

○ HIGHEST-LEVEL
● LOWEST-LEVEL

RETRO-REFLECTING PORTION

800

(01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT (01-1)PLANE: ORIENTATION FLAT 102
101

ETCHED FROM (111)B PLANE

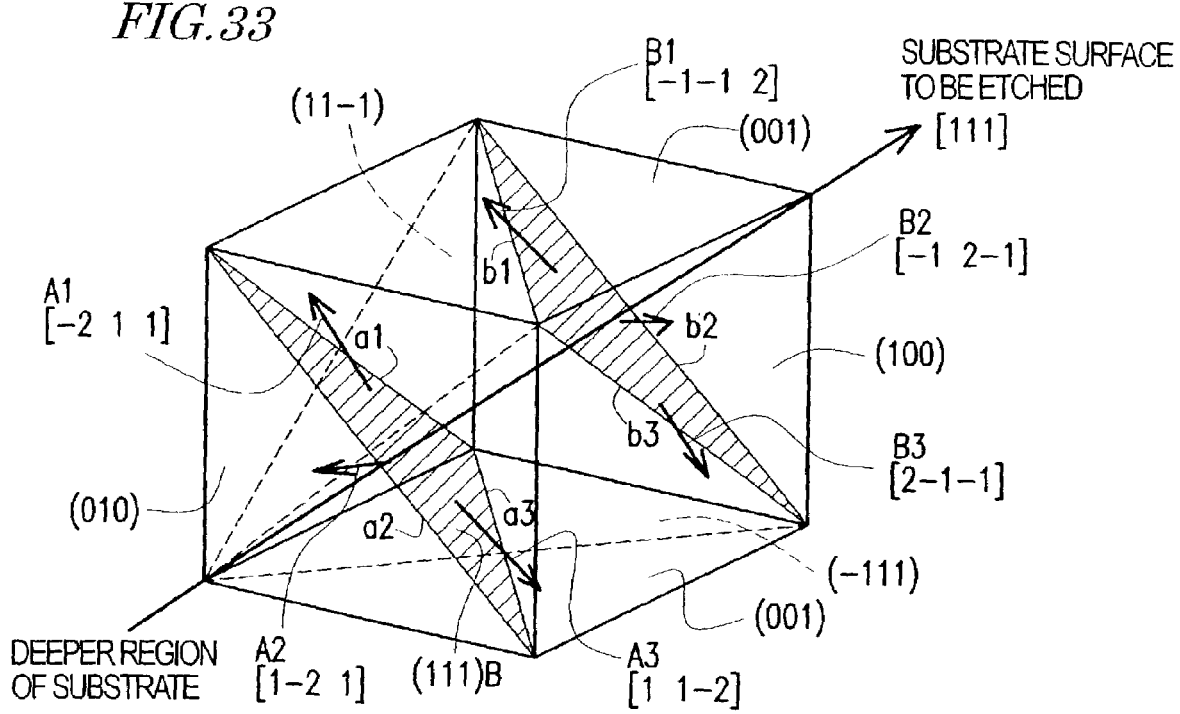
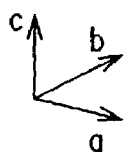
FIG.33

FIG.36
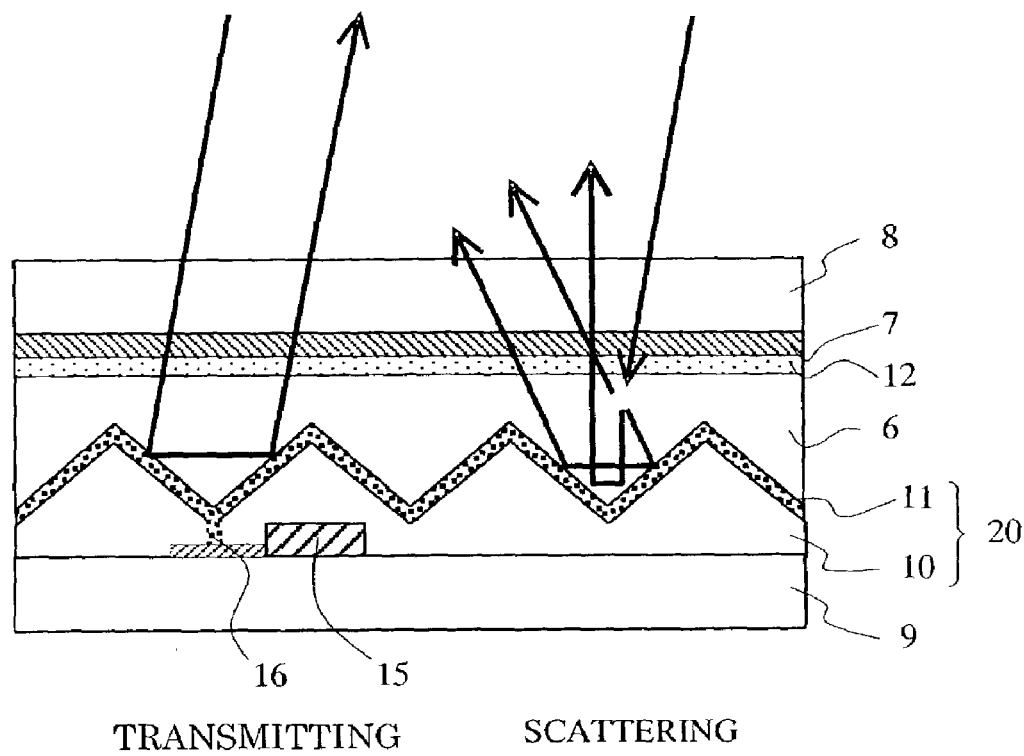
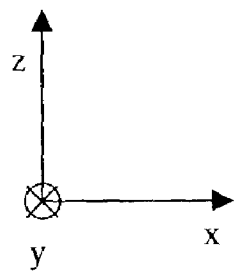

TRANSMITTING     SCATTERING

MICRO CORNER CUBE ARRAY, METHOD OF MAKING THE MICRO CORNER CUBE ARRAY AND REFLECTIVE TYPE DISPLAY DEVICE

BACKGROUND OF THE INVENTION

1. Field of the Invention

The present invention relates to a micro corner cube array, a method of making the micro corner cube array, and a reflective type display device including the micro corner cube array.

2. Description of the Related Art

In recent years, various types of optical elements having extremely small sizes (i.e., so-called "micro optical elements"), including microlenses, micro mirrors and micro prisms, have been developed and more and more extensively applied to the fields of optical communications and display devices. It is expected that the optical technology and display technology will be further developed and advanced by realizing those micro optical elements.

Examples of such optical elements include a corner cube reflector formed by arranging a plurality of corner cubes in a regular pattern. Each of those corner cubes has a shape corresponding to one corner of a cube and three perpendicularly opposed reflective planes. The corner cube reflector is a type of retroreflector for reflecting an incoming light ray back to its source by getting the light ray reflected by each one of those reflective planes after another. The corner cube reflector can always reflect the incoming light ray back to its source irrespective of its angle of incidence. Hereinafter, conventional methods of making a corner cube will be described.

Plate Method

In a plate method, a number of flat plates, each having two mutually parallel planes, are stacked one upon the other. At the side end face of these flat plates stacked, V-grooves are cut vertically to the parallel planes at an equal pitch, thereby forming a series of roof-shaped protrusions each having an apical angle of approximately 90 degrees. Next, each of these flat plates is horizontally shifted with respect to adjacent one of them so that the tops of the series of roof-shaped protrusions formed on the former plate are aligned with the bottoms of the V-grooves formed on the latter plate. In this manner, a die for use to make a corner cube array is obtained. In the plate method, a corner cube array is made by using this die. According to this method, however, it is necessary to accurately shift and secure the flat plate having the roof-shaped protrusions with respect to the adjacent flat plate so that these two plates satisfy a required positional relationship. Thus, it is difficult to make a corner cube of as small a size as about 100 μm or less by this method.

Pin Bundling Method

In a pin bundling method, the end of a hexagonal columnar metal pin is provided with a prism having three square facets that are opposed substantially perpendicularly to each other, and a number of such pins are bundled together to make a collection of prisms. In this manner, a corner cube is made up of three facets of three prisms that are formed at the respective ends of three adjacent pins. According to this method, however, a corner cube should be made by collecting multiple prisms that have been separately formed for mutually different pins. Thus, it is actually difficult to make a corner cube of a small size. The minimum possible size of a corner cube that can be formed by this method is about 1 mm.

Triangular Prism Method

In a triangular prism method, V-grooves are cut on the surface of a flat plate of a metal, for example, in three directions, thereby forming a plurality of triangular pyramidal protrusions and obtaining a collection of prisms. However, the prisms formed by this method can have no other shape but the triangular pyramidal shape.

Furthermore, Japanese Laid-Open Publication No. 7-205322 discloses a method of making a micro corner cube array by a photochemical technique. In this method, a mask having a plurality of equilateral triangular transparent (or opaque) regions is used. Each of these transparent (or opaque) regions of this mask has variable transmittance (or opacity) that gradually decreases from its center toward its periphery. By performing exposing and developing process steps using such a mask, a number of triangular pyramidal photoresist pattern elements are formed on a substrate. Then, the substrate, partially covered with those photoresist pattern elements, is etched anisotropically (e.g., dry etched) so as to have a plurality of protrusions in the same shape as the photoresist pattern elements. In this manner, multiple triangular pyramidal protrusions, each having three isosceles triangular facets that are opposed substantially perpendicularly to each other, are formed on the substrate.

Furthermore, Japanese Laid-Open Publication No. 9-76245 discloses a method of making a microlens array, which is characterized by selectively irradiating a predetermined region with a light beam.

In the fields of optical communications and display devices, those micro optical elements are often combined with a liquid crystal display device, which needs to be relatively thin and lightweight as a color display panel. As a color liquid crystal display device, a transmissive type liquid crystal display device, including a backlight behind its liquid crystal panel, is used more and more extensively in various fields of applications. In the field of mobile communications units such as cell phones on the other hand, a reflective type liquid crystal display device for conducting a display operation by utilizing the ambient light is used very often. Unlike the transmissive type liquid crystal display device, the reflective type liquid crystal display device needs no backlight, thus cutting down the overall power dissipation and allowing the user to carry a downsized battery. For that reason, the reflective type liquid crystal display device is not only effectively applicable to various types of mobile electronic units that should be as lightweight and as thin as possible but also allows the use of a battery of an increased size when a unit including the reflective type display device is designed to have the same size and weight as a conventional one. This is because the space that has been left for a backlight can be used for other purposes in the reflective type display device. Thus, the reflective type liquid crystal display device is expected to increase the longest operating time of those units by leaps and bounds.

Also, an image displayed by a reflective type liquid crystal display device has a better contrast than an image displayed by a display device of any other type even when the display device is used outdoors in the sun. For example, when a CRT, i.e., a self-light-emitting display device, is used outdoors in the sun, the contrast ratio of an image displayed thereon decreases considerably. Likewise, even a transmissive type liquid crystal display device, subjected to low reflection treatment, also displays an image with a significantly decreased contrast ratio when the device is operated in an environment in which the ambient light is much intenser than the display light (e.g., in direct sunshine). On the other hand, a reflective type liquid crystal display device increases the brightness of the image displayed thereon proportionally to the quantity of the ambient light, thus avoiding the unwanted decrease in contrast ratio. For that reason, a reflective type liquid crystal display device is particularly suitable to mobile electronic units that are often used outdoors, e.g., cell phones, notebook computers, digital cameras and camcorders.

Even though the reflective type liquid crystal display devices have these advantageous features that are very useful in various applications, the reflective devices currently available are not entirely satisfactory yet in terms of its contrast ratio in dark place, definition, and full-color and moving picture display capabilities, for example. Thus, the development of a more practically useful reflective type liquid crystal display device is awaited.

A reflective type liquid crystal display device used extensively today often includes one or two polarizers and typically operates in one of the following three modes:

Twisted nematic (TN) mode in which a display operation is conducted by controlling the optical rotatory power of the liquid crystal layer by an electric field;

Electrically controlled birefringence (ECB) mode in which a display operation is conducted by controlling the birefringence of the liquid crystal layer by an electric field; and A mixed mode as a combination of the TN and ECB modes.

On the other hand, a guest host liquid crystal display device, in which a dye is added to the liquid crystal material thereof, has been used as a device using no polarizers. However, a liquid crystal display device of this type is not so reliable because a dichroic dye has been added to its liquid crystal material, and cannot obtain a sufficiently high contrast ratio because the dichroism ratio of the dye is low. Particularly when the contrast ratio is insufficient, a color display device using color filters shows considerably decreased color purity. In that case, the display device needs to be combined with color filters showing high color purity. However, the use of color filters with high color purity results in decrease in lightness, thus losing the advantages that are expected by the use of no polarizers.

In view of these considerations, a liquid crystal display device using a polymer-dispersed liquid crystal material or a cholesteric liquid crystal material has been developed as a device that hopefully realizes high-lightness, high-contrast display without using any polarizer or dye. A liquid crystal display device of this type utilizes the unique properties of the polymer-dispersed or cholesteric liquid crystal layer. Specifically, by controlling the voltage applied to the liquid crystal layer, the liquid crystal layer exhibits a transition between an optically transmitting state and a scattering state or between the transmitting state and a reflective state. A liquid crystal layer exhibiting any of these transitions will be herein referred to as a "scattering type liquid crystal layer" collectively. A liquid crystal display device of this type uses no polarizers and can exhibit increased optical efficiency. In addition, even when a liquid crystal display device of this type is evaluated in terms of color purity, a device of this type has lighter wavelength dependence than a device operating in the TN or ECB mode. Also, when polarizers are used, the polarizers will have a non-ideal absorption profile (i.e., the incident light becomes yellowish because a portion of the light falling within the blue wavelength range is absorbed into the polarizers). But a device of this type has nothing to do with such a problem of the polarizers. Thus, the device is expected to realize a good display of color white.

A display device using a polymer-dispersed liquid crystal material is disclosed in Japanese Laid-Open Publication No. 3-186816, for example. In the liquid crystal display device disclosed in that publication, a polymer-dispersed liquid crystal layer is provided over a black substrate. When no voltage is applied to the polymer-dispersed liquid crystal layer, the liquid crystal layer exhibits a scattering and non-transparent state, thereby displaying color white. On the other hand, when a voltage is applied to the polymer-dispersed liquid crystal layer, the liquid crystal layer exhibits a transmitting state and makes the underlying black substrate visible to the observer, thereby displaying color black.

In the liquid crystal display device disclosed in Japanese Laid-Open Publication No. 3-186816, however, when color white is displayed, only a portion of the incident light that has been backscattered by the polymer-dispersed liquid crystal layer contributes to the display of color white but another portion of the light that has been forward scattered is all absorbed into the black substrate. Accordingly, the optical efficiency thereof actually decreases significantly.

A liquid crystal display device, including a light modulating layer made of a light scattering liquid crystal material and a retroreflector, is disclosed in U.S. Pat. Nos. 3,905,682 and 5,182,663, for example. In the liquid crystal display device disclosed in these patents, when color black should be displayed, the liquid crystal layer thereof is controlled in such a manner as to exhibit the transmitting state. Accordingly, in such state, the light that has been transmitted through the liquid crystal layer is reflected back to its source (i.e., retro-reflected) by the retroreflector.

The corner cube reflector described above may be used as such a retroreflector. Hereinafter, a conventional liquid crystal display device including a corner cube reflector will be described with reference to FIG. 40.

In the liquid crystal display device 900 shown in FIG. 40, a scattering type liquid crystal layer 6 is sandwiched between two transparent substrates 8 and 9, which are closer to, and more distant from, the observer (not shown), respectively, and will be herein referred to as an "observer-side substrate" and a "non-observer-side substrate", respectively. On one surface of the non-observer-side substrate 9 that is opposed to the liquid crystal layer 6, a corner cube reflector 90 is provided as a retroreflector. The reflective planes 90a (i.e., the rugged surface) of the corner cube reflector 90 are covered with a transparent flattening member 95 so as to be flattened. A transparent electrode 12 is further formed on the transparent flattening member 95. On the other hand, on one surface of the observer-side substrate 8 that is opposed to the liquid crystal layer 6, a color filter layer 7 and another transparent electrode 12 are provided in this order.

By controlling a voltage applied to the pair of transparent electrodes 12 that sandwiches the scattering type liquid crystal layer 6 between them, the liquid crystal layer 6 can exhibit either a scattering state or a transmitting state. When color white should be displayed, the scattering type liquid crystal layer 6 is controlled in such a manner as to enter the scattering state. In this mode, a portion of the incoming light, which has been incident from an external light source (e.g., the sun) onto the scattering type liquid crystal layer 6, is scattered by the liquid crystal layer 6. Another portion of the incoming light is reflected from the corner cube reflector 90 and then scattered by the liquid crystal layer 6. On the other hand, when color black should be displayed, the scattering type liquid crystal layer 6 is controlled in such a manner as to enter the transmitting state. In this mode, a portion of the incoming light that has been transmitted through the scattering type liquid crystal layer 6 is reflected back to its source by the corner cube reflector 90. Accordingly, just a portion of the light that has been emitted from a light source near the observer reaches his or her eyes, thus realizing good display of color black. In addition, since the incoming light is retro-reflected, no regularly reflected portion of the ambient light reaches the observer's eyes. As a result, the unwanted back reflection of the surrounding sight is avoidable.

In the conventional reflective type liquid crystal display device 900 including the corner cube reflector 90, the transparent electrode 12 and the liquid crystal layer 6 are not in contact with the reflective planes 90a of the retroreflector 90 as shown in FIG. 40. That is to say, when the reflective planes 90a of the retroreflector 90 are covered with the flattening member 95 as shown in FIG. 40, the incoming light may be absorbed into the flattening member 95 or non-retro-reflected from the interface between the flattening member 95 and the liquid crystal layer 6. As a result, the desired high lightness may not be obtained or the contrast ratio may decrease.

Also, in this liquid crystal display device 900, the size L1 of each unit element of the corner cube reflector 90 needs to be equal to or smaller than the size L2 of each picture element region. If the size L1 of each unit element is greater than the size L2 of each picture element region, then a light ray, which has been transmitted through a predetermined picture element region and then retro-reflected from the corner cube reflector, may pass through another picture element region on the way back. In that case, the display may not be conducted as intended.

It should be noted that each of a predetermined number of elements, which is a constituent of one "pixel" as a minimum display area unit and which contributes to a display of its associated color, is herein referred to as a "picture element (or dot)". In a full-color display device, typically, one "pixel" is made up of three "picture elements" representing the three primary colors of red (R), green (G) and blue (B), respectively. Also, each region of the display device, which is provided for the purpose of displaying the color represented by its associated picture element, will be herein referred to as a "picture element region".

As described above, a corner cube for use in a liquid crystal display device, for example, needs to have a very small size (e.g., about 100 μm or less). However, according to any of the above-described mechanical methods of making corner cubes, it is often difficult to make corner cubes of such a small size as intended due to some variations that should occur in an actual manufacturing process. Also, even if corner cubes of a very small size are made by one of the methods described above, then each reflective plane should have a low specular reflectivity and the radius R of curvature at each intersection between two reflective planes should be great. As a result, the efficiency of retro-reflection may decrease disadvantageously.

Also, as for a micro corner cube that has been made by a photochemical method as disclosed in Japanese Laid-Open Publication No. 7-205322, it is difficult to ensure high plane precision (i.e., planarity) for each side face (or reflective plane) thereof. In that method, the plane precision of each side face of a micro corner cube depends on that of a triangular pyramidal photoresist pattern element formed on the substrate. However, to increase the plane precision of the photoresist pattern element, the processing steps of exposing and developing the photoresist layer should be controlled strictly enough by making the variation in transmittance or opacity of the mask constant, for example. Actually, though, such strict process control is hard to realize. Furthermore, according to this technique, each corner cube must be made up of three rectangular isosceles triangular planes.

Also, the photochemical method of making a microlens array as disclosed in Japanese Laid-Open Publication No. 9-76245 uses a light beam. However, even if this technique is applied to making a micro corner cube array, it is still difficult to ensure a sufficient plane precision (or planarity) for each plane of a corner cube.

SUMMARY OF THE INVENTION

In order to overcome the problems described above, an object of the present invention is to provide a method of making a micro corner cube array of a very small size and with sufficiently high shape precision.

Another object of the present invention is to provide a display device that uses such a micro corner cube array.

Still another object of the present invention is to provide a reflective type display device that exhibits high lightness and high contrast ratio in displaying color white.

A method of making a micro corner cube array according to a preferred embodiment of the present invention includes the steps of: a) preparing a substrate, at least a surface portion of which consists of cubic single crystals and which has a surface that is substantially parallel to {111} planes of the crystals; and b) etching the surface of the substrate anisotropically, thereby forming a plurality of unit elements for the micro corner cube array on the surface of the substrate. Each of the unit elements is made up of a number of crystal planes that have been formed at a lower etch rate than the {111} planes of the crystals.

In one preferred embodiment of the present invention, the step b) preferably includes the step of forming {100} planes of the crystals at the lower etch rate than the {111} planes thereof.

In this particular preferred embodiment, the step b) preferably includes the step of forming the unit elements so that each said unit element is made up of three {100} planes that are opposed substantially perpendicularly to each other.

Specifically, at least the surface portion of the substrate prepared in the step a) may be made of a compound semiconductor having a sphalerite structure.

In that case, the compound semiconductor is preferably gallium arsenide and the substrate preferably has a surface that is substantially parallel to {111}B planes formed by arsenic atoms.

Alternatively, at least the surface portion of the substrate prepared in the step a) may be made of a material having a diamond structure.

In that case, at least the surface portion of the substrate preferably consists of germanium single crystals.

In another preferred embodiment of the present invention, the step b) preferably includes the step of etching the surface of the substrate anisotropically so that a ratio of the etch rate of the {111} planes to the lower etch rate of the crystal planes is greater than 1.73.

In still another preferred embodiment, the method preferably further includes, between the steps a) and b), the step c) of covering the surface of the substrate with an etching mask layer. The etching mask layer preferably includes at least one masking element and at least one opening that have been arranged to form a predetermined pattern.

In this particular preferred embodiment, the step b) preferably includes the step of forming the unit elements for the micro corner cube array so that the size of each said unit element is controlled in accordance with the pattern of the etching mask layer defined in the step c).

Alternatively, the step c) may include the step of defining the etching mask layer that includes a plurality of masking elements. Each of the masking elements preferably has a median point that is substantially located at a honeycomb lattice point.

In that case, the masking elements are preferably spaced apart from each other.

In still another preferred embodiment, the masking element preferably has a planar shape defined by at least three sides that are respectively parallel to (100), (010) and (001) planes of the crystals.

Specifically, the masking element preferably has a triangular planar shape defined by the three sides.

Alternatively, the masking element may have a planar shape defined by at least three sides that are respectively parallel to (11-1), (1-11) and (-111) planes of the crystals.

In that case, the masking element preferably has a triangular planar shape defined by the three sides.

As another alternative, the masking element may have a planar shape that is symmetrical about a three-fold rotation axis.

In that case, the masking element preferably has a hexagonal, nonagonal or dodecagonal planar shape.

In yet another preferred embodiment, the etching mask layer preferably includes a plurality of openings, each of which has a median point that is substantially located at a honeycomb lattice point.

In yet another preferred embodiment, the at least one masking element preferably accounts for more than 50% of the total area of the etching mask layer.

In yet another preferred embodiment, the step b) preferably includes the step of stopping etching the surface of the substrate when a contact area between the surface of the substrate and the masking element is substantially minimized.

In yet another preferred embodiment, the step b) preferably includes the step of subjecting the surface of the substrate to a wet etching process.

In that case, the step b) preferably further includes the step of subjecting the surface of the substrate to a dry etching process at least once.

In yet another preferred embodiment, the method preferably further includes the step of transferring the shape of the unit elements, which have been formed on the surface of the substrate, to a resin material.

In yet another preferred embodiment, the step b) preferably includes the step of forming the unit elements so that each said unit element is made up of three substantially square planes that are opposed substantially perpendicularly to each other.

In yet another preferred embodiment, the surface of the substrate prepared in the step a) preferably defines an angle of greater than 0 degrees and equal to or smaller than 10 degrees with the {111} planes of the crystals.

In this particular preferred embodiment, an intersection between the surface of the substrate and the {111} planes of the crystals is preferably substantially perpendicular to a cleaved facet of the substrate.

Another preferred embodiment of the present invention provides a method of making an array of micro corner cubes, each being defined by predetermined crystal planes of a crystal having a prescribed structure. The method includes the steps of: a) preparing a substrate, at least a surface portion of which consists of the crystals having the prescribed structure; and b) etching the substrate anisotropically, thereby exposing the predetermined crystal planes intentionally.

Still another preferred embodiment of the present invention provides a micro corner cube array that has been made from a substrate, at least a surface portion of which consists of cubic single crystals. The micro corner cube array has unevenness including etched surfaces that have been formed from predetermined crystal planes of the crystals.

In one preferred embodiment of the present invention, the predetermined crystal planes are preferably {100} planes.

Yet another preferred embodiment of the present invention provides a mold for a micro corner cube array. The mold has preferably been made from a substrate, at least a surface portion of which consists of cubic single crystals. The mold preferably has unevenness including etched surfaces that have been formed from predetermined crystal planes of the crystals.

In one preferred embodiment of the present invention, the predetermined crystal planes are preferably {100} planes.

A display device according to yet another preferred embodiment of the present invention includes a micro corner cube array that has been made from a substrate, at least a surface portion of which consists of cubic single crystals. The array preferably has unevenness including etched surfaces that have been formed from predetermined crystal planes of the crystals. The display device preferably further includes a light modulating layer, which is provided over the micro corner cube array.

In one preferred embodiment of the present invention, the micro corner cube array preferably includes a plurality of unit elements. Each of the unit elements preferably has a size smaller than a size of each picture element region of the display device.

Yet another preferred embodiment of the present invention provides a method of making an array of micro corner cubes. The method preferably includes the steps of: preparing a base member on which a micro corner cube array pattern has been defined; and transferring the pattern onto a material for the micro corner cube array by using the base member as a mold. In this method, when the material is stripped from the mold, a normal to one of multiple planes of the micro corner cube array pattern and a direction in which the material is stripped from the mold are preferably present in a single plane.

A reflective type display device according to yet another preferred embodiment of the present invention preferably includes: a substrate; a retroreflector; and a light modulating layer, which is interposed between the substrate and the retroreflector and which switches between a scattering state and a transmitting state. The light modulating layer is preferably adjacent to reflective planes of the retroreflector.

In one preferred embodiment of the present invention, the light modulating layer is preferably a scattering type liquid crystal layer.

Specifically, in the transmitting state, the liquid crystal layer preferably has liquid crystal molecules that are oriented continuously in both a thickness direction and in-plane directions of the liquid crystal layer. The in-plane directions are perpendicular to the thickness direction.

Alternatively, in the transmitting state, the liquid crystal layer preferably exhibits refractive index continuity with respect to light traveling in a thickness direction of the liquid crystal layer and to light traveling in in-plane directions of the liquid crystal layer. The in-plane directions are perpendicular to the thickness direction.

In this particular preferred embodiment, the liquid crystal layer preferably includes: a first phase that does not respond to an electric field externally applied; and a second phase that includes liquid crystal molecules responding to the electric field. While the liquid crystal layer is in the transmitting state, the first and second phases preferably exhibit substantially the same refractive index with respect to both the light traveling in the thickness direction and the light traveling in the in-plane directions.

More specifically, the first phase preferably has a size of about 100 nm to about 20,000 nm.

In another preferred embodiment of the present invention, while the liquid crystal layer is in the transmitting state, a ratio of the refractive index that the first phase exhibits with respect to the light traveling in the thickness direction or the in-plane directions to the refractive index that the second phase exhibits with respect to the same light is preferably from about 0.95 to about 1.05.

In still another preferred embodiment, the first phase preferably includes a polymer that has been obtained by polymerizing a monomer having a liquid crystal skeleton.

In yet another preferred embodiment, while no voltage is being applied to the liquid crystal layer, the liquid crystal molecules, which are located over the reflective planes of the retroreflector or over the substrate, preferably have their major axes substantially aligned with the thickness direction.

In this particular preferred embodiment, the liquid crystal molecules preferably exhibit negative dielectric anisotropy.

In yet another preferred embodiment, the scattering state of the scattering type liquid crystal layer is preferably created by forming a plurality of liquid crystal domains, each having a predetermined size, in the liquid crystal layer. While the liquid crystal layer is in the transmitting state, the liquid crystal molecules thereof are preferably aligned substantially uniformly in the entire liquid crystal layer.

In this particular preferred embodiment, the predetermined size is preferably about 100 nm to about 20,000 nm.

Alternatively, the scattering type liquid crystal layer preferably includes dispersion phases having a size smaller than the predetermined size. The liquid crystal domains are preferably formed due to disorder in orientation of the liquid crystal molecules that has been caused by the dispersion phases.

In yet another preferred embodiment, the retroreflector preferably includes a plurality of retroreflecting elements, each of which has three reflective planes that are opposed substantially perpendicularly to each other and which reflects incoming light back to its source The light modulating layer is preferably adjacent to the three reflective planes.

In this particular preferred embodiment, the retroreflecting elements are preferably arranged at a pitch of about 1 μm to about 1,000 μm.

In yet another preferred embodiment, the retroreflector preferably includes a micro corner cube array.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2A is a plan view of the structure shown in FIG. 1D;

FIGS. 2B and 2C are respectively a plan view and a perspective view of the structure shown in FIG. 1E; and FIGS. 2D and 2E are respectively a plan view and a perspective view of the structure shown in FIG. 1F.

FIGS. 6A and 6B are respectively a plan view and a perspective view of the structure shown in FIG. 5C or 5D; and FIGS. 6C and 6D are respectively a plan view and a perspective view of the structure shown in FIG. 5E or 5F.

FIGS. 7A and 7B are respectively a plan view and a perspective view of the structure shown in FIG. 5G or 5H; and FIGS. 7C and 7D are respectively a plan view and a perspective view of the structure shown in FIG. 5I.

FIG. 9 is a cross-sectional view illustrating a configuration for a reflective type liquid crystal display device according to a fifth specific preferred embodiment of the present invention.

FIG. 10A illustrates a situation where the pitch of unit elements of the micro corner cube array is greater than the size of each picture element region; and FIG. 10B illustrates a situation where the pitch of unit elements of the micro corner cube array is smaller than the size of each picture element region.

FIG. 19A is a cross-sectional view illustrating two concave portions that have been formed by using mutually different etchants; and FIG. 19B illustrates cross sections of three concave portions that have been formed at mutually different (111)B/(100) etch selectivities.

FIG. 20A is a cross-sectional view illustrating a situation where the etch selectivity is not so high; and FIG. 20B is a cross-sectional view illustrating a situation where the etch selectivity is high enough.

FIG. 32A is a cross-sectional view illustrating a situation where the etching process was performed for an adequate amount of time (e.g., three minutes); and FIG. 32B is a cross-sectional view illustrating a situation where the etching process was performed for a longer time.

FIG. 33 illustrates the shape of the etching mask layer for use in the fourth preferred embodiment.

FIG. 36 is a cross-sectional view illustrating where the incoming and outgoing light rays pass in the reflective type liquid crystal display device shown in FIG. 34 while the liquid crystal layer thereof is in the transmitting state and in the scattering state, respectively.

DETAILED DESCRIPTION OF PREFERRED EMBODIMENTS

In a method of making a micro corner cube array according to a preferred embodiment of the present invention, a micro corner cube array is made by using a single crystalline substrate consisting of cubic crystals (which will be herein sometimes referred to as a "cubic single crystalline substrate"). The cubic single crystalline substrate may be made of a compound semiconductor having a sphalerite structure or a material having a diamond structure. More specifically, a cubic single crystalline substrate, having a surface that is disposed substantially parallelly to {111} planes of the crystals, is prepared and has that surface patterned by being subjected to an anisotropic etching process.

It should be noted that the "substrate having a surface substantially parallel to {111} planes of crystals" herein refers to not only a substrate having a surface parallel to the {111} planes of the crystals but also a substrate having a surface that defines an angle of about 0 degrees to about 10 degrees with the {111} planes of the crystals.

Figure 41:
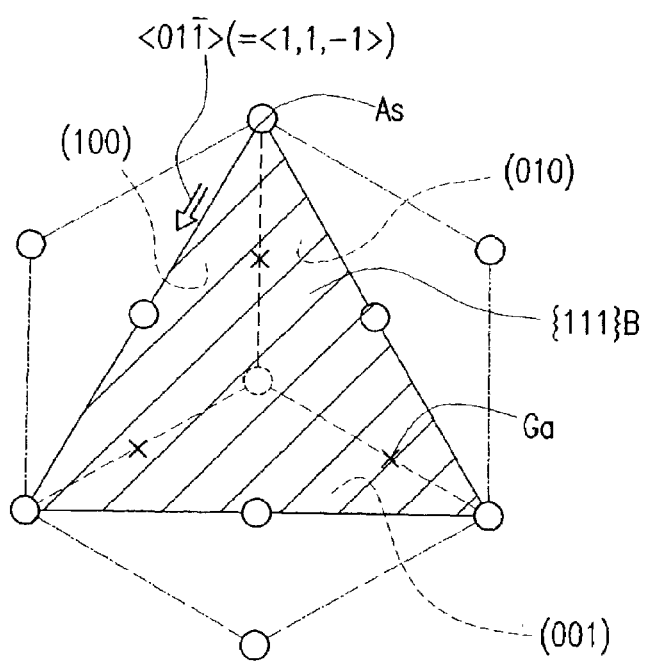
FIG. 41 is a plan view showing a (111)B plane of a GaAs crystal.

The method of the present invention is partly characterized by patterning the surface of the substrate by an anisotropic etching process so that the etch rate of one crystal plane is different from that of another. For example, if the substrate is made up of GaAs crystals having a sphalerite structure as shown in FIG. 41, the etch rate of the {111}B planes of the crystals (i.e., the {111} planes formed by arsenic) is relatively high, while the etch rate of the {100} planes (i.e., crystal planes including (100), (010) and (001) planes) thereof is relatively low. Accordingly, the anisotropic etching process advances in such a manner as to leave the {100} planes of the crystals. As a result, concavo-convex portions are defined on the surface of the substrate by multiple unit elements, each being made up of the {100} planes of the crystals. As used herein, each "unit element", defined by a {100} family of planes, will also be referred to as a "concave portion" because the element is formed by an anisotropic etching process. Each of those unit elements that have been formed in this manner has three perpendicularly opposed planes (e.g., (100), (010) and (001) planes), thus forming a corner cube.

In a corner cube array formed by such a method, the three reflective planes of each corner cube are matched with the {100} crystallographic planes of a cubic crystal and exhibit very high shape precision. Also, the three reflective planes that make up each corner cube have good planarity, and each corner or edge, at which two or three of the reflective planes intersect with each other, has sufficient sharpness. Furthermore, the corner cube array has a stereoscopic shape in which multiple unit elements or corner cubes are arranged in a regularly pattern. In this array, the respective vertices of the corner cubes are located at substantially the same level (or within substantially the same plane). Thus, a corner cube array like this can be used effectively as a retroreflector for reflecting an incoming light ray back to its source.

Also, the size of each unit element (i.e., each corner cube) of the corner cube array formed by the method of the present invention may be several tens μm or less by adjusting the feature size of a photoresist pattern (or resist mask) used in the etching process. Accordingly, a corner cube array of a very small size, which is suitably applicable for use as a retroreflector for a liquid crystal display device, for example, can be obtained.

It should be noted that the "cubic single crystalline substrate" used in preferred embodiments of the present invention includes a substrate obtained by forming a single crystal layer on a supporting base member of an amorphous or polycrystalline material. Also, the substrate does not have to be a flat plate but may have any other stereoscopic shape as long as the substrate has a flat surface.

Hereinafter, preferred embodiments of the present invention will be described with reference to the accompanying drawings, in which each member having substantially the same function is identified by the same reference numeral.

EMBODIMENT 1

FIGS. 1A through 1F illustrate respective process steps for making a micro corner cube array according to a first specific preferred embodiment of the present invention. In this preferred embodiment, a single crystalline substrate of GaAs, which is an exemplary compound semiconductor having a sphalerite structure, is used as the cubic single crystalline substrate on which a micro corner cube array should be formed.

Figure 1A:
FIGS. 1A through 1F are cross-sectional views illustrating respective process steps for making a micro corner cube array according to a first specific preferred embodiment of the present invention.

First, as shown in FIG. 1A, a substrate 1, which consists of GaAs single crystals and of which the surface is one of {111}B planes, is prepared and has that surface mirror-polished. It should be noted that {111}A planes are formed by gallium atoms, while the {111}B planes are formed by arsenic atoms. FIG. 41 shows one of the {111}B planes of GaAs single crystals as viewed from over the substrate 1. In FIG. 41, the configuration of the GaAs crystal unit cell is indicated by the one-dot chains.

Figure 1B:
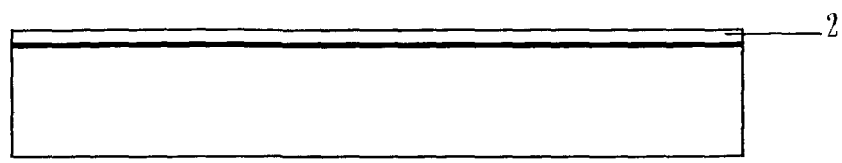

Next, as shown in FIG. 1B, the surface of the substrate 1 is spin-coated with a positive photoresist layer 2 with a thickness of about 1 μm. The photoresist layer 2 may be made of OFPR-800 (produced by Tokyo Ohka Kogyo Co., Ltd.), for example.

Figure 1C:
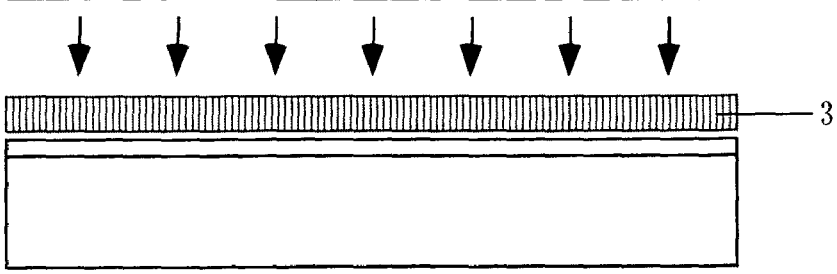
Figure 3:
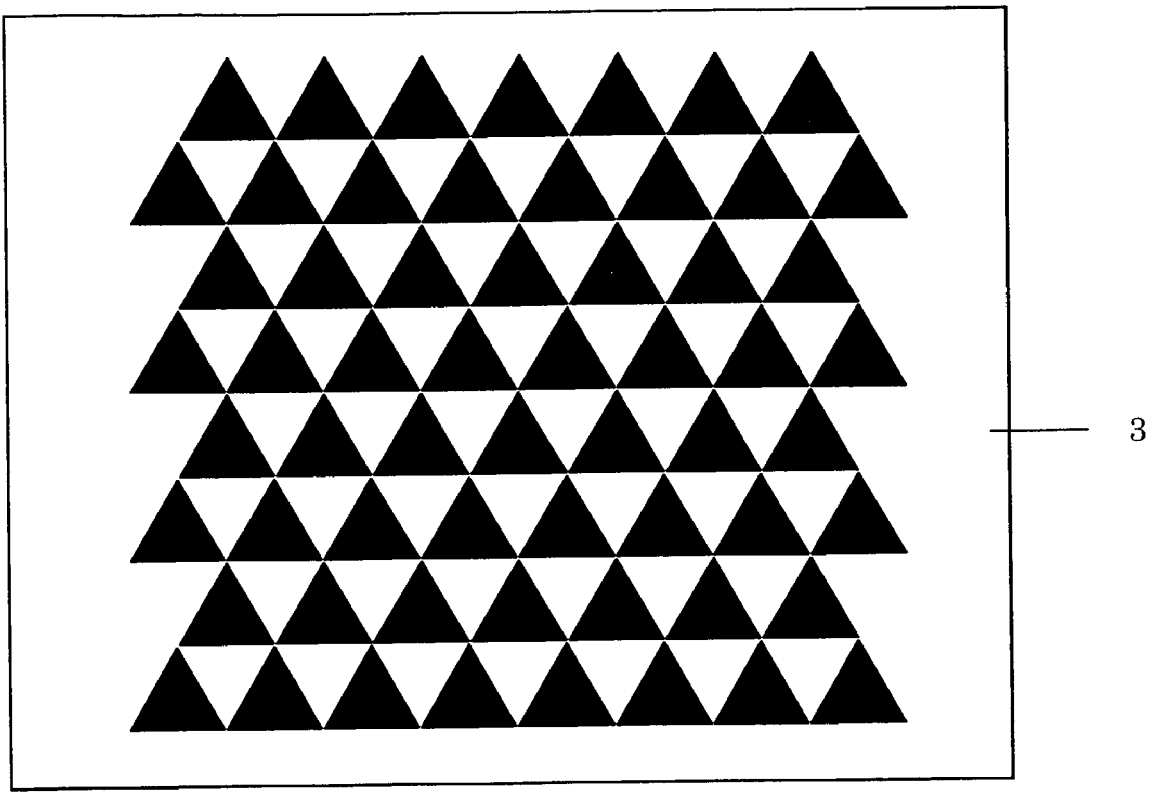
FIG. 3 is a plan view illustrating a photomask for use to make the micro corner cube array of the first preferred embodiment.

Subsequently, after the photoresist layer 2 has been pre-baked at about 100° C. for approximately 30 minutes, a photomask 3 is disposed over the photoresist layer 2 to expose the photoresist layer 2 to radiation through the mask 3 as shown in FIG. 1C. In this preferred embodiment, a photomask 3 such as that shown in FIG. 3 may be used. As shown in FIG. 3, in this photomask 3, equilateral triangular opaque regions and inverse equilateral triangular transmissive regions are alternately arranged in each of the three directions defined by the three sides of the triangles. The photomask 3 is disposed over the substrate 1 so that one of the three sides of each equilateral triangular pattern element of the mask 3 is parallel to the <01-1> direction of the GaAs crystal as shown in FIG. 41. It should be noted that the negative sign preceding a direction index herein indicates that the direction index is negative. In this preferred embodiment, each equilateral triangular pattern element of the mask 3 has a length of about 10 μm each side.

Figure 1D:
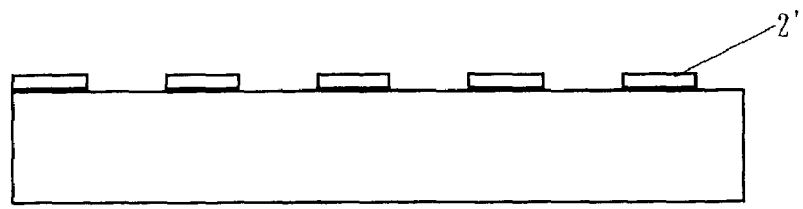
Figure 2A:
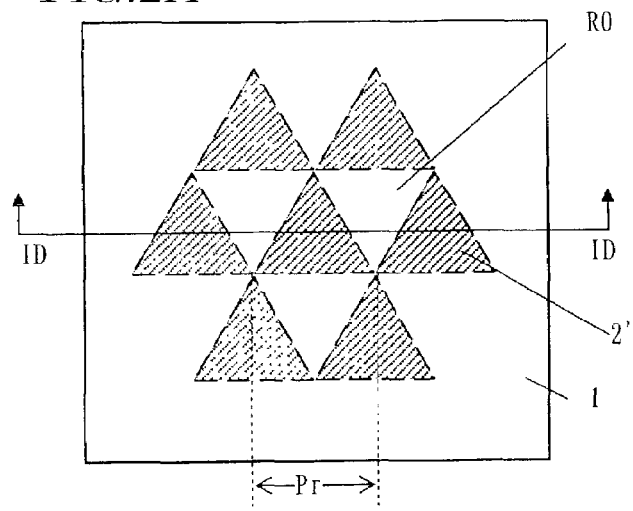
FIGS. 2A through 2E illustrate some of the process steps for making the micro corner cube array of the first preferred embodiment.

Thereafter, the exposed photoresist layer 2 is developed as shown in FIG. 1D. As a developer, NMD-32.38% (produced by Tokyo Ohka Kogyo Co., Ltd.) may be used. In this manner, a photoresist pattern 2' (consisting of masking elements for the anisotropic etching process) is defined as shown in FIG. 2A. It should be noted that FIG. ID is a cross-sectional view taken along the line ID—ID shown in FIG. 2A.

In this preferred embodiment, the size of corner cubes to be formed is controlled in accordance with the feature size of the photoresist pattern 2' (or the pattern of the mask 3). More specifically, the size of the corner cubes to be formed becomes approximately equal to the pitch Pr of each opening R0 between two masking elements of the photoresist pattern 2'. In this preferred embodiment, the pitch Pr is about 10 μm. It should be noted that the photoresist pattern 2' will be herein sometimes referred to as "masking elements" and that those masking elements and the openings R0 will be herein sometimes referred to as an "etching mask layer" collectively. That is to say, the "etching mask layer" is a patterned photoresist layer 2.

Figure 4A:
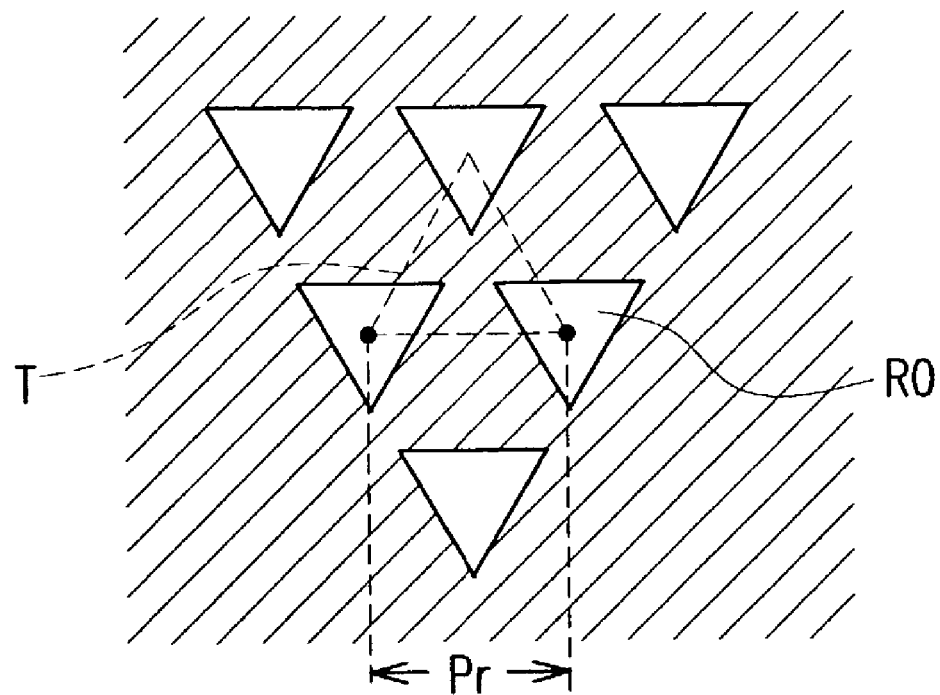
FIGS. 4A and 4B are plan views illustrating two other photomasks in respective shapes that are different from that of the photomask shown in FIG. 3.
Figure 4B:
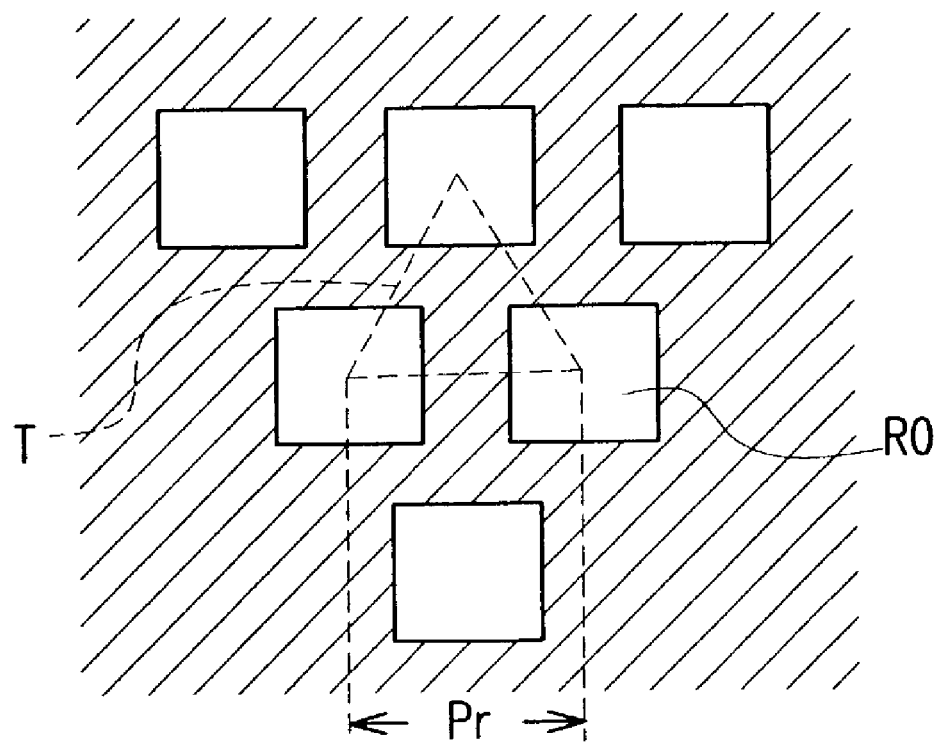

The photoresist pattern 2' is not limited to that shown in FIG. 2A. Alternatively, the photoresist pattern may be either the pattern shown in FIG. 4A in which the centers of three equilateral triangular openings R0 are located at the three vertices of a virtual equilateral triangle T or the pattern shown in FIG. 4B in which the centers of three square openings R0 are located at the three vertices of the virtual equilateral triangle T. In any case, those three equilateral triangles or squares may be spaced apart from each other. No matter which of these resist patterns is used, the size of the corner cubes to be formed is controlled to be approximately equal to the pitch Pr of the openings R0. It should be noted that each of these photoresist patterns is preferably defined so that one side of the virtual triangle T is parallel to the <01-1> directions of the GaAs crystals.

Figure 1E:
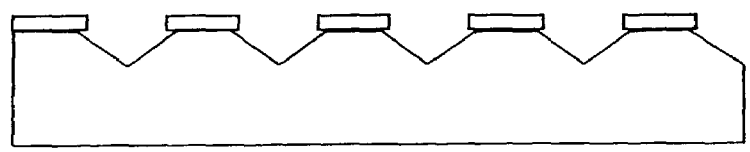
Figure 1F:
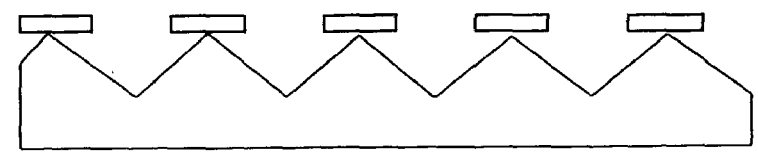

Next, as shown in FIGS. 1E and 1F, the substrate 1 is wet-etched while stirring an etchant with a magnet stirrer. In this preferred embodiment, the wet etching process may be carried out at a temperature of about 0° C. for approximately 30 minutes using a mixture of $NH_4OH:H_2O_2:H_2O=4:1:20$ as the etchant.

Figure 2B:
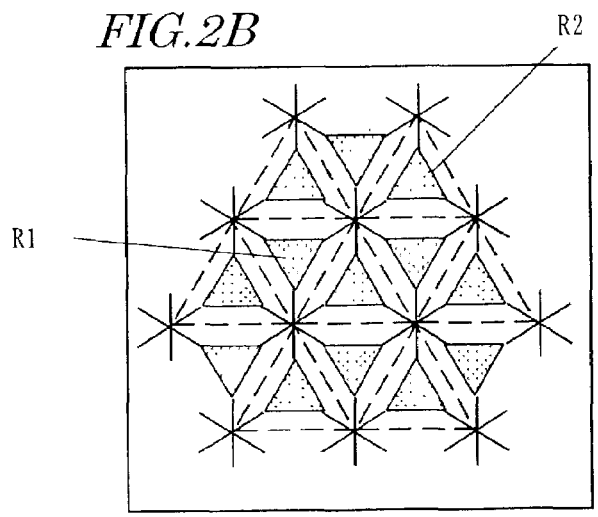
Figure 2C:
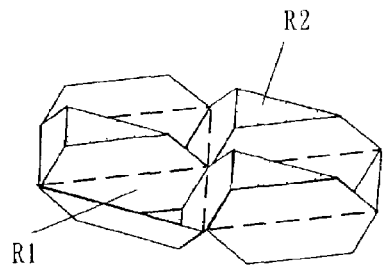

When the substrate 1 is half-etched as shown in FIG. 1E (e.g., when about 15 minutes has passed since the etching process was started), the substrate 1 will have been etched deeply at its regions R1 that are not covered with the photoresist pattern 2' as shown in FIGS. 2B and 2C. Also, the substrate 1 will also be side-etched even at its regions R2 that are covered with the photoresist pattern 2'. In this etching process, the {100} planes of the GaAs single crystals, including the (100), (010) and (001) planes, are less easy to etch that the other planes thereof. Thus, the etching process advances anisotropically so as to form the {100} planes.

Figure 2D:
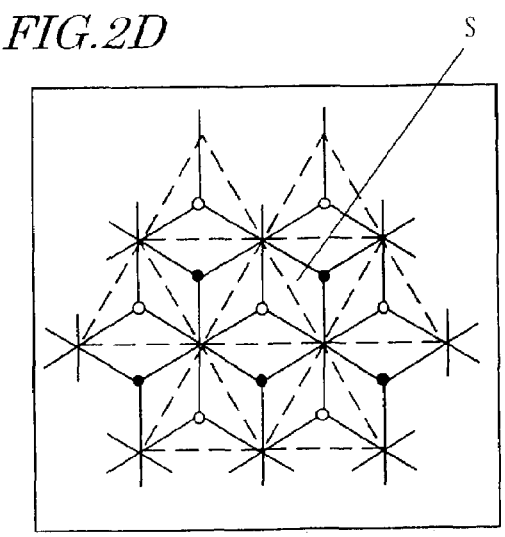
Figure 2E:
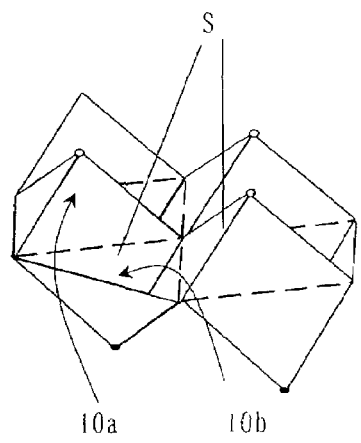

Thereafter, when the substrate 1 has been etched to the intended depth as shown in FIG. 1F, concavo-convex portions, consisting of the {100} planes S of the GaAs single crystals, will be formed as shown in FIG. 2D and 2E. As a result, a micro corner cube array is obtained. It should be noted that the photoresist pattern 2' will also have been stripped when the etching process reaches the stage shown in FIG. 1F.

As can be seen from FIG. 2E, the micro corner cube array obtained in this manner has a stereoscopic shape in which multiple convex portions 10a and multiple concave portions 10b are combined with each other. Also, each of its unit elements (i.e., each of the corner cubes of the array) is made up of three substantially square planes that are opposed substantially perpendicularly to each other. As shown in FIG. 2D, each unit element or corner cube has a substantially hexagonal shape as view from over the substrate 1. In this manner, the corner cube formed by the method of this preferred embodiment has a more complex shape than the conventional corner cube that is made up of three rectangular isosceles triangles. However, the corner cube of this preferred embodiment has a very small size of about 10+ μm. In addition, the shape precision (e.g., the planarity of each of the three substantially square planes) thereof is also very high.

When this micro corner cube array is used as a portion of a retroreflector, a thin film of a reflective material (e.g., aluminum or tin) may be deposited by an evaporation process, for example, to a substantially uniform thickness (e.g., about 200 nm) over the rugged surface of the GaAs substrate. In this manner, a retroreflector, including three substantially square reflective planes that are opposed substantially perpendicularly to each other, can be obtained.

Alternatively, an electroformed mold may be made from this substrate with the rugged surface and then the surface shape (or unevenness) of the mold obtained in this manner may be transferred onto a resin material to obtain a micro corner cube array of the resin.

In the preferred embodiment described above, the substrate 1 is made of GaAs single crystals. Alternatively, the substrate 1 may also be made of single crystals of any other compound having a sphalerite structure, e.g., InP, InAs, ZnS or GaP.

EMBODIMENT 2

FIGS. 5A through 5I illustrate respective process steps for making a micro corner cube array according to a second specific preferred embodiment of the present invention. In this preferred embodiment, a substrate consisting of germanium single crystals having a diamond structure is used as the cubic single crystalline substrate on which a micro corner cube array should be formed.

Figure 5A:
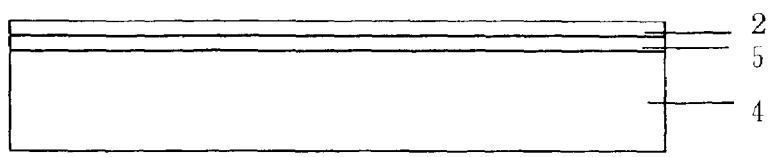
FIGS. 5A through 5I are cross-sectional views illustrating respective process steps for making a micro corner cube array according to a second specific preferred embodiment of the present invention.

First, in the process step shown in FIG. 5A, a substrate 4, which consists of germanium single crystals and of which the surface is parallel to a (111) plane of the germanium crystals, is prepared and has that surface mirror-polished. Next, an $SiO_2$ layer 5 is deposited by a CVD process, for example, to a thickness of about 200 nm on the mirror-polished surface of the substrate 4. Then, the surface of the $SiO_2$ layer 5 is spin-coated with a positive photoresist layer 2 with a thickness of about 1 μm. The photoresist layer 2 may be made of OFPR-800 (produced by Tokyo Ohka Kogyo Co., Ltd.), for example.

Figure 8A:
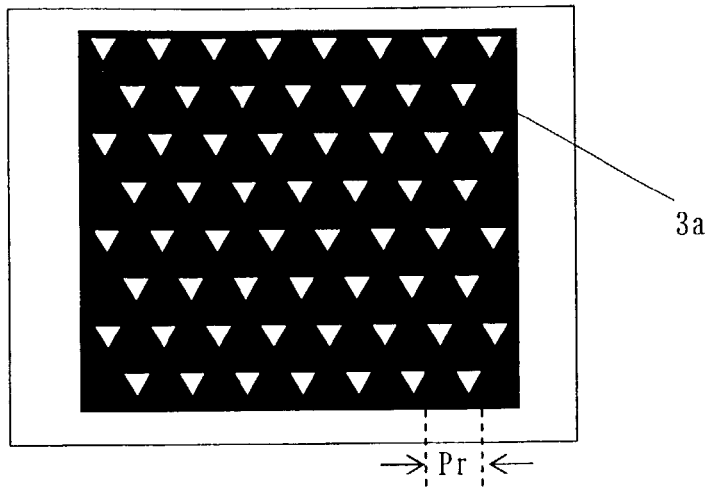
FIGS. 8A through 8C are plan views illustrating three photomasks for use to make the micro corner cube array of the second preferred embodiment.

Subsequently, in the process step shown in FIG. 5B, after the photoresist layer 2 has been pre-baked at about 100° C. for approximately 30 minutes, a photomask 3a, including a plurality of equilateral triangular transmitting regions of a relatively small size as shown in FIG. 8A, is disposed over the substrate to expose the photoresist layer 2 to radiation through the photomask 3a and develop it. In this manner, a first photoresist pattern 2a is defined. Thereafter, the $SiO_2$ layer 5 is etched by using the first photoresist pattern 2a as a mask, thereby forming a first $SiO_2$ mask 5a having a plurality of openings in the same shape as the counterparts of the photomask 3a shown in FIG. 8A.

Figure 5B:
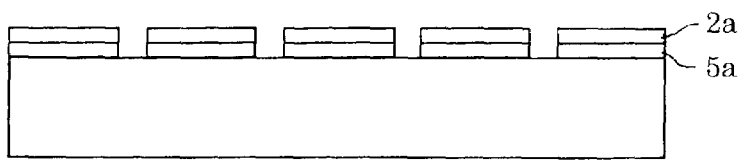
Figure 5C:
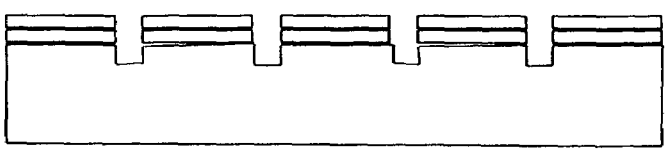
Figure 6A:
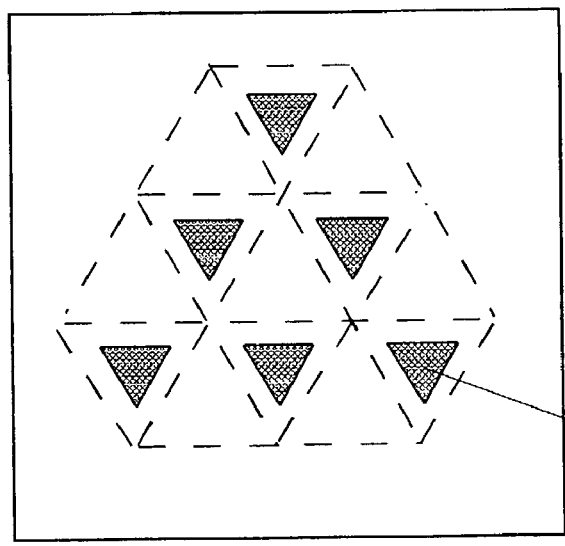
FIGS. 6A through 6D illustrate some of the process steps for making the micro corner cube array of the second preferred embodiment.
Figure 6B:
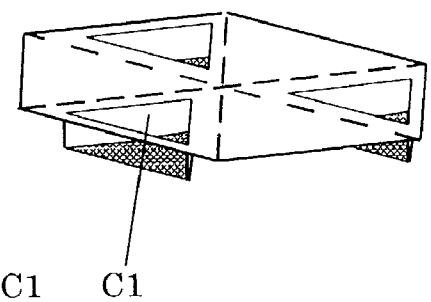

Next, in the process step shown in FIG. 5C, by using the first photoresist pattern 2a and first $SiO_2$ mask 5a as an etching mask, the substrate 4 is dry-etched. As a result, multiple concave portions C1 are formed in a predetermined region of the surface of the substrate 4 as shown in FIGS. 6A and 6B.

Subsequently, in the process step shown in FIG. 5D, the first photoresist pattern 2a is exposed to the radiation and developed again by using the photomask 3b shown in FIG. 8B having transmitting regions that are greater in area than those of the photomask 3a shown in FIG. 8A. In this manner, a second photoresist pattern 2b is defined. Then, the first $SiO_2$ mask 5a is further etched by using the second photoresist pattern 2b as a mask, thereby forming a second $SiO_2$ mask 5b having openings in the same shape as the counterparts of the photomask 3b.

Figure 5D:
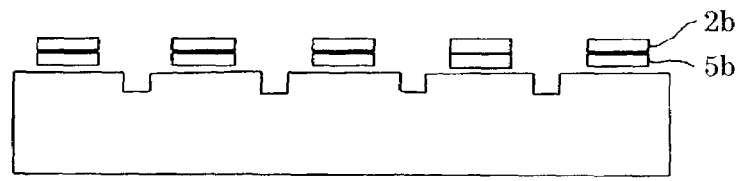
Figure 5E:
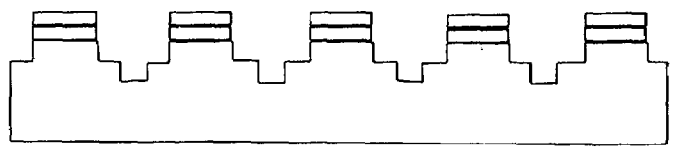
Figure 6C:
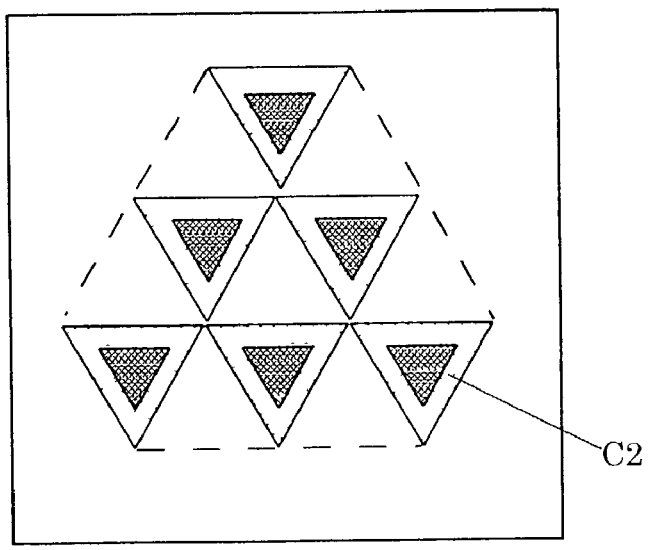
Figure 6D:
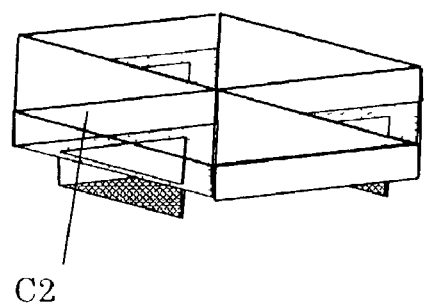

Thereafter, in the process step shown in FIG. 5E, the substrate 4 is further dry-etched by using the second photoresist pattern 2b and second $SiO_2$ mask 5b as an etching mask. As a result, two-stepped concave portions C2, having two depth levels, are formed in the predetermined region of the substrate 4 as shown in FIGS. 6C and 6D. Specifically, in each concave portion C2, the center region thereof is deeper than the peripheral region thereof.

Figure 5F:
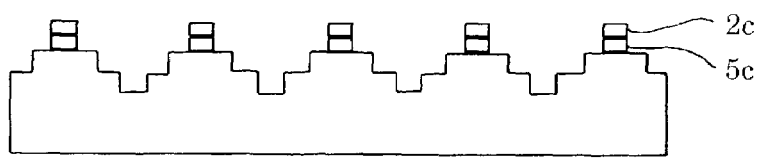
Figure 8B:
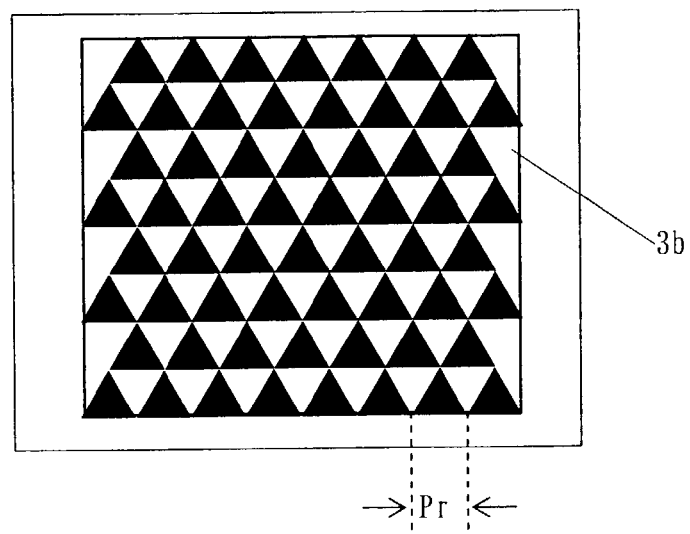
Figure 8C:
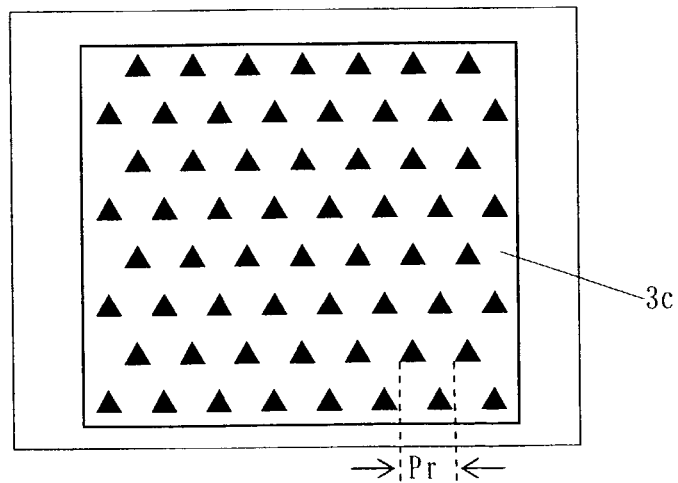

Next, in the process step shown in FIG. 5F, the second photoresist pattern 2b is exposed to the radiation and developed again by using the photomask 3c shown in FIG. 8C having transmitting regions that are even greater in area than those of the photomask 3b shown in FIG. 8B. In this manner, a third photoresist pattern 2c is defined. Then, the second $SiO_2$ mask 5b is further etched by using the third photoresist pattern 2c as a mask, thereby forming a third $SiO_2$ mask 5c having openings in the same shape as the counterparts of the photomask 3c.

Figure 5G:
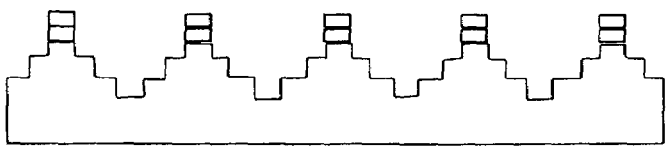
Figure 7A:
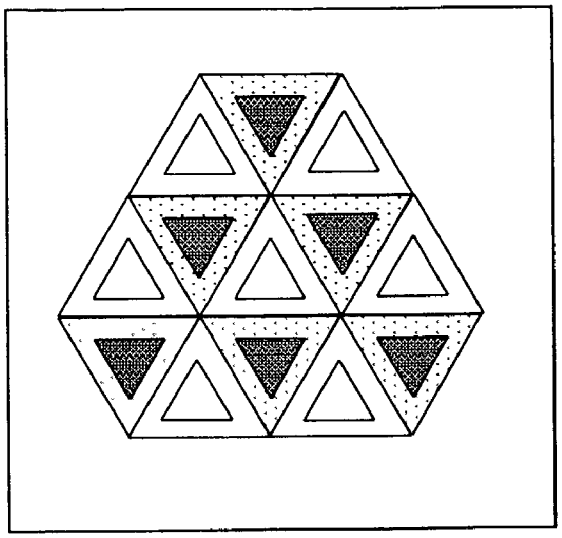
FIGS. 7A through 7D illustrate some of the process steps for making the micro corner cube array of the second preferred embodiment.
Figure 7B:
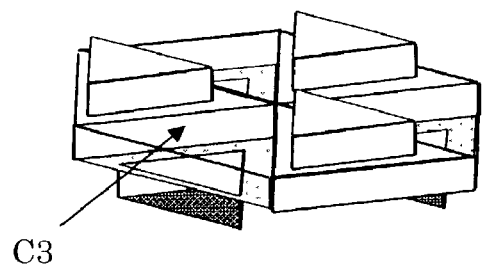

Thereafter, in the process step shown in FIG. 5G, the substrate 4 is further dry-etched by using the third photoresist pattern 2c and third SiO$_2$ mask 5c as an etching mask. As a result, three-stepped concave portions C3, having three depth levels, are formed in the predetermined region of the substrate 4 as shown in FIGS. 7A and 7B.

In each of the exposure process steps shown in FIGS. 5B, 5D and 5F, each of the photomasks 3a, 3b and 3c is disposed over the substrate so that one of the three sides of the equilateral triangular masking elements (or non-masking elements) thereof is parallel to the <01-1> directions of the germanium crystals. As in the first preferred embodiment described above, the patterns of the photomasks 3a, 3b and 3b each have a pitch Pr of about 10 μm in this preferred embodiment also. Furthermore, in each of the dry-etching process steps shown in FIGS. 5C, 5E and 5G, a mixture of CF$_4$ and O$_2$ gases is used as an etching gas.

Figure 5H:
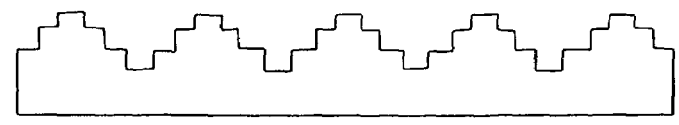

Thereafter, the third photoresist pattern 2c and the third SiO$_2$ mask 5c are stripped in the process step shown in FIG. 5H.

Figure 5I:
Figure 7C:
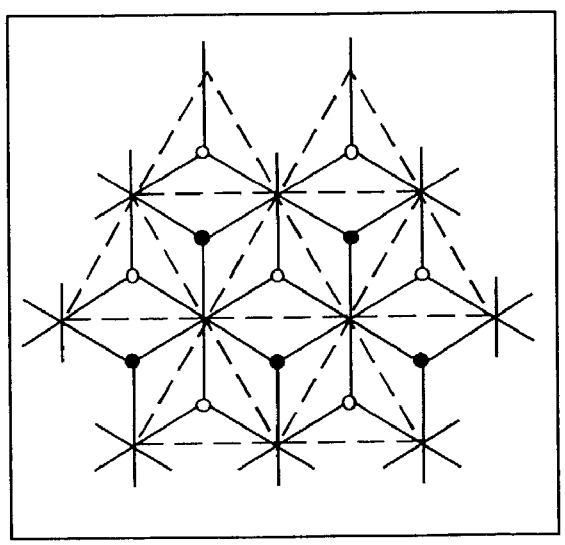
Figure 7D:
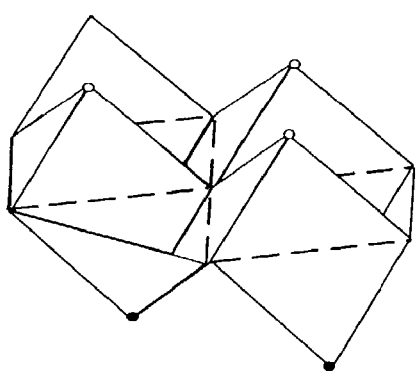

Finally, in the process step shown in FIG. 5I, the substrate 4 is wet-etched while being rocked manually. In this preferred embodiment, the wet etching process may be carried out at a temperature of about 0° C. for approximately 5 minutes using a mixture of HF:H$_2$O$_2$:H$_2$O=1:1:4 as the etchant. In this wet etching process, the {100} planes (including the (100), (010) and (001) planes) of the germanium crystals are etched at a lower rate than the other planes. Thus, the wet etching process advances anisotropically so as to leave these {100} planes. As a result, multiple corner cubes, defined by the {100} planes of the germanium crystals, are formed on the surface of the substrate as shown in FIGS. 7C and 7D.

As described above, according to this preferred embodiment, stepped concavo-concave portions, similar in shape to corner cubes, are formed in advance on the surface of the substrate by dry-etching the surface a number of times using multiple etching masks having mutually different opening sizes, and then the substrate with the stepped portions is wet-etched, thereby forming corner cubes as defined by the {100} planes of the germanium crystals.

When the micro corner cube array obtained in this manner is used as a portion of a retroreflector, a thin film of a reflective material (e.g., silver or aluminum) may be deposited by an evaporation process, for example, to a substantially uniform thickness (e.g., about 200 nm) over the rugged surface of the germanium substrate. In that case, the thin film needs to be deposited so as to come into tight contact with the rugged surface. In this manner, a retroreflector, including three substantially square reflective planes that are opposed substantially perpendicularly to each other, can be obtained.

Optionally, an electroformed mold may be made from this substrate with the rugged surface and then the surface shape (or unevenness) of the mold obtained in this manner may be transferred onto a resin material to obtain a micro corner cube array of the resin.

EMBODIMENT 3

Hereinafter, a method of making a micro corner cube array according to a third specific preferred embodiment of the present invention will be described. In this third preferred embodiment, a micro corner cube array is also formed on the surface of a single crystalline substrate by subjecting the substrate to an anisotropic etching process as in the first and second preferred embodiments described above. However, in this preferred embodiment, multiple different types of solutions are used as etchants for the anisotropic etching process.

Figure 19A:
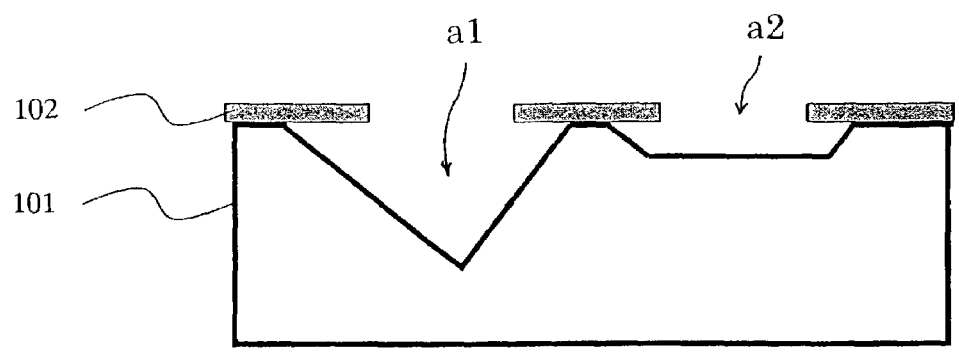
FIGS. 19A and 19B illustrate how the cross-sectional shape of a concave portion changes with a (111)B/(100) etch selectivity in a third specific preferred embodiment of the present invention.

As shown in FIG. 19A, a GaAs substrate 101 is used as the single crystalline substrate and is selectively covered with an etching mask (i.e., the masking elements of the etching mask layer) 102. Then, the substrate 101 is etched anisotropically though the mask 102, thereby making a micro corner cube array.

In this preferred embodiment, to investigate exactly how the shape of the resultant micro corner cube array changes with the type of etchant used for the anisotropic etching process, a mixture of ammonia water, hydrogen peroxide water and water (NH$_4$OH:H$_2$O$_2$:H$_2$O=15:15:70) and a mixture of concentrated sulfuric acid, hydrogen peroxide water and water (H$_2$SO$_4$:H$_2$O$_2$:H$_2$O=80:5:15) are used as etchants A and B, respectively. By using these etchants A and B, the anisotropic etching process is performed at about 20° C. for approximately 3 minutes. In this preferred embodiment, the micro corner cube array is formed as in the first preferred embodiment except these etching conditions.

FIG. 19A shows the shapes of micro corner cubes a1 and a2 that have been formed by using the etchants A and B, respectively. In FIG. 19A, the micro corner cubes a1 and a2 are illustrated as having been formed on the same substrate for convenience sake. Actually, though, these micro corner cubes a1 and a2 are formed on two different substrates.

As can be seen from FIG. 19A, the micro corner cube a1 has a sharpened bottom (i.e., defines a sharp angle at the bottom), while the micro corner cube a2 has a planar bottom.

These results show that the etchant A is preferred to the etchant B to make a micro corner cube array in a desired shape. Hereinafter, it will be described with reference to FIG. 19B how the etchant used changes the shape of micro corner cubes being made.

Figure 19B:
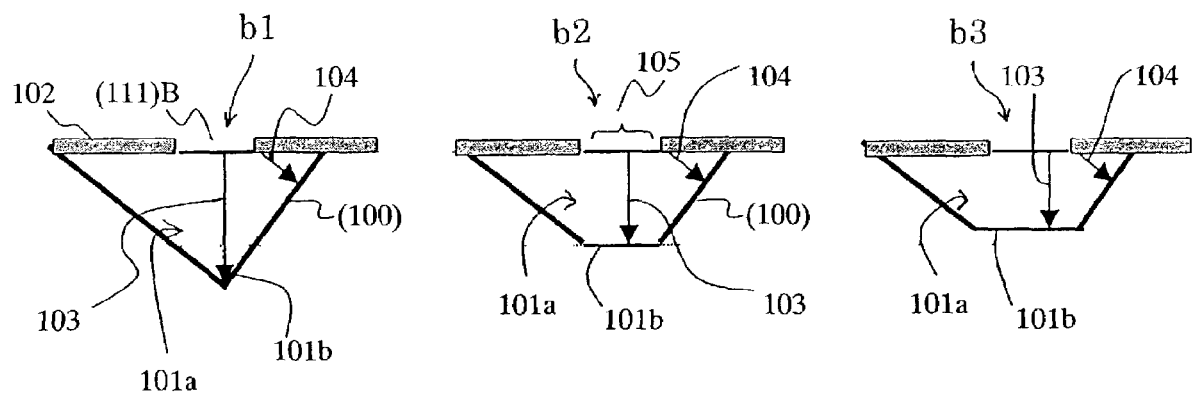

FIG. 19B illustrates the shapes of three micro corner cubes b1, b2 and b3 that have been formed in three situations where the ratio of the etch rate of a (111)B plane of the GaAs single crystalline substrate 101 to that of a (100) plane thereof is greater than 1.73, equal to 1.73 and smaller than 1.73, respectively. In FIG. 19B, the etch rate of the (111)B plane is represented by the length of the arrow 103, while the etch rate of the (100) plane is represented by the length of the arrow 104. Thus, in the following description, these arrows 103 and 104 will also be referred to as "etch rates 103 and 104" because these arrows 103 and 104 are vectors representing the directions and magnitudes of the etching reaction. It should be noted that the "etch rate of a crystal plane" herein means how much (or how deep) the material (i.e., the substrate 101 in this case) is etched away per unit time in a direction perpendicular to the crystal plane.

As shown in FIG. 19B, in the corner cube b1, the etch rate 103 of the (111)B plane is much higher than the etch rate 104 of the (100) plane, and therefore, the resultant concave portion 101a has a sharpened bottom 101b. In the corner cube b3 on the other hand, the etch rate 103 of the (111)B plane is not so much higher than the etch rate 104 of the (100) plane, and the resultant concave portion 101a has a planar bottom 101b. The corner cube b2 also has a planar bottom 101b but the size and shape of the bottom 101b are the same as those of an opening 105 of the etching mask 102.

Figure 20A:
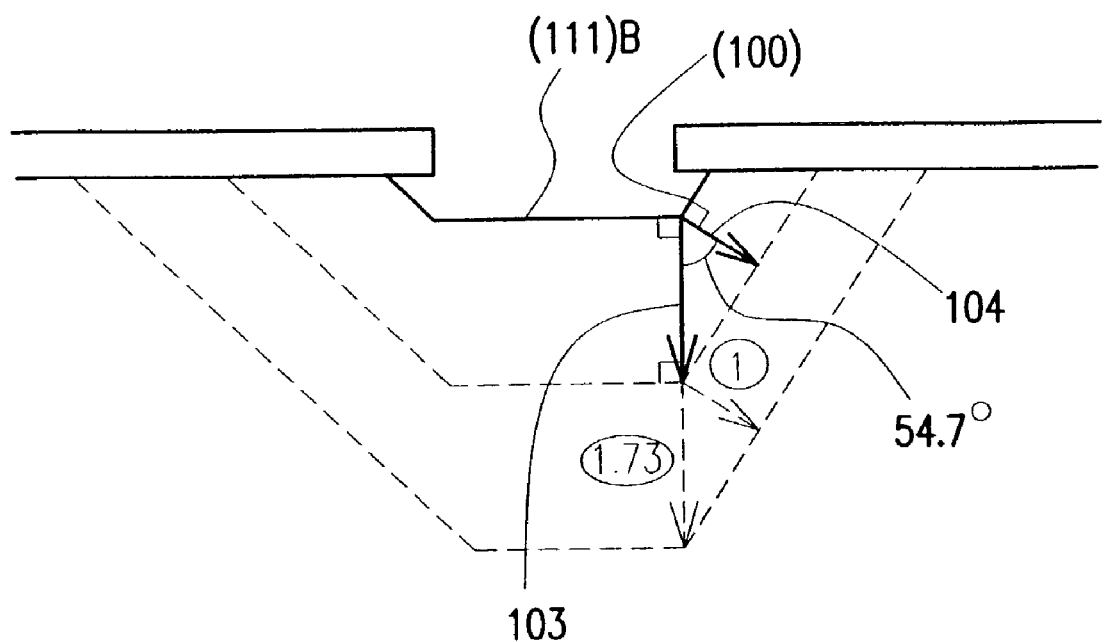
FIGS. 20A and 20B illustrate how the cross-sectional shape of a concave portion changes with the (111)B/(100) etch selectivity in the third preferred embodiment.
Figure 20B:
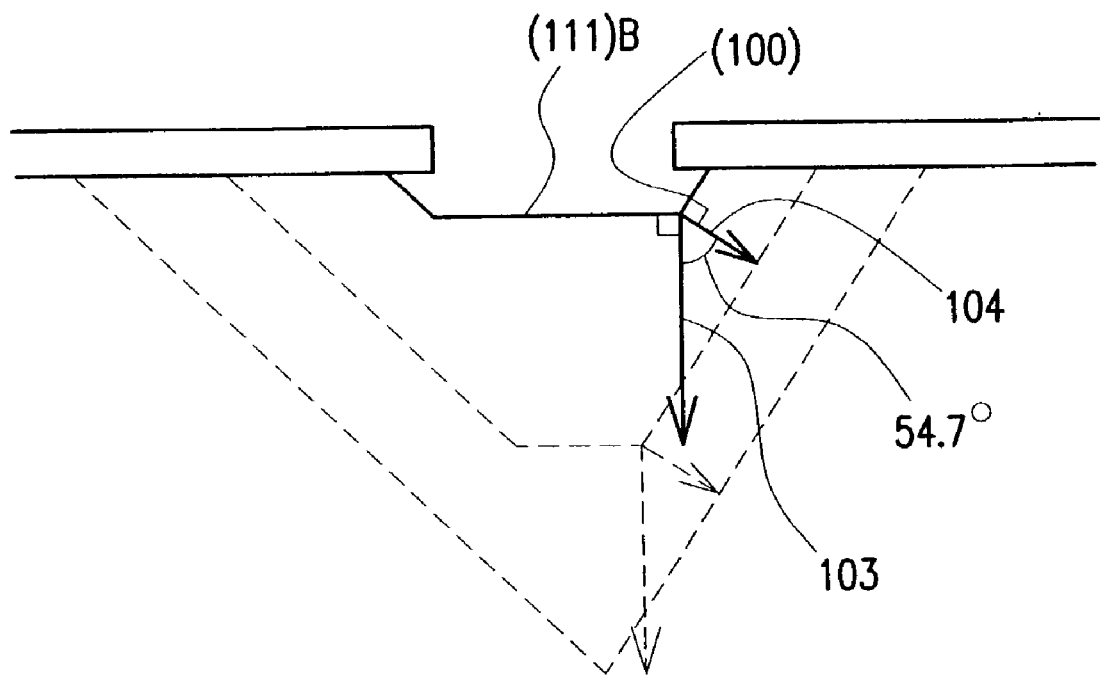

Next, the ratios of these etch rates 103 and 104 will be considered quantitatively. A normal to the (111)B plane and a normal to the (100) plane define an angle of about 54.7 degrees as shown in FIGS. 20A and 20B. In this case, if the ratio of the etch rate 103 of the (111)B plane to the etch rate 104 of the (100) plane is equal to about 1.73, then the etching process advances while forming a bottom of approximately the same size as the opening 105 of the etching mask layer. That is to say, the etching process advances while keeping the size of the bottom approximately equal to that of the opening 105.

In contrast, if the ratio of the etch rate 103 of the (111)B plane to the etch rate 104 of the (100) plane is greater than about 1.73, then the planar bottom 101b of the concave portion 101a gradually decreases its size as the etching process advances as shown in FIG. 20B. As a result, a micro corner cube having a sharpened bottom can be formed. When a retroreflector is formed by using a micro corner cube array consisting of corner cubes with such a sharpened bottom, the retroreflector can reflect the incoming light back to its source with more certainty.

As described above, to make a micro corner cube with a sharpened bottom, the ratio of the etch rate of the (111)B plane to that of the (100) plane (which will be herein referred to as a "(111)B/(100) etch selectivity") needs to be greater than about 1.73. The (111)B/(100) etch selectivity is preferably equal to or greater than about 1.8, more preferably equal to or greater than about 3.0.

Accordingly, to make a micro corner cube array with high shape precision, an etchant that realizes a (111)B/(100) etch selectivity of at least greater than about 1.73 is preferably used. Examples of such etchants include not only the etchant A described above but also a mixture of sodium hydroxide, hydrogen peroxide water and water (NaOH:$H_2O_2$:$H_2O$=5 g:5 g:90 g).

In this manner, by appropriately controlling the etch selectivity between the two types of crystal planes, a micro corner cube array with even higher shape precision can be formed. In the preferred embodiment described above, a micro corner cube array is supposed to be formed so as to have {100} planes of cubic single crystals as its reflective planes. To obtain such a micro corner cube array, just the anisotropic etching process needs to be performed appropriately as described above because the {100} planes are easily exposed as intended by doing so. In the micro corner cube array obtained in this way, its planes (i.e., the {100} planes of cubic single crystals) have sufficiently high plane precision (or planarity).

The first, second and third preferred embodiments described above relate to various methods of making a micro corner cube array by etching the surface of a substrate anisotropically. Alternatively, a similar micro corner cube array may also be formed by a selective growth process of crystals, not the anisotropic etching process. In that case, if crystals are grown in such a manner as to expose predetermined crystal planes intentionally, a micro corner cube array can also be formed with high shape precision.

EMBODIMENT 4

Figure 21:
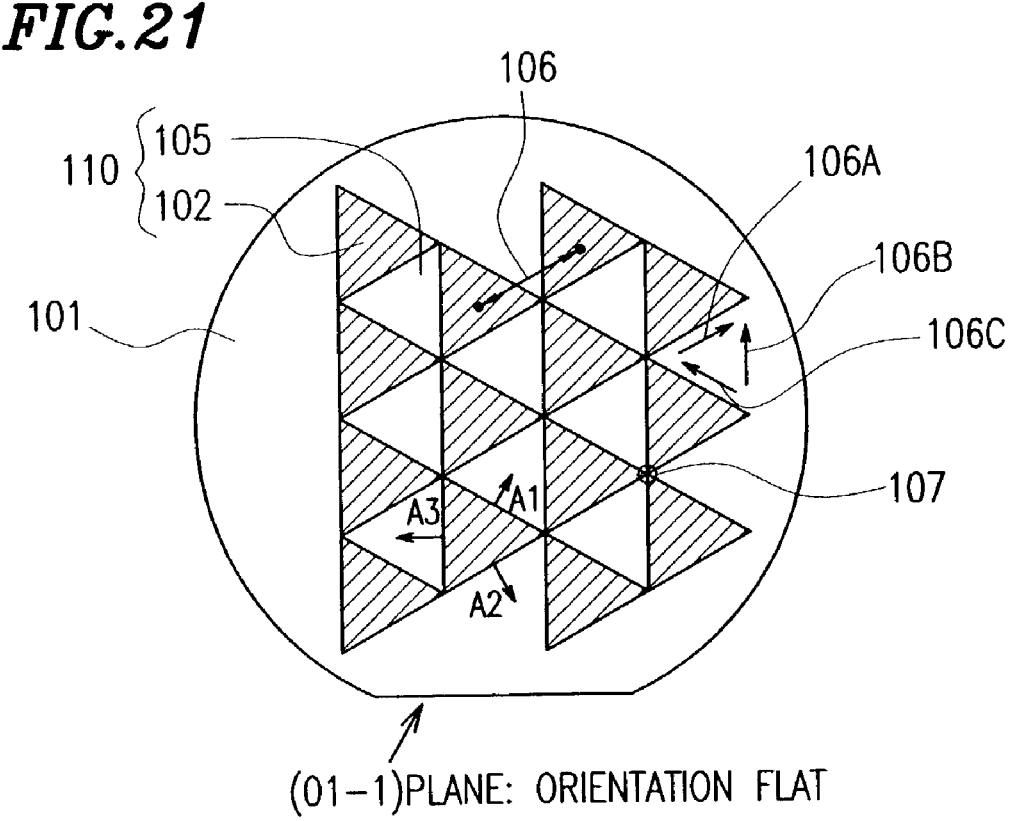
FIG. 21 is a plan view illustrating an etching mask layer, including triangular masking elements, according to a fourth specific preferred embodiment of the present invention.

Hereinafter, a fourth specific preferred embodiment of the present invention will be described. The fourth preferred embodiment relates to a method of making a micro corner cube array by defining an etching mask layer 110, made up of masking elements 102 and openings 105, over a GaAs substrate 101 and then etching the substrate 101 anisotropically as shown in FIG. 21, for example. In this preferred embodiment, to know how the shape of the micro corner cube array to be formed changes with the pattern of the etching mask layer 110 consisting of the masking elements 102 and openings 105, the etching process is carried out by using various types of etching mask layers 110 shown in FIGS. 21 through 29.

It should be noted that each of those etching mask layers 110 to be described below may be defined by patterning a photoresist film, deposited on the substrate 101, using a photomask as already described for the first preferred embodiment. In that case, portions of the photoresist film that remain after the film has been patterned (i.e., the photoresist pattern 2') correspond to the masking elements 102 of the etching mask layer 110, while the other removed portions of the photoresist film correspond to the openings 105 of the etching mask layer 110.

In this preferred embodiment, the unit elements (i.e., the masking elements 102) of the etching mask layer 110 are regularly arranged in predetermined directions. More specifically, in each of three directions 106A, 106B and 106C, which cross each other to define an angle of about 60 degrees between them in a plane parallel to the surface of the substrate as shown in FIG. 21, the masking elements 102 are arranged regularly as the unit elements. In this case, the pitch 106, which is defined as a distance between the median points or centers of two adjacent masking elements 102, is about 13 µm in each of these three directions 106A, 106B and 106C.

It should be noted that the "unit element" herein typically refers to each of the masking elements 102 that have the same planar shape and that are spaced apart from each other. However, each "unit element" does not have to consist of just one masking element 102. Also, the "multiple masking elements" are not always spaced apart from each other but may be barely connected together.

As described above, after the etching mask layer 110 in any of those various patterns has been defined over the single crystalline substrate 101, the substrate 101 is subjected to an anisotropic etching process. In this preferred embodiment, the etching process may be carried out at about 20° C. for about 3 minutes or about 5 minutes using a mixture of ammonia water, hydrogen peroxide water and water ($NH_4OH$:$H_2O_2$:$H_2O$=15:15:70) as an etchant.

Hereinafter, each of those various patterns of the etching mask layer 110 will be described with reference to FIGS. 21 through 29.

The etching mask layer 110 shown in FIG. 21 has the same pattern as that used for the first preferred embodiment. Each of the masking elements 102 of this mask layer 110 has a planar shape of an equilateral triangle that has three sides parallel to (100), (010) and (001) planes of the single crystalline substrate 101. That is to say, the three sides of each masking element 102 are parallel to the (100), (010) and (001) planes.

Next, the shape of the masking elements 102 will be described in further detail on the supposition that the a, b and c axes of crystals are defined so that the [111] directions of the crystals are a normal of the surface of the substrate, i.e., so that {111}B planes are defined in the [111] directions against the normal definition, as shown in FIG. 33. In the crystal structure shown in FIG. 33, the {111}B planes of the crystal correspond to the surface of the substrate, and the masking elements 102 are defined on the {111}B planes. As used herein, an edge of the masking element 102 that is "parallel to the (100) plane" is indicated by the line segment a1 shown in FIG. 33. That is to say, if a vector A1 (also shown in FIG. 21), which crosses the edge (or the line segment a1) at right angles and is directed from the inside of the masking element 102 toward the outside thereof, has a direction substantially corresponding to the [−211] directions of the crystal, then the edge is regarded as being "parallel to the (100) plane". Also, an edge of the masking element 102 that is "parallel to the (010) plane" is indicated by the line segment a2 shown in FIG. 33. That is to say, if a vector A2 (also shown in FIG. 21), which crosses the edge (or the line segment a2) at right angles and is directed from the inside of the masking element 102 toward the outside thereof, has a direction substantially corresponding to the [1-21] directions of the crystal, then the edge is regarded as being "parallel to the (010) plane". Furthermore, an edge of the masking element 102 that is "parallel to the (001) plane" is indicated by the line segment a3 shown in FIG. 33. That is to say, if a vector A3 (also shown in FIG. 21), which crosses the edge (or the line segment a3) at right angles and is directed from the inside of the masking element 102 toward the outside thereof, has a direction substantially corresponding to the [11-2] directions of the crystal, then the edge is regarded as being "parallel to the (001) plane".

Referring back to FIG. 21, two adjacent ones of the masking elements 102 slightly overlap with each other at an overlap portion 107. That is to say, the total area of the masking elements 102 accounts for more than 50% of that of the etching mask layer 110. In other words, the total area of the masking elements 102 is greater than that of the openings 105.

The median point (or the center) of each masking element 102 is substantially located at a honeycomb lattice point. As used herein, the "honeycomb lattice points" refer to the vertices and median points of respective rectangular hexagons when a predetermined plane is densely packed with the hexagons of completely the same shape with no gaps left between them. The "honeycomb lattice points" also correspond to the intersections between first and second groups of parallel lines that are defined in a predetermined plane. In this case, the first group of parallel lines extend in a first direction and are spaced apart from each other at regular intervals, while the second group of parallel lines extend in a second direction so as to define an angle of 60 degrees with the first group of parallel lines and are spaced apart from each other at the same regular intervals as the first group of parallel lines.

Figure 22:
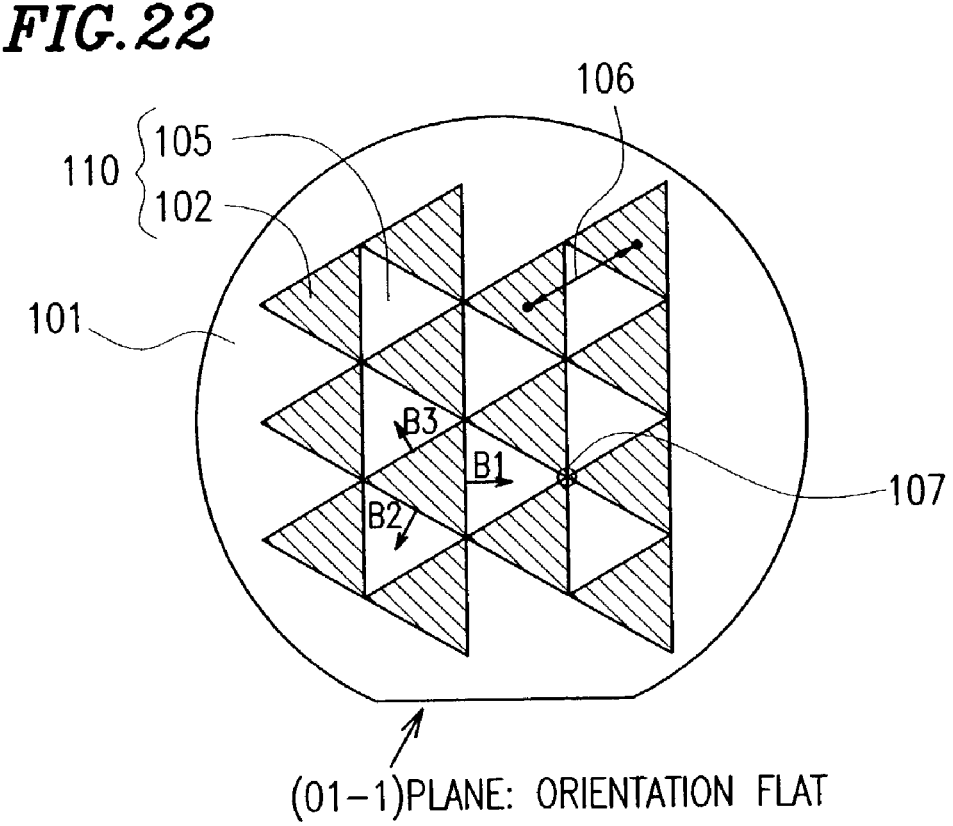
FIG. 22 is a plan view illustrating an etching mask layer, including triangular masking elements that face different directions from those illustrated in FIG. 21, according to the fourth preferred embodiment.

The etching mask layer 110 shown in FIG. 22 has a pattern similar to that of the first preferred embodiment or that shown in FIG. 21. However, the orientation of each triangular masking element 102 on the surface of the single crystalline substrate 101 is different. Accordingly, the masking elements 102 and the openings 105 of the mask layer 110 shown in FIG. 22 form the negative of the mask layer 110 shown in FIG. 21 so to speak.

In the mask layer 110 shown in FIG. 22, each of the masking elements 102 thereof has a planar shape of an equilateral triangle that has three edges that are parallel to the (11-1), (1-11) and (−111) planes of the single crystalline substrate 101. That is to say, the three edges of each masking element 102 are parallel to the (11-1), (1-11) and (−111) planes.

As used herein, an edge of the masking element 102 that is "parallel to the (11-1) plane" is indicated by the line segment b1 shown in FIG. 33. That is to say, if a vector B1 (also shown in FIG. 22), which crosses the edge (or the line segment b1) at right angles and is directed from the inside of the masking element 102 toward the outside thereof, has a direction substantially corresponding to the [−1-12] directions of the crystal, then the edge is regarded as being "parallel to the (11-1) plane". Also, an edge of the masking element 102 that is "parallel to the (1-11) plane" is indicated by the line segment b2 shown in FIG. 33. That is to say, if a vector B2 (also shown in FIG. 22), which crosses the edge (or the line segment b2) at right angles and is directed from the inside of the masking element 102 toward the outside thereof, has a direction substantially corresponding to the [−12-1] directions of the crystal, then the edge is regarded as being "parallel to the (1-11) plane". Furthermore, an edge of the masking element 102 that is "parallel to the (−111) plane" is indicated by the line segment b3 shown in FIG. 33. That is to say, if a vector B3 (also shown in FIG. 22), which crosses the edge (or the line segment b3) at right angles and is directed from the inside of the masking element 102 toward the outside thereof, has a direction substantially corresponding to the [2-1-1] directions of the crystal, then the edge is regarded as being "parallel to the (−111) plane".

Referring back to FIG. 22, two adjacent ones of the masking elements 102 slightly overlap with each other at an overlap portion 107. That is to say, the total area of the masking elements 102 accounts for more than 50% of that of the etching mask layer 110. In other words, the total area of the masking elements 102 is greater than that of the openings 105. Also, the median point (or the center) of each masking element 102 is substantially located at a honeycomb lattice point.

Figure 23:
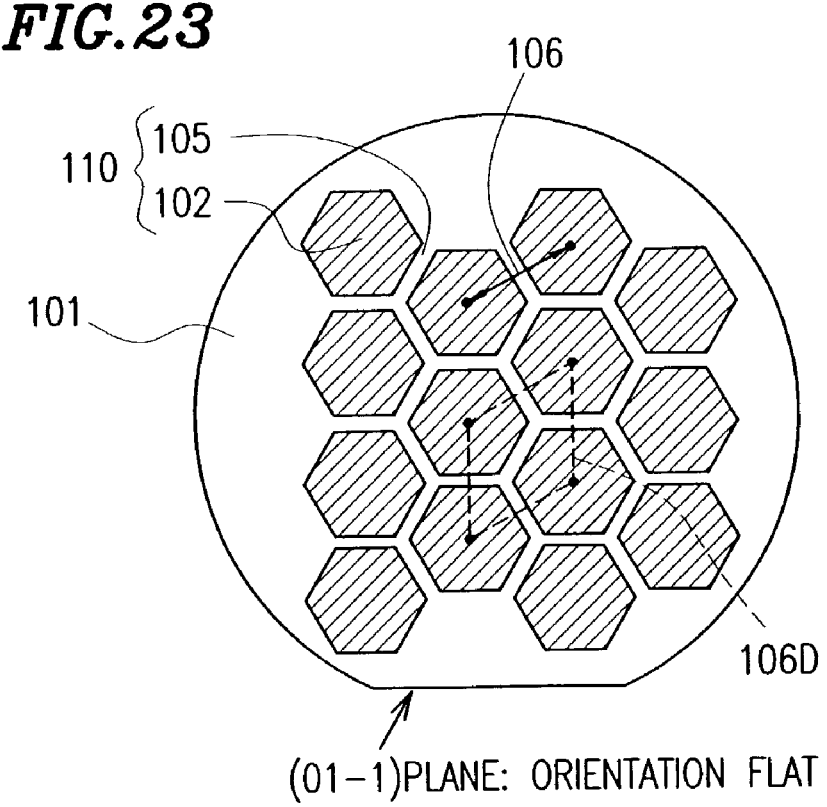
FIG. 23 is a plan view illustrating an etching mask layer, including hexagonal masking elements that have a relatively great total area, according to the fourth preferred embodiment.
Figure 24:
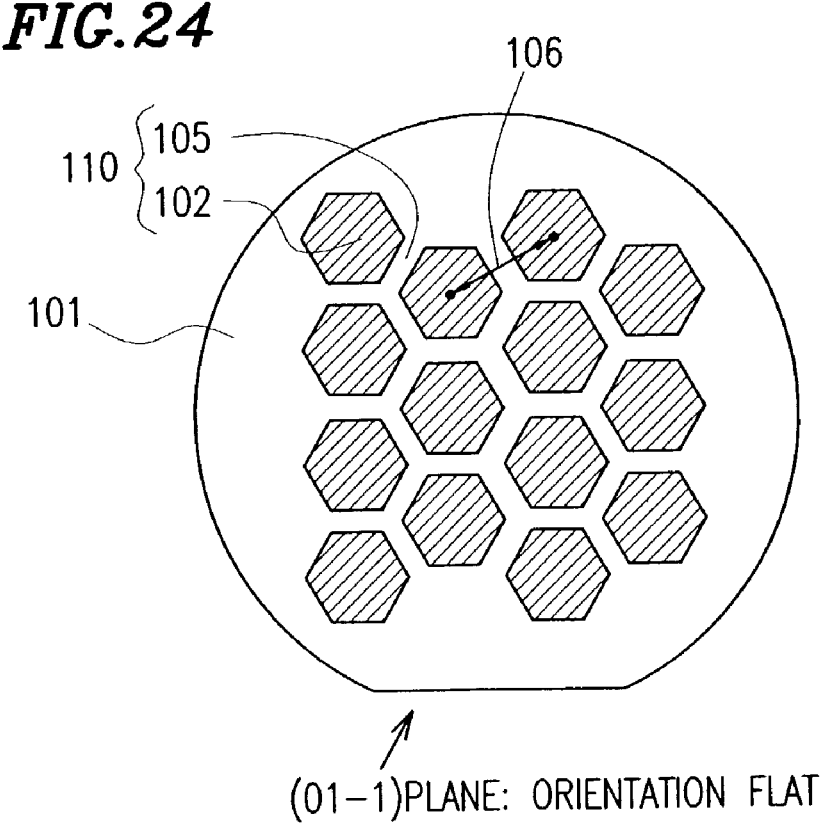
FIG. 24 is a plan view illustrating an etching mask layer, including hexagonal masking elements that have a smaller total area than those shown in FIG. 23, according to the fourth preferred embodiment.
Figure 25:
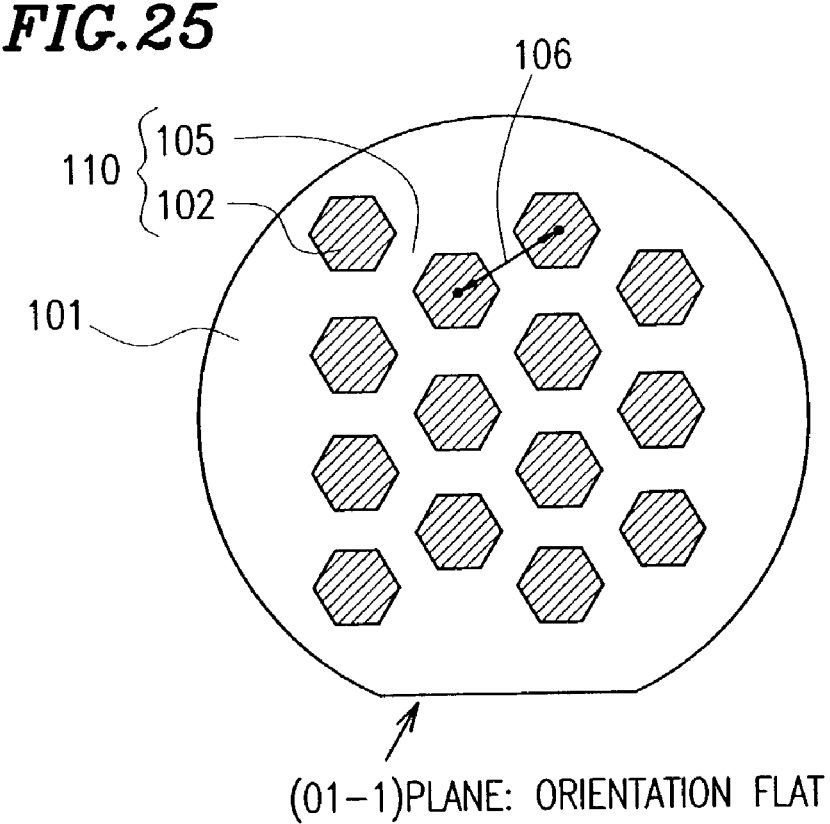
FIG. 25 is a plan view illustrating an etching mask layer, including hexagonal masking elements that have an even smaller total area than those shown in FIG. 24, according to the fourth preferred embodiment.

In the etching mask layers 110 shown in FIGS. 23, 24 and 25, the masking elements 102 thereof have a rectangular hexagonal planar shape and are spaced apart from each other. Also, in the examples shown in FIGS. 23, 24 and 25, the total area of the masking elements 102 respectively accounts for about 75%, about 60% and about 50% of that of the etching mask layer 110. Furthermore, in each of the etching mask layers 110 shown in FIGS. 23, 24 and 25, the median point (or the center) of each masking element 102 is substantially located at a honeycomb lattice point.

The total area of the mask layer 110 is equal to the sum of the total area of the masking elements 102 and that of the opening(s) 105. More exactly, the "total area of the mask layer 110" herein means the sum of the total areas of the masking elements 102 and opening(s) 105 in a region where the masking elements 102 and opening(s) 105 form a regular pattern. Also, the ratio in total area of the masking elements 102 to the etching mask layer 110 may be represented as a ratio of the total area of the masking elements 102 to the area of a rectangular region (e.g., as indicated by the dashed lines 106D in FIG. 23) obtained by connecting together the respective centers of four adjacent masking elements 102.

Figure 26:
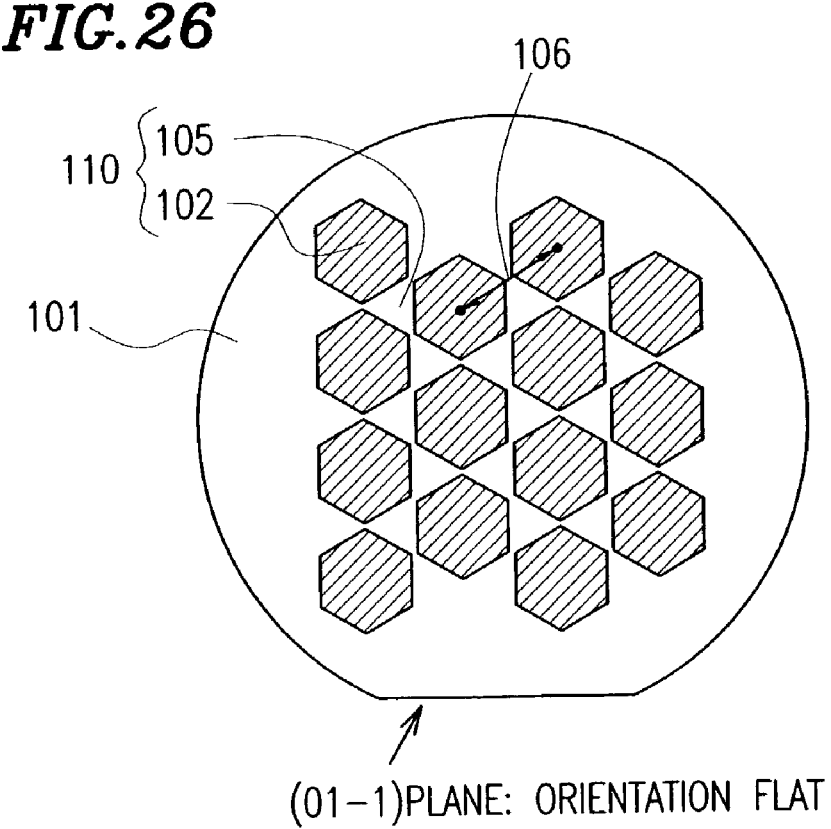
FIG. 26 is a plan view illustrating an etching mask layer, including hexagonal masking elements in a different shape from those shown in FIG. 23, 24 or 25, according to the fourth preferred embodiment.

In the mask layer 110 shown in FIG. 26, each of the masking elements 102 thereof has a planar shape of a rectangular hexagon that has six edges that are parallel to the (100), (010), (001), (11-1), (1-11) and (−111) planes of the single crystalline substrate 101. The masking elements 102 are spaced apart from each other. Also, the median point (or the center) of each masking element 102 is substantially located at a honeycomb lattice point. It should be noted that the rectangular hexagonal masking elements 102 shown in FIG. 26 are similar to those obtained by rotating the rectangular hexagonal masking elements 102 shown in FIG. 23, 24 or 25 by 90 degrees in a plane parallel to the surface of the substrate. Furthermore, in the example shown in FIG. 26, the total area of the masking elements 102 accounts for about 60% of that of the etching mask layer 110.

Figure 27:
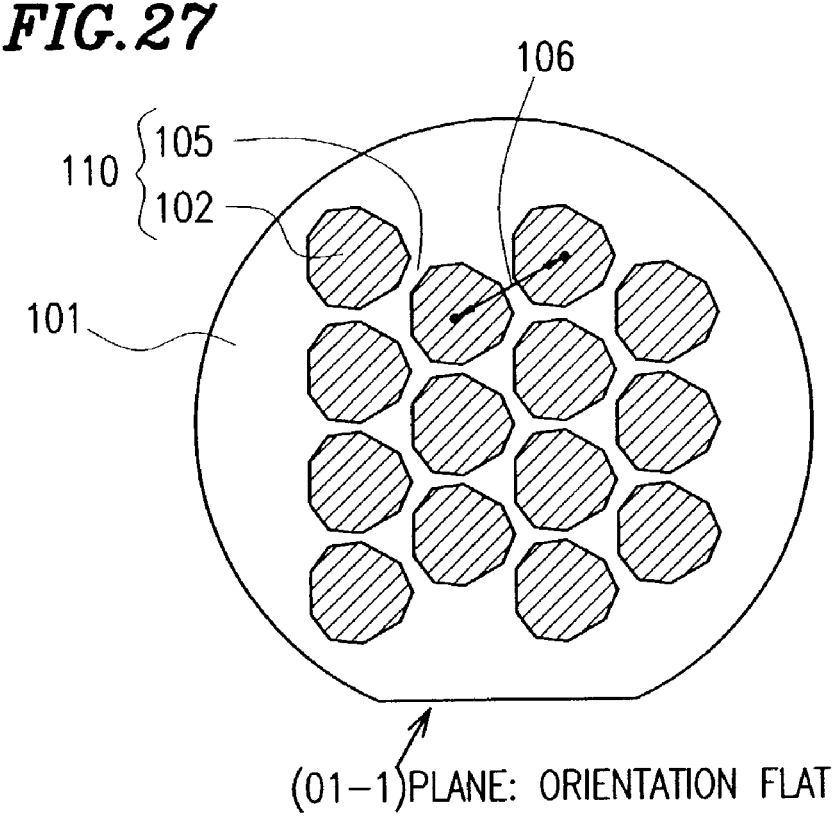
FIG. 27 is a plan view illustrating an etching mask layer, including nonagonal masking elements, according to the fourth preferred embodiment.

In the mask layer 110 shown in FIG. 27, each of the masking elements 102 thereof has a planar shape of a nonagon that includes edges that are parallel to the (100), (010) and (001) planes of the single crystalline substrate 101. The masking elements 102 are spaced apart from each other. Also, the median point (or the center) of each masking element 102 is substantially located at a honeycomb lattice point.

Figure 28:
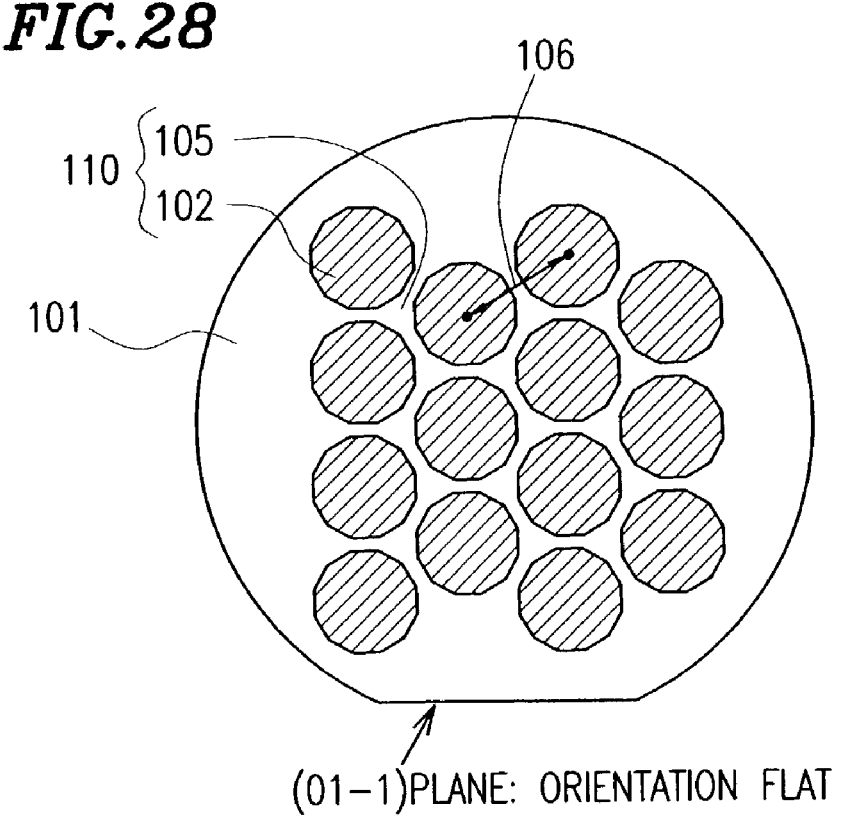
FIG. 28 is a plan view illustrating an etching mask layer, including dodecagonal masking elements, according to the fourth preferred embodiment.

In the mask layer 110 shown in FIG. 28, each of the masking elements 102 thereof has a planar shape of a dodecagon that includes edges that are parallel to the (100), (010), (001), (11-1), (1-11) and (-111) planes of the single crystalline substrate 101. The masking elements 102 are spaced apart from each other. Also, the median point (or the center) of each masking element 102 is substantially located at a honeycomb lattice point.

Figure 29:
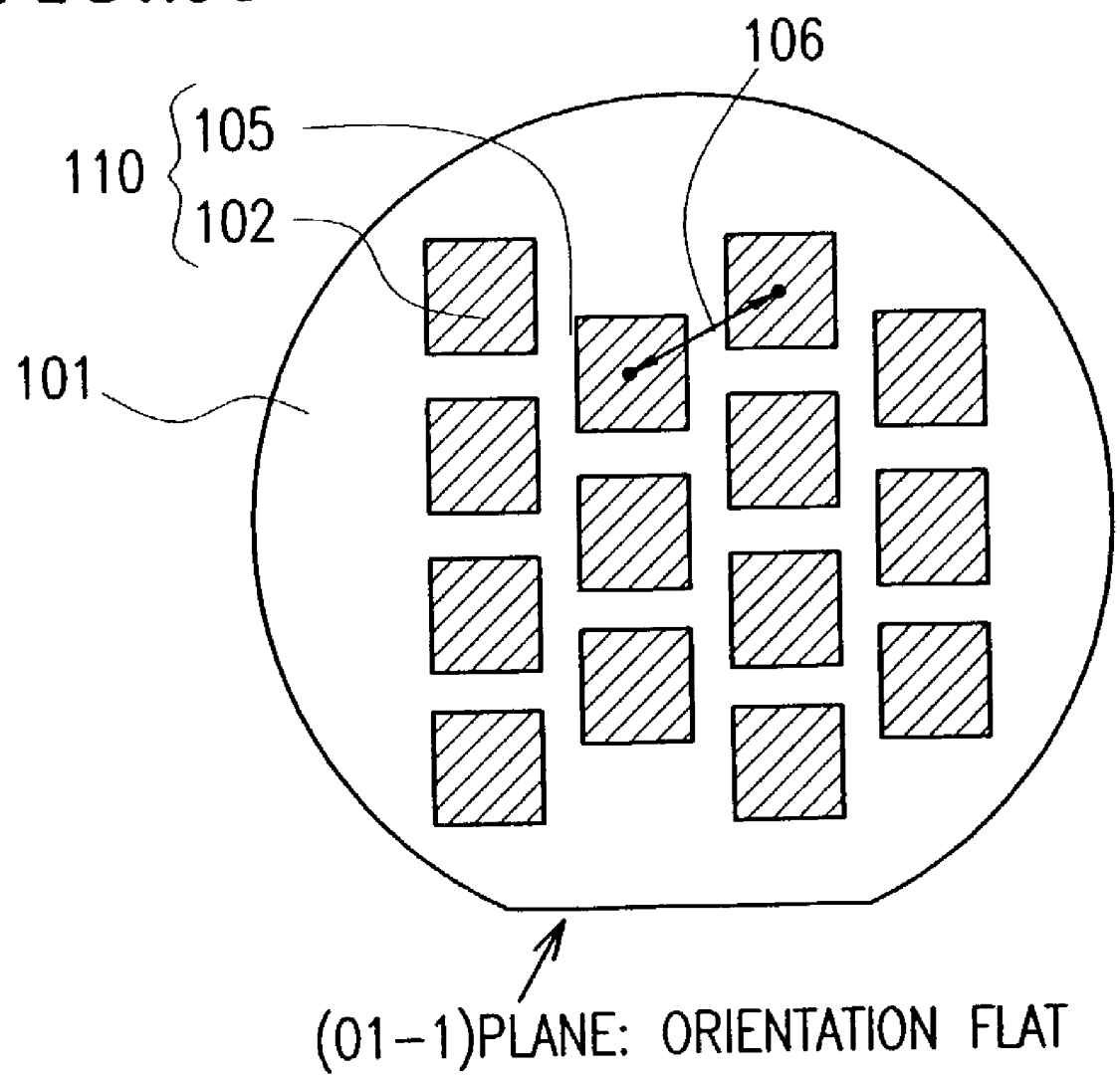
FIG. 29 is a plan view illustrating an etching mask layer, including square masking elements, according to the fourth preferred embodiment.

In the mask layer 110 shown in FIG. 29, each of the masking elements 102 thereof has a square planar shape. The median point (or the center) of each masking element 102 is also substantially located at a honeycomb lattice point.

When the substrate 101 was etched anisotropically by using the mask layers 110 having the respective patterns shown in FIGS. 21 through 29, the following results were obtained.

No matter which of the etching mask layers 110 shown in FIGS. 21 through 29 is used, each vertex of convex portions (i.e., the highest-level point) of a micro corner cube array is formed at the center of its associated masking element 102. As described above, the center of each masking element 102 in each of these mask layer 110 is substantially located at a honeycomb lattice point. Thus, each of the highest-level points of the micro corner cube array is formed on the honeycomb lattice point. Accordingly, it can be seen that the center of each masking element 102 in each mask layer 110 preferably corresponds to a vertex of a micro corner cube array to be formed (i.e., a honeycomb lattice point). Also, the size of the micro corner cubes is controlled in accordance with the pitch 106 defined as a distance between the centers of two adjacent masking elements 102. Consequently, it can be seen that if an appropriate pattern is selected for the etching mask layer 100, then micro corner cubes of a desired size can be obtained.

Figure 30:
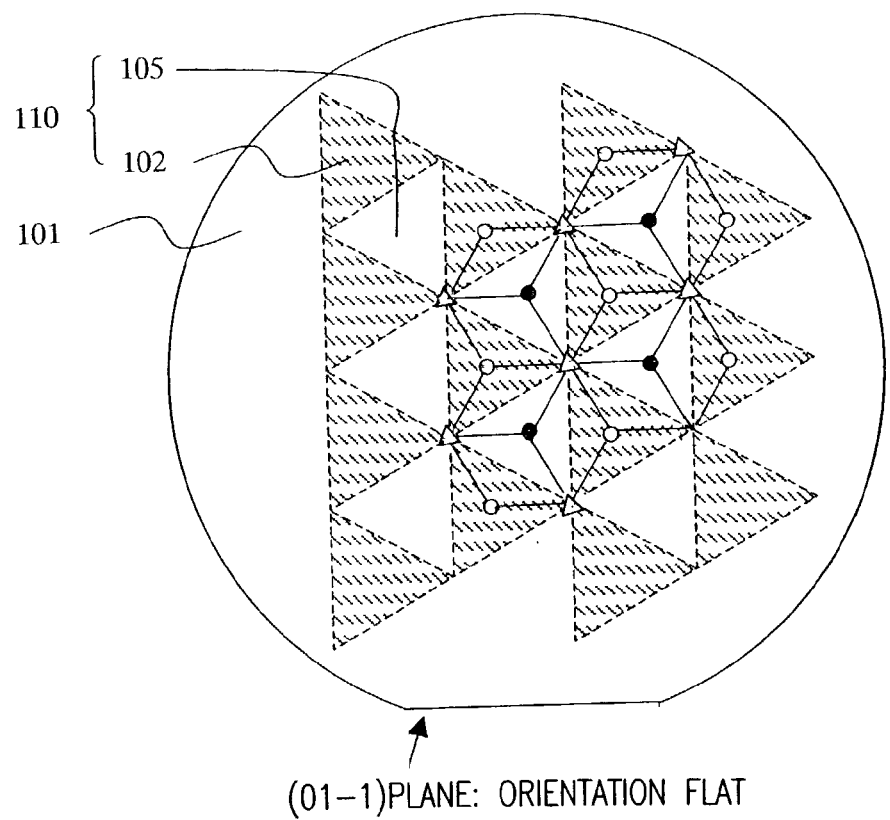
FIG. 30 is a plan view illustrating a micro corner cube array that has been formed by using the mask layer shown in FIG. 21.
Figure 31:
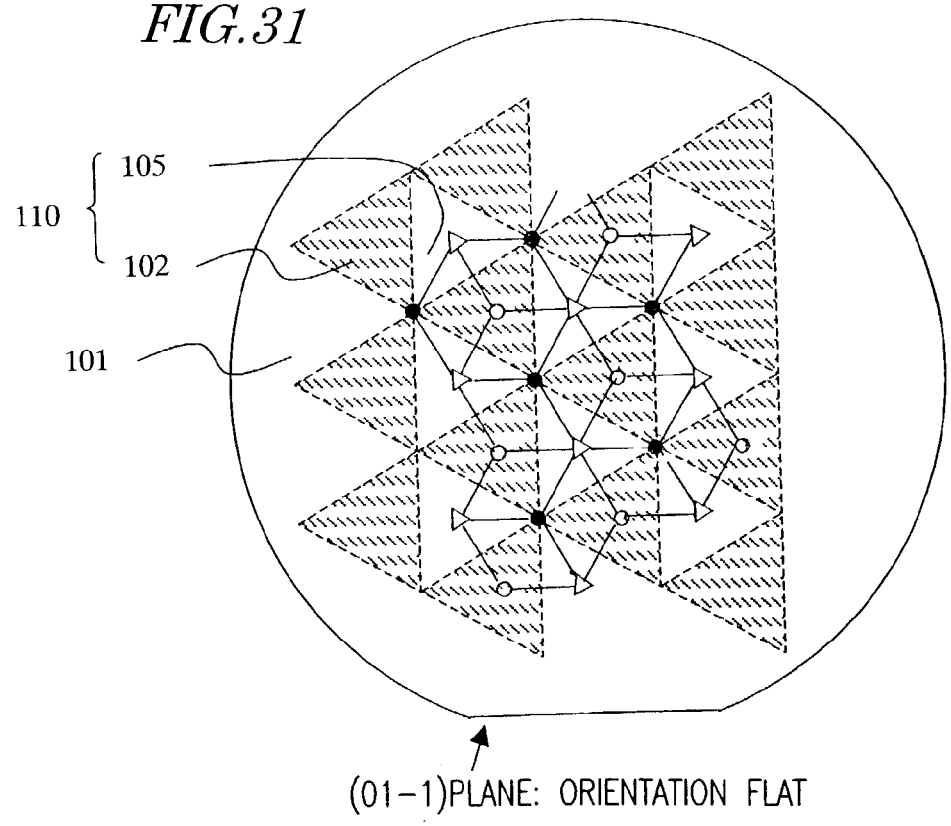
FIG. 31 is a plan view illustrating a micro corner cube array that has been formed by using the mask layer shown in FIG. 22.

FIGS. 30 and 31 illustrate two micro corner cube arrays to be formed by using the etching mask layers 110 shown in FIGS. 21 and 22, respectively. In FIGS. 30 and 31, the open circles ○ indicate the highest-level points (i.e., the vertices of convex portions) of the micro corner cubes, the solid circles ● indicate the lowest-level points (i.e., the vertices of concave portions) of the micro corner cubes, and the triangles Δ indicate intermediate-level points. As can be seen from FIGS. 30 and 31, no matter which of the etching mask layers 110 shown in FIGS. 21 and 22 is used, the highest-level point ○ of each micro corner cube is located at the median point of its associated masking element 102. However, each micro corner cube is made up of the (100), (010) and (001) planes. Thus, when the mask layer 110 shown in FIG. 21 is used, the center of each opening 105 thereof corresponds to the lowest-level point ● of its associated corner cube. On the other hand, when the mask layer 110 shown in FIG. 22 is used, the center of each opening 105 thereof corresponds to an intermediate-level point Δ of its associated corner cube.

Figure 32A:
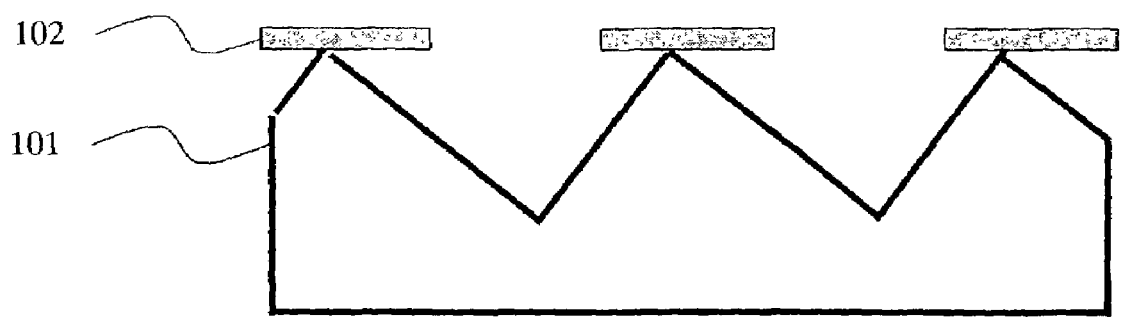
FIGS. 32A and 32B illustrate how the shape of concave portions changes with the etch time in the fourth preferred embodiment.
Figure 32B:
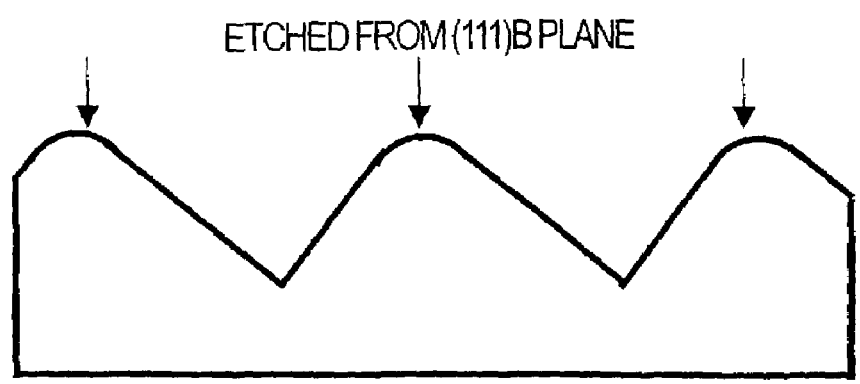

Also, no matter which of the etching mask layers 110 is used, if the etching process is performed for about 3 minutes, each vertex of the resultant micro corner cube array is sharpened as shown in FIG. 32A. However, if the etching process is performed for about 5 minutes, each vertex of the resultant micro corner cube array is rounded as shown in FIG. 32B. The reason is as follows. As the etching process advances, the contact area between the {111}B planes of the GaAs single crystalline substrate 101 (i.e., the surface of the substrate) and the masking elements 102 decreases gradually. And when the masking elements 102 are no longer in contact with the surface of the substrate, the {111}B planes start to be etched from the vertices. As a result, the vertices of the corner cubes are rounded.

Thus, the present inventors discovered that the etching process should preferably be stopped when the masking elements 102 are no longer in contact with the {111}B planes of the GaAs single crystalline substrate 101 (i.e., when the contact area between them is minimized). To stop the etching process when the contact area between the {111}B planes and the masking elements is minimized, the optimum etch time needs to be obtained beforehand via experiments, for example. If the etch time is optimized in this manner, then a micro corner cube array having the desired sharpened vertices can be obtained.

The present inventors also discovered that depending on the type of the etchant used, sometimes it is preferable to reduce the area of the openings 105 of the etching mask layer 110. This is because if the ratio of the etch rate of the {111}B planes to that of the {100} planes (i.e., the (111)B/(100) etch selectivity described above) is not sufficiently high, then the etching process may advance so as to leave a planar bottom inside each of the openings 105. That is to say, to obtain a micro corner cube array in a desired shape, the greater the area of each opening 105 of the etching mask layer 110, the higher the etch selectivity should be. In other words, the smaller the area of each opening 105 of the etching mask layer 110, the lower the etch selectivity may be. Accordingly, if the area of each opening 105 of the etching mask layer 110 is small, the etching condition may be less strict.

For example, let us consider three situations where the etching mask layers 110 shown in FIGS. 23, 24 and 25 were respectively used. Specifically, when the etching mask layer 110 shown in FIG. 23 or 24, in which the total area of the masking elements 102 accounted for more than 50% of the total, was used, a micro corner cube array having a desired shape could be obtained. However, when the etching mask layer 110 shown in FIG. 25, in which the total area of the masking elements 102 accounted for approximately 50% of the total, was used, a micro corner cube array having a desired shape could not be obtained but had planar bottoms. Thus, the present inventors discovered that the total area of the masking elements 102 preferably accounts for more than 50% of the entire etching mask layer 110, i.e., the total area of the masking elements 102 is preferably greater than that of the openings 105.

Next, it will be described how the shapes of the resultant micro corner cube arrays were different between the two situations where the etching mask layers 110 shown in FIGS. 21 and 29 were respectively used. The present inventors discovered that a good micro corner cube array could be formed no matter which of these mask layers 110 was used. However, when the present inventors estimated the plane precisions (or the planarities) of corner cubes in these two types of arrays by electron microscopy, we discovered that the array obtained by using the mask layer 110 shown in FIG. 21 showed higher plane precision than the array obtained by using the mask layer 110 shown in FIG. 29. The micro corner cube array to be formed has a planar shape that is symmetrical about a three-fold rotation axis. Accordingly, each of the masking elements 102 (or openings 105) of the mask layer 110 to be used also preferably has a planar shape that is symmetrical about a three-fold rotation axis.

Next, it will be described how the shapes of the resultant micro corner cube arrays were different between the two situations where the etching mask layers 110 shown in FIGS. 21 and 22 were respectively used. The present inventors discovered that a good micro corner cube array could be formed no matter which of these mask layers 110 was used. However, when the present inventors estimated the plane precisions (or the planarities) of corner cubes in these two types of arrays by electron microscopy, we discovered that the array obtained by using the mask layer 110 shown in FIG. 21 showed higher plane precision than the array obtained by using the mask layer 110 shown in FIG. 22. However, we also discovered that when the mask layer 110 shown in FIG. 21 was used, unnecessary vertices (of convex portions) were formed here and there on the surface of the substrate under the overlap portions 107 between the masking elements 102. Accordingly, to make a large number of corner cubes of a desired shape uniformly over a wide area, when the etching mask layer 110 having the pattern shown in FIG. 21 is used, the mask layer 110 should have a higher shape precision compared to using the etching mask layer 110 having the pattern shown in FIG. 22.

On the other hand, when the mask layers 110 shown in FIGS. 23 through 29, having no overlap portions 107 between the masking elements 102, were used, no unnecessary convex portions were formed on the surface of the substrate. Thus, it was discovered that those unnecessary convex portions were formed due to the existence of the overlap portions 107 between the masking elements 102. In other words, the present inventors discovered that the masking elements 102 are preferably spaced apart from each other in the etching mask layer 110.

As described above, by selecting an etching mask layer having an appropriate pattern for the etching process, the shape precision of the resultant micro corner cube array can be increased. Also, by defining the median point of each masking element in the etching mask layer appropriately, the vertex locations and the size of the resultant micro corner cube array can be determined just as intended.

EMBODIMENT 5

Hereinafter, a fifth specific preferred embodiment of the present invention will be described. The fifth preferred embodiment relates to a reflective type liquid crystal display device that uses, as a retroreflector, a micro corner cube array that has been made by any of the methods described for the first through fourth preferred embodiments of the present invention.

FIG. 9 illustrates a configuration for a reflective type liquid crystal display device 100 according to the fifth preferred embodiment. As shown in FIG. 9, this liquid crystal display device 100 includes a pair of substrates 8 and 9 and a scattering type liquid crystal layer 6, which is provided as a light modulating layer between the substrates 8 and 9. The substrate 8 is located closer to the observer, while the substrate 9 is provided so as to face the substrate 8. These two substrates 8 and 9 are both made of a transparent material and may be glass plates or polymer films, for example.

On one surface of the substrate 8 that is opposed to the liquid crystal layer 6, a color filter layer 7, including R, G and B color filters, and a transparent electrode 12 are stacked in this order. On the other hand, on one surface of the substrate 9 that is opposed to the liquid crystal layer 6, a micro corner cube array 10 is provided. This micro corner cube array 10 is covered with a reflective electrode 11, which is made of a material with a high surface reflectivity (e.g., silver or aluminum) and has a substantially uniform thickness. The reflective electrode 11 may be formed so as to come into tight contact with the rugged surface of the micro corner cube array 10 by depositing silver to a thickness of about 200 nm by an evaporation process, for example. The reflective electrode 11 serves not only as reflective planes for reflecting the incoming light back to its source but also as an electrode for applying a voltage to the liquid crystal layer 6.

The liquid crystal display device 100 having such a configuration displays an image thereon by controlling the light modulating states of the liquid crystal layer 6 on a pixel-by-pixel basis with a voltage applied from the transparent electrode 12 and reflective electrode 11 to the liquid crystal layer 6. The voltage applied to the electrodes 11 and 12 may be controlled either by known active components such as thin-film transistors or by any other device.

In the preferred embodiment illustrated in FIG. 9, the micro corner cube array 10 is formed on the substrate 9. Alternatively, the micro corner cube array 10 itself may be used as a substrate without providing the substrate 9. As already described for the first preferred embodiment, the micro corner cube array 10 may be formed of a GaAs substrate. When a GaAs substrate is used, a circuit for driving the active components and other circuits may be formed on the same substrate around the display area thereof, for example. If the driver circuit and other circuits can be formed on the same substrate, then the overall size of the display device can be reduced. Thus, such a display device is effectively applicable to a cell phone, for example.

In this preferred embodiment, the scattering type liquid crystal layer 6 is made of a polymer-dispersed liquid crystal material. However, the material of the liquid crystal layer 6 is not limited thereto, but may also be any other scattering type liquid crystal material such as a nematic-cholesteric phase change type liquid crystal material or a liquid crystal gel. Furthermore, the liquid crystal layer 6 may also be made of any of various other liquid crystal materials as long as the material allows the liquid crystal layer 6 to switch between a mode to transmit the incoming light and a mode to scatter the light at least. Specifically, examples of other usable liquid crystal materials include: a cholesteric liquid crystal material, which can switch between transmitting and reflecting states and to which diffusion properties are imparted by controlling the domain sizes of liquid crystal molecules; and a polymer-dispersed liquid crystal material with a holographic function, which switches between transmitting and reflecting states and to which diffusion properties are imparted by exposing the material to diffusing radiation.

The polymer-dispersed liquid crystal material used in this preferred embodiment is obtained by preparing a mixture of a low-molecular-weight liquid crystal composition and an unpolymerized prepolymer in a miscible state, injecting the mixture into the gap between the substrates and then polymerizing the prepolymer. Any type of polymer-dispersed liquid crystal material may be used so long as the material is obtained by polymerizing a prepolymer. In this preferred embodiment, a mixture of a UV-curing prepolymer with liquid crystal properties and a liquid crystal composition is photo-cured by being exposed to an active ray such as an ultraviolet ray, and the cured mixture (i.e., a UV-cured liquid crystal material) is used as the polymer-dispersed liquid crystal material. If such a UV-cured liquid crystal material is used as the polymer-dispersed liquid crystal material, the polymerizable liquid crystal material may be polymerized without being heated. Thus, other members of the liquid crystal display device are not affected by the heat generated.

The prepolymer-liquid crystal mixture may be obtained by adding a small amount of polymerization initiator (produced by Ciba-Geigy Corporation, for example) to a mixture of a UV-curing material and a liquid crystal composition that have been mixed at a weight ratio of about 20:80, for example. The prepolymer-liquid crystal mixture obtained in this manner exhibits a nematic liquid crystal phase at room temperature. On entering a liquid crystal layer made of such a material, the incoming light is modulated in accordance with the mode (i.e., scattering or transmitting mode) of the liquid crystal layer that changes with the voltage applied thereto. In this preferred embodiment, the liquid crystal layer exhibits the scattering state when no voltage is applied thereto and the transmitting state when a voltage is applied thereto.

Hereinafter, it will be described specifically how the reflective type liquid crystal display device 100 operates.

First, the operation of the display device 100 in a white display mode will be described. In the white display mode, the liquid crystal layer 6 is controlled to exhibit the scattering state. Thus, externally incoming light is scattered by the liquid crystal layer 6 after having been transmitted through the substrate 8 and the color filter layer 7. In this case, portion of the incoming light, which has been backscattered by the liquid crystal layer 6, returns to the observer. Also, in the display device of this preferred embodiment, another portion of the incoming light that has been transmitted straight through the liquid crystal layer 6 and still another portion of the incoming light that has been forward scattered by the liquid crystal layer 6 are reflected by the reflective electrode 11 on the micro corner cube array 10. The reflected portions of the light are scattered again by the liquid crystal layer 6 in the scattering state while passing through the liquid crystal layer 6. As a result, a portion of the scattered light returns to the observer. In this manner, in the white display mode, not only the backscattered light but also a portion of the forward scattered light return to the observer, thus realizing a display of a highly bright image.

Next, the operation of the display device 100 in a black display mode will be described. In the black display mode, the liquid crystal layer 6 is controlled to exhibit a transmitting state by being supplied with a voltage. In such a situation, externally incoming light is transmitted through the substrate 8, color filter layer 7 and liquid crystal layer 6. The light that has been transmitted through the liquid crystal layer 6 is retro-reflected by the reflective electrode 11 on the micro corner cube array 10. That is to say, before entering the eyes of the observer who is watching an image on the display, the incoming light is refracted by the substrate 8 and liquid crystal layer 6, retro-reflected from the micro corner cube array 10 and then refracted by the liquid crystal layer 6 and substrate 8 again. Thus, only the light that has come from the vicinity of the observer's eyes goes out of this display device 100 toward the observer. In this case, if the vicinity of the observer's eyes is too narrow a region to allow any light source to be present there (i.e., if that region is smaller in area than the observer's pupil), then a good black display is realized.

Figure 10A:
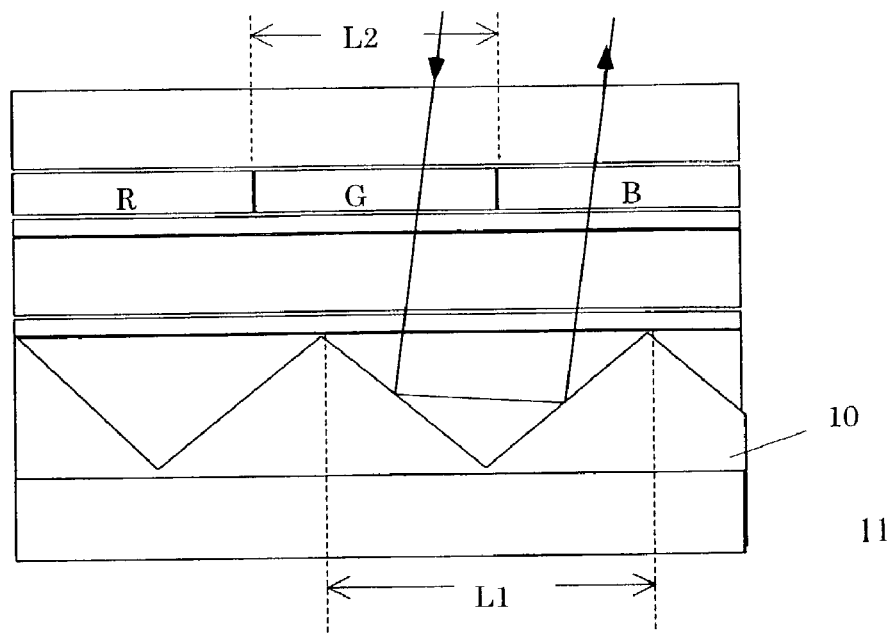
FIGS. 10A and 10B are cross-sectional views illustrating how color mixture may occur depending on the pitch of unit elements of a micro corner cube array in the reflective type liquid crystal display device of the fifth preferred embodiment.

As described above, the light that has been incident onto the micro corner cube array 10 is reflected back in the direction that is precisely opposite to the direction in which the incoming light has traveled. However, the retro-reflected outgoing light ray is slightly shifted horizontally (or translated) from the incoming light ray. The shift is approximately equal to the size (or pitch) of each unit element of the micro corner cube array 10. Accordingly, if the size L1 of each unit element of the micro corner cube array 10 is greater than the size L2 of each picture element region as shown in FIG. 10A, then the color of a color filter that the incoming light ray passes (e.g., green (G) in the example illustrated in FIG. 10A) is different from that of a color filter that the outgoing light ray passes (e.g., blue (B) in the example illustrated in FIG. 10A), thus causing a color mixture unintentionally.

Figure 10B:
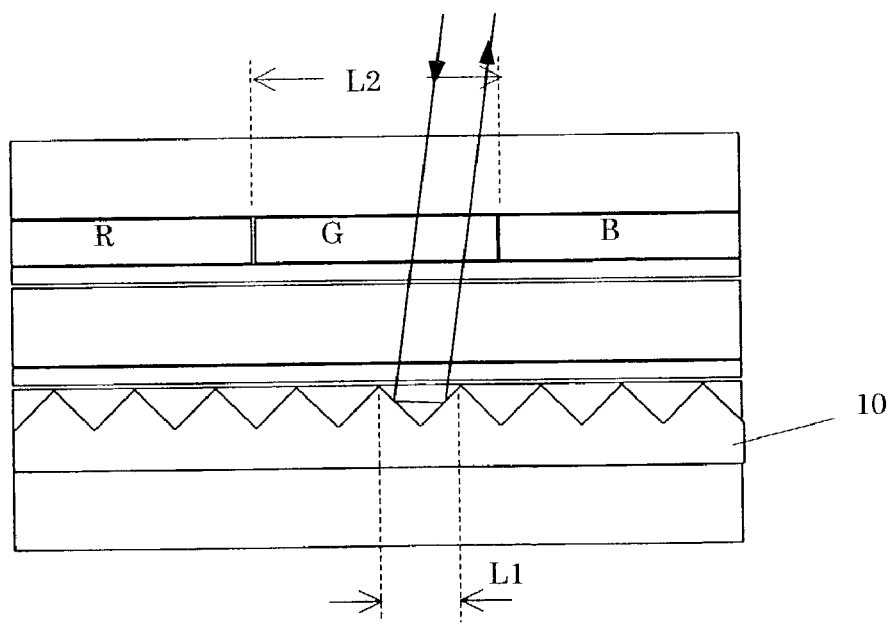

On the other hand, if the size L1 of each unit element of the micro corner cube array 10 is smaller than the size L2 of each picture element region as shown in FIG. 10B, then the color of a color filter that the incoming light ray passes (e.g., green (G) in the example illustrated in FIG. 10B) is the same as that of the color filter that the outgoing light ray passes, thus causing no color mixture. Accordingly, to display an image in desired colors, the size L1 of each unit element of the micro corner cube array 10 needs to be smaller than the size L2 of each picture element region. In the micro corner cube array 10 for use in this preferred embodiment, the size of each unit element (e.g., about 10 μm) is defined sufficiently smaller than a normal size of a picture element region (e.g., several tens μm) as already described for the first and second preferred embodiments. Thus, an image can be appropriately displayed in desired colors.

Next, the retro-reflectivity of a light ray that has been incident straight onto a corner cube consisting of three rectangular isosceles triangular planes will be compared with that of a light ray that has been incident straight onto a corner cube consisting of three square planes. It should be noted that when a light ray is incident onto a point of a corner cube, the light ray is reflected back in the opposite direction from a point which is symmetric to the point of incidence with respect to the center of the corner cube. This is a necessary and sufficient condition for a corner cube.

Figure 11A:
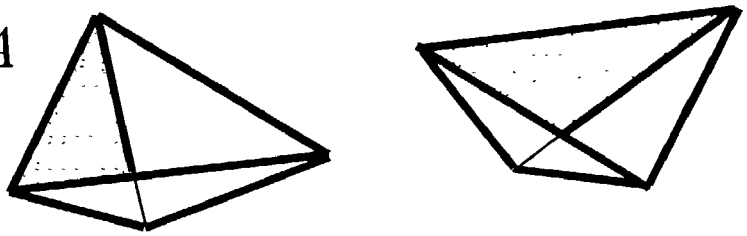
FIG. 11A illustrates perspective views of a corner cube consisting of three rectangular isosceles triangular planes.
Figure 11B:
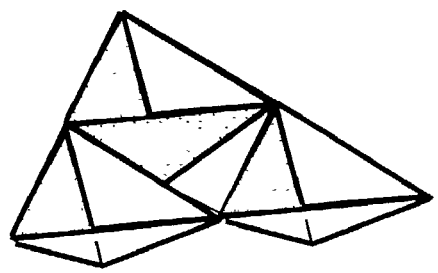
FIGS. 11B and 11C are respectively a perspective view and plan views illustrating an array of such corner cubes.
Figure 11C:
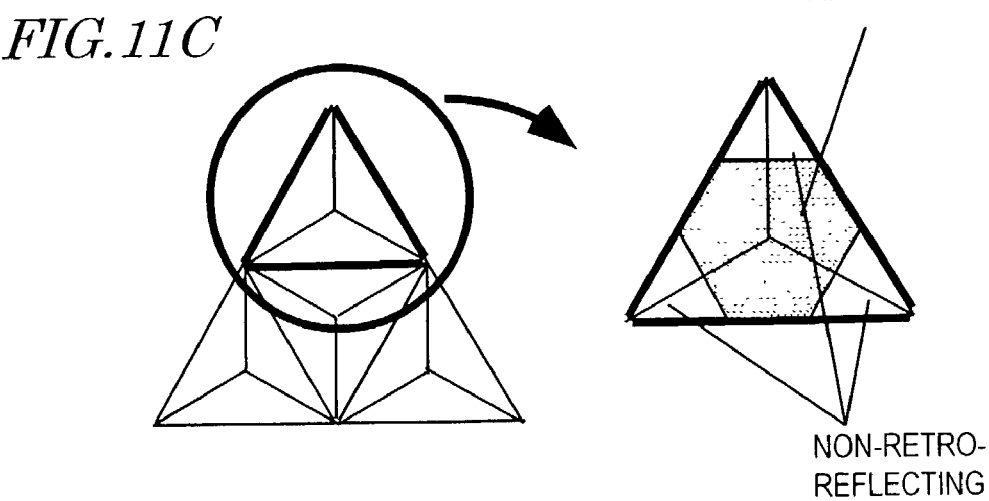

FIGS. 11A through 11C illustrate a situation where each corner cube consists of three rectangular isosceles triangular planes. Specifically, FIG. 11A illustrates corner cubes, while FIGS. 11B and 11C illustrate an array of corner cubes. In the situation where each corner cube consists of three rectangular isosceles triangular planes, when those three constituent planes are projected onto a reference plane, the projection has an equilateral triangular shape as shown in FIG. 11C. In that case, if a light ray is incident onto a point of the corner cube near one of the vertices of the equilateral triangle, then the light ray is not retro-reflected because inside the corner cube, there is no point that is symmetric to the point of incidence with respect to the center of the corner cube. Accordingly, the retro-reflectivity is at most about 66%.

Figure 12A:
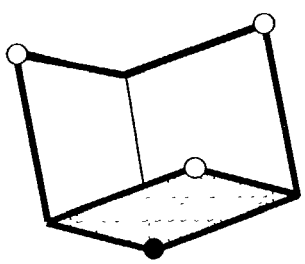
FIG. 12A is a perspective view illustrating a corner cube consisting of three square planes.
Figure 12B:
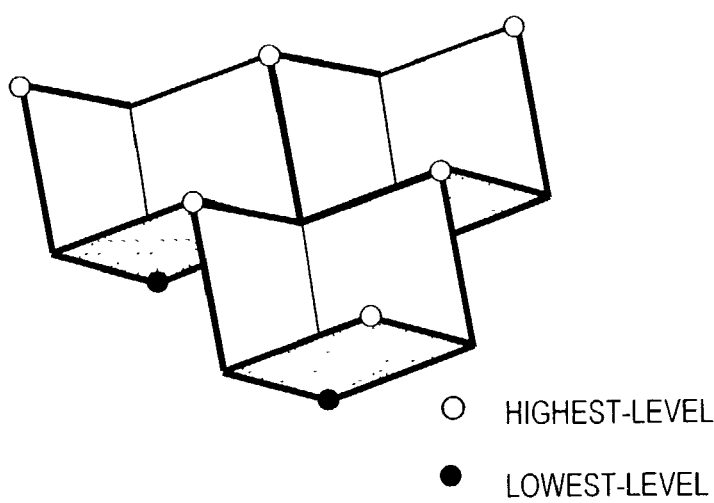
FIGS. 12B and 12C are respectively a perspective view and plan views illustrating an array of such corner cubes.
Figure 12C:
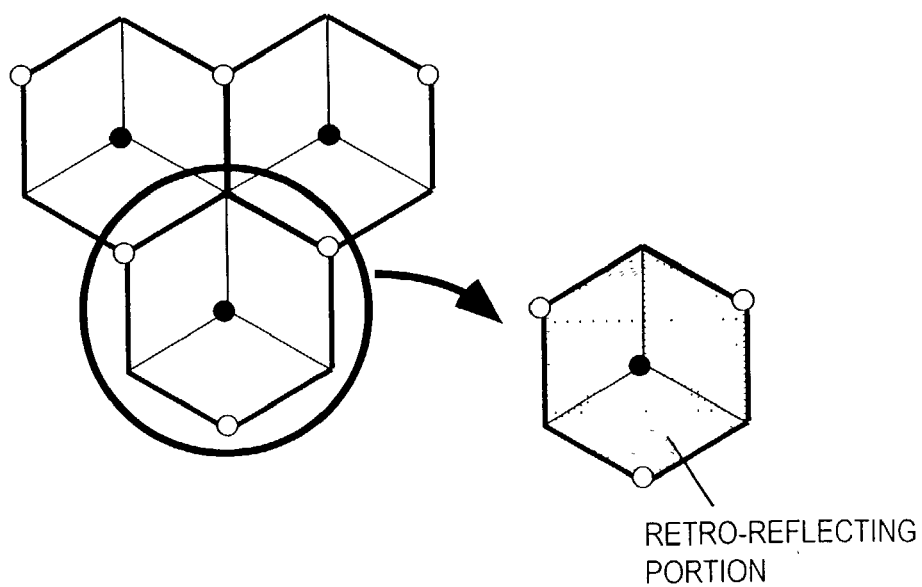

On the other hand, FIGS. 12A through 12C illustrate a situation where each corner cube consists of three square planes. Specifically, FIG. 12A illustrates a corner cube, while FIGS. 12B and 12C illustrate an array of corner cubes. In the situation where each corner cube consists of three square planes, when those three constituent planes are projected onto a reference plane, the projection has a rectangular hexagonal shape as shown in FIG. 12C. In that case, no matter where the light ray is incident, each and every point of incidence has a point symmetric with respect to the center of the corner cube. Accordingly, a light ray that has been incident onto any point of the rectangular hexagon is always retro-reflected. Thus, it can be seen that to get an incoming light ray retro-reflected as intended, each of the micro corner cubes in an array preferably consists of square planes and the projection of the constituent planes on a reference plane preferably has a rectangular hexagonal shape.

In the micro corner cube array for use in this preferred embodiment, each unit element thereof includes three substantially square planes, defined by {100} planes of cubic single crystals, as already described for the first and second preferred embodiments. Thus, the micro corner cube array can retro-reflect the incoming light just as intended. That is to say, in the black display mode, the observer senses no unwanted light. As a result, an appropriate dark display is realized and the contrast ratio increases.

Figure 13:
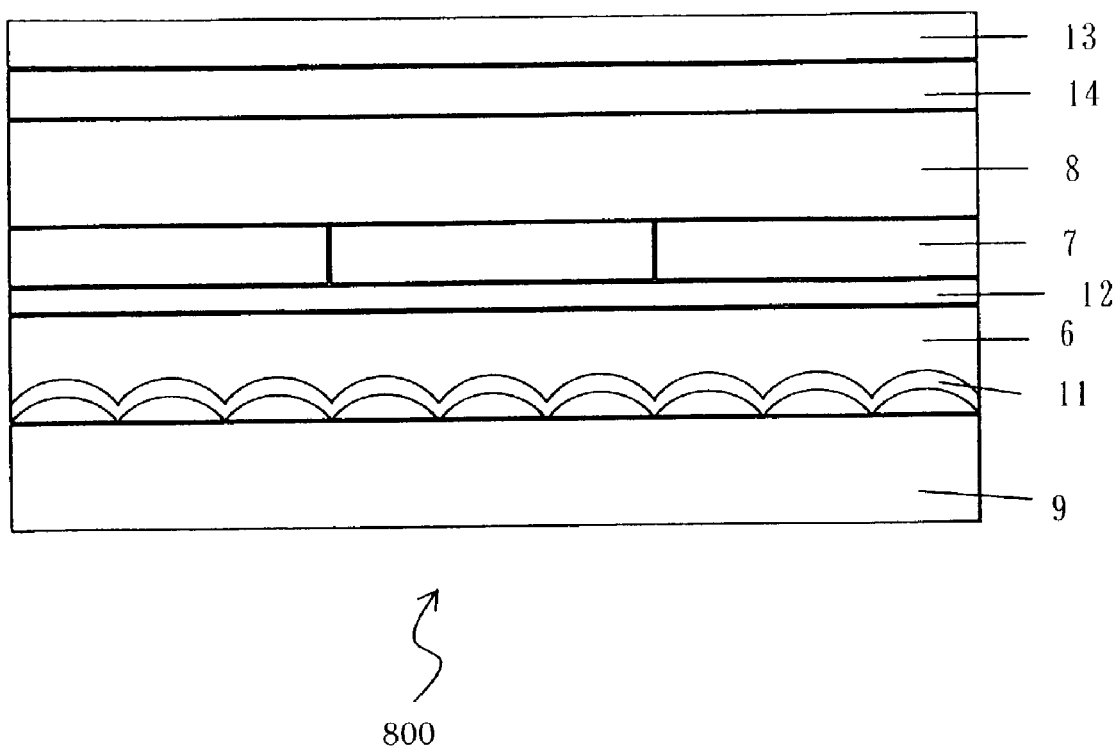
FIG. 13 is a cross-sectional view illustrating, as a comparative example, a configuration for a conventional reflective type liquid crystal display device.

The present inventors measured the reflectivities and contrast ratios of the reflective type liquid crystal display device 100 including the micro corner cube array 10 of this preferred embodiment and a comparative reflective type liquid crystal display device 800 including no micro corner cube array as shown in FIG. 13. Specifically, the reflective type liquid crystal display device 800 as a comparative example uses a scattering reflector 11 instead of the micro corner cube array 10. Accordingly, while the liquid crystal layer 6 thereof is in the transmitting state, light that has been emitted from a light source distant from the observer may also be reflected toward the observer. Thus, this display device 800 further includes a polarizer 13 and a phase plate 14 in front of the substrate 8 to absorb the unwanted reflected light and realize a good display of color black. It should be noted that the other members (e.g., the liquid crystal layer 6 and color filter layer 7) of the display device 800 are the same as the counterparts of the display device 100.

Figure 14:
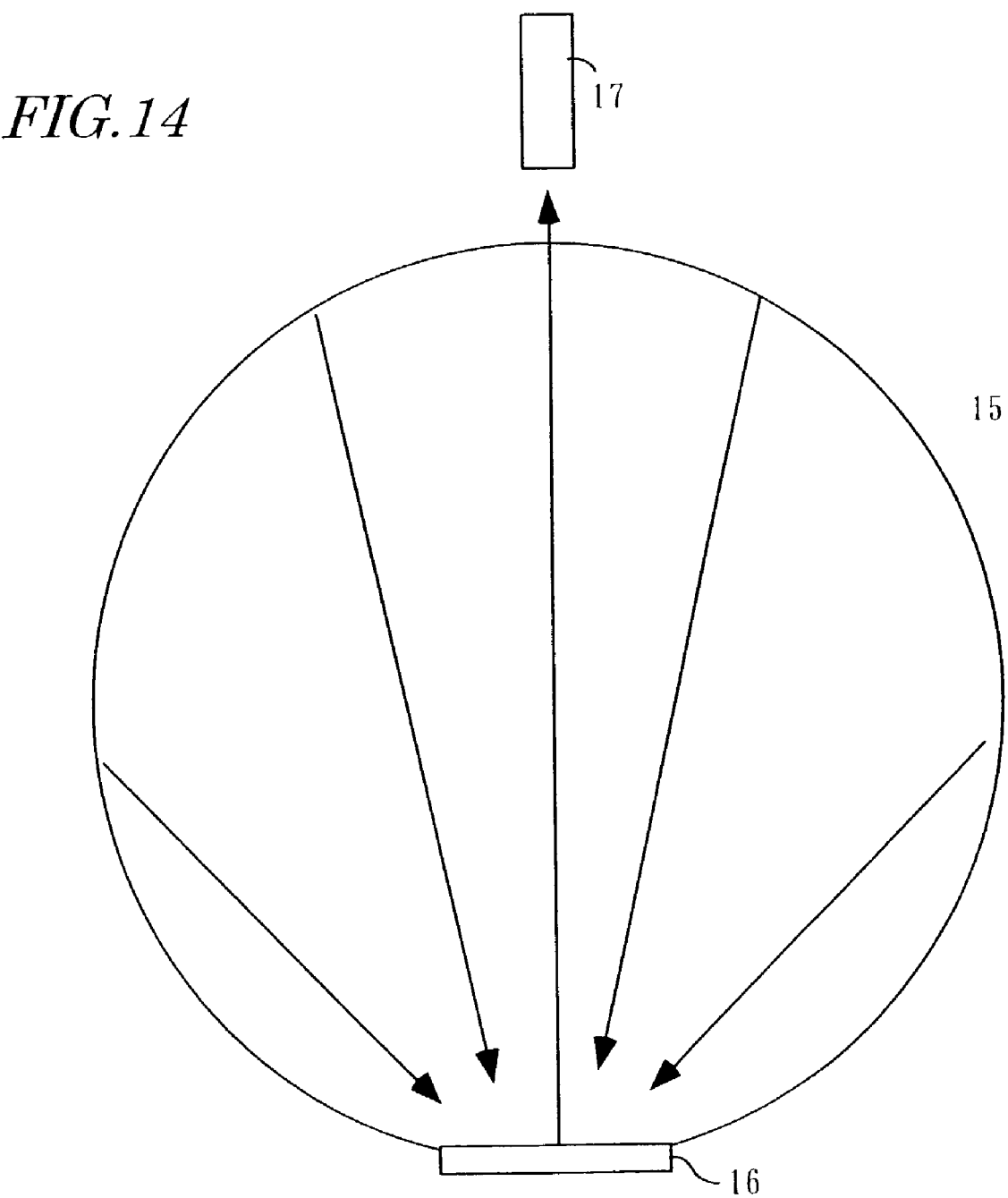
FIG. 14 illustrates an arrangement for an apparatus for measuring the reflectivity of a reflective type liquid crystal display device.

The reflectivity and contrast ratio of each of these display devices 100 and 800 were measured by using an apparatus such as that shown in FIG. 14. As shown in FIG. 14, this apparatus is constructed so that diffused light is emitted from an integrating sphere 15 toward a sample 16 (i.e., the display device 100 or 800) and that the light reflected from the sample 16 is received at a photodetector 17 disposed in front of the sample 16. The results are shown in the following Table 1:

TABLE 1

|                    | Reflectivity (%) in white display | Contrast ratio |
|--------------------|-----------------------------------|----------------|
| Display device 100 | 28                                | 23             |
| Display device 800 | 15                                | 25             |

As can be seen from these results, the liquid crystal display device 100 of this preferred embodiment, which uses the micro corner cube array 10 instead of the polarizer 13 or phase plate 14, can display a bright image at a relatively high contrast ratio and with good visibility.

EMBODIMENT 6

Hereinafter, a sixth specific preferred embodiment of the present invention will be described. The sixth preferred embodiment relates to an organic electroluminescence (EL) display device (i.e., a self-light-emitting display device) that includes a micro corner cube array according to the first or second preferred embodiment of the present invention described above.

Figure 15:
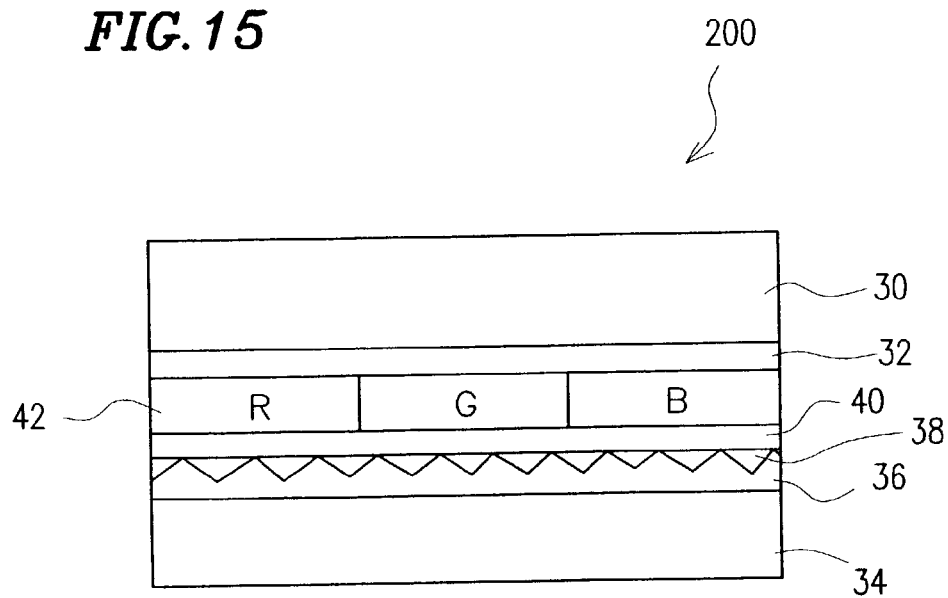
FIG. 15 is a cross-sectional view illustrating a configuration for an organic EL display device according to a sixth specific preferred embodiment of the present invention.

FIG. 15 illustrates a configuration for an organic EL display device according to this preferred embodiment. As shown in FIG. 15, the organic EL display device 200 includes upper and lower substrates 30 and 34 and an organic EL layer 42 provided between the substrates 30 and 34. The upper substrate 30 may be made of a transparent material such as glass or a polymer film. The lower substrate 34 is disposed so as to face the upper substrate 30. The organic EL layer 42 is made up of a plurality of thin films including hole injected layer, hole transporting layer, light emitting layer, electron transporting layer and electron injected layer. Also, a cathode (or transparent electrode) 32, made of a transparent conductive material such as indium tin oxide (ITO), is interposed between the organic EL layer 42 and the upper substrate 30. Furthermore, an anode 40 is provided between the organic EL layer 42 and the lower substrate 34. The anode 40 may be made of an aluminum film with a thickness of about 30 nm, for example. When the anode 40 is made of such a thin film, the anode 40 can transmit light.

A micro corner cube array reflector 36, obtained by the method described for the first or second preferred embodiment, is provided on one surface of the lower substrate 34 that is opposed to the organic EL layer 42. Although not shown in FIG. 15, the surface of this micro corner cube array reflector 36 is covered with a reflective film of aluminum, for example. Thus, when a light ray is incident onto this micro corner cube array reflector 36, the light ray is reflected back to its source. The rugged surface of the micro corner cube array reflector 36, covered with the reflective film, is flattened by a transparent flattening member 38. And the anode 40 is located on this flattened surface.

In this organic EL display device 200, when a predetermined voltage is applied to the organic EL layer 42 between the cathode 32 and anode 40, electrons and holes, which have moved from the cathode 32 and anode 40, respectively, are recombined with each other in the organic EL layer 42, thereby causing the organic EL layer 42 to emit luminescence and conducting a display operation as intended. This organic EL layer 42 may be made of any of various known materials by any of various known techniques.

In this organic EL display device 200, when the organic EL layer 42 is emitting no luminescence (i.e., while the display device 200 is in a black display mode), an incoming light ray, which has been externally incident from the vicinity of the observer (e.g., from an electric lamp or the sun) onto this display device 200, is reflected by the micro corner cube array reflector 36 back to the external light source and does not reach the observer's eyes. Thus, the unwanted back reflection of the external light can be prevented and color black can be displayed just as intended.

On the other hand, when the organic EL layer 42 is emitting luminescence (i.e., while the display device 200 is in a white display mode), not only a portion of the luminescence that has been emitted from the organic EL layer 42 toward the observer but also another portion of the luminescence going toward the lower substrate 34 also reach the observer's eyes. This is because the latter portion of the luminescence is retro-reflected by the micro corner cube array reflector 36 toward the observer. Accordingly, the luminescence that has been emitted from the organic EL layer 42 can be utilized more efficiently and color white with high lightness can be displayed just as intended. In addition, even in the white display mode, the unwanted back reflection of the external light, which has been emitted from some light source around the observer, is also avoidable.

In this organic EL display device 200, the size of each unit element in the micro corner cube array reflector 36 is also preferably smaller than the size of each picture element region as in the liquid crystal display device of the fifth preferred embodiment. The organic EL layer 42 of this organic EL display device 200 includes a plurality of light emitting regions that emit luminescence in the three primary colors of red (R), green (G) and blue (B) as shown in FIG. 15. That is to say, these light emitting regions correspond to the picture element regions in the display device 100 of the fifth preferred embodiment described above. If the size of each unit element of the micro corner cube array reflector 36 is smaller than that of each picture element region, then a light ray, which has been emitted from a light emitting region in a predetermined color and then reflected from the micro corner cube array reflector 36, does not pass through an adjacent light emitting region in a different color. Thus, no color mixture is created and decrease in brightness or chromaticity is avoidable.

EMBODIMENT 7

Hereinafter, a seventh specific preferred embodiment of the present invention will be described. The seventh preferred embodiment relates to a method of making a micro corner cube array that has an optical axis tilted away from a normal to the reference plane of a base material. A display device including such a micro corner cube array is disclosed in U.S. Pat. No. 5,182,663 issued to Jones of Raychem Corporation.

First, a GaAs substrate, having a surface tilted away from the (111)B planes of GaAs crystals by about 5 degrees, is prepared. In this preferred embodiment, a GaAs substrate is used as in the first preferred embodiment. Alternatively, a cubic single crystalline substrate made of any other material (e.g., a substrate consisting of germanium single crystals according to the second preferred embodiment) may also be used as long as the substrate has a surface that is tilted away from the {111} planes of the crystals by a predetermined angle (e.g., from about 0 degrees to about 10 degrees).

Next, the GaAs substrate prepared is subjected to the mirror polishing, photoresist pattern definition and wet etching process steps as in the first preferred embodiment, thereby forming multiple corner cubes, each being made up of three {100} planes of the crystals that are opposed substantially perpendicularly to each other (e.g., (100), (010) and (001) planes), on the surface of the substrate. In this manner, a corner cube array is obtained. In this preferred embodiment, however, the GaAs substrate has a surface that is tilted away from {111}B planes of the crystals by about 5 degrees unlike the first preferred embodiment. Accordingly, the angle defined by each of the three planes of each corner cube with the reference plane of the substrate (i.e., the original surface of the substrate yet to be etched) is different from that of the first preferred embodiment. Also, each of the three planes of a corner cube formed in this manner may have a rectangular shape.

When such a single crystalline substrate having a surface that is tilted away from the {111}B planes of the crystals is used, the aspect ratio of each masking element of the etching mask layer (i.e., pattern of the etching mask layer) is preferably changed with the tilt angle. This is because in this preferred embodiment, when a corner cube obtained is viewed from over the substrate, the corner cube does not have the perfectly rectangular hexagonal shape unlike the first preferred embodiment (see FIG. 2D, for example), but may be slightly elongated either vertically or horizontally depending on the tilt angle. Also, where the corner cubes are formed by the method of this preferred embodiment, the median point of each masking element does not have to match with its associated honeycomb lattice point completely but approximately. That is to say, the median points of some masking elements may be slightly shifted from their associated honeycomb lattice points.

If the corner cube array that has been formed in this manner on the surface of the GaAs substrate is coated with a reflective film as already described for the first or second preferred embodiment, then the corner cube array may be used as a retroreflector.

Figure 16:
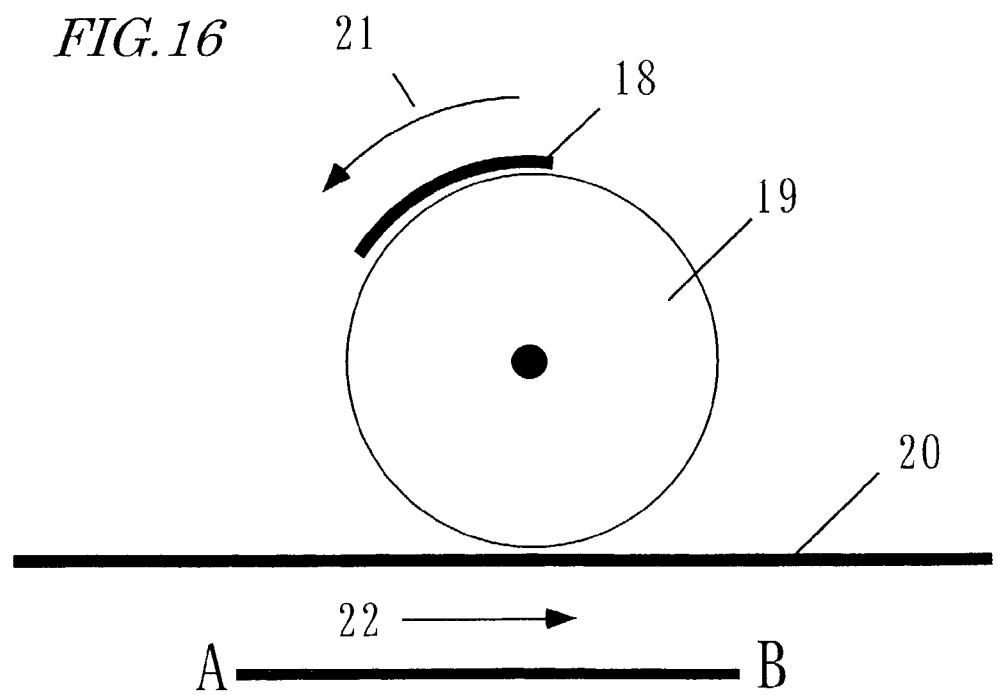
FIG. 16 schematically illustrates the process of making a micro corner cube array by transferring a pattern from a mold onto a resin in accordance with a seventh specific preferred embodiment of the present invention.

In this preferred embodiment, however, the pattern of the micro corner cube array that has been formed on the surface of the GaAs substrate is transferred onto a resin 20 as shown in FIG. 16, thereby making a micro corner cube array of the resin 20. More specifically, first, an electroformed mold 18 is made from the GaAs substrate by a known technique. Next, this electroformed mold 18 is attached onto a roller 19. And then the electroformed mold 18 is rotated by the roller 19 and pressed against the resin 20, thereby transferring the pattern of the micro corner cube array onto the resin 20.

FIG. 16 also shows the direction 21 in which the roller 19 is rotated and the direction 22 in which the resin 20 is transported. In FIG. 16, the line A-B is parallel to the direction 22 in which the resin 20 is transported. As the roller 19 is rotated in the direction 21 and as the resin 20 is transported in the direction 22, the rugged surface of the electroformed mold 18 is pressed against the resin 20 and then the resin 20 is stripped from the electroformed mold 18. The direction in which the resin 20 is stripped from the mold 18 is also parallel to the line A-B.

Figure 17A:
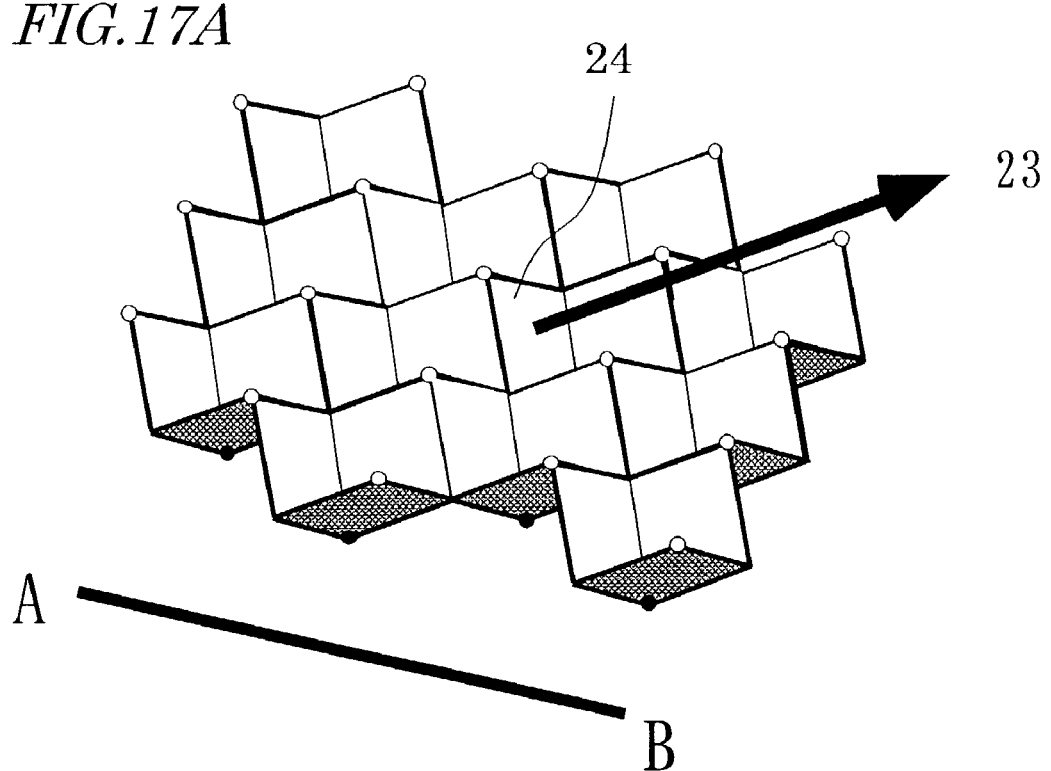
FIGS. 17A and 17B are respectively a perspective view and a plan view illustrating a micro corner cube array obtained by transferring the pattern onto a resin in the seventh preferred embodiment.
Figure 17B:
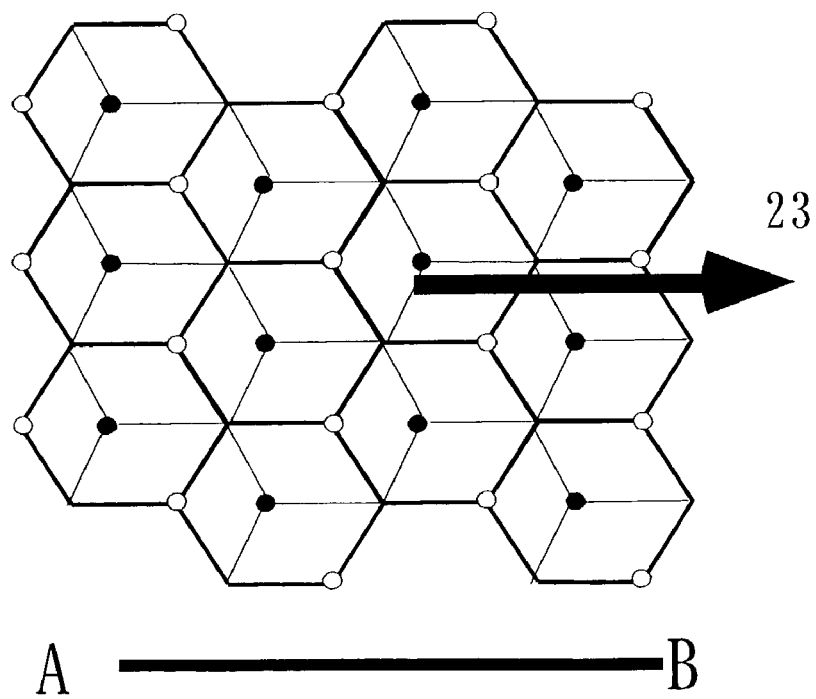

FIGS. 17A and 17B illustrate the micro corner cube array that has been formed (or transferred) onto the surface of the resin 20 by the above-described technique. In FIGS. 17A and 17B, the line A-B indicates the same direction as that shown in FIG. 16. As described above, the resin 20 onto which the pattern of the micro corner cube array has been transferred is stripped along the line A-B. In this preferred embodiment, the resin 20 is stripped in such a manner that the line A-B, along which the resin 20 is stripped, and a normal 23 to one 24 of the three square planes of each corner cube are present within the same plane. That is to say, as can be seen from FIG. 17B, the projection of the normal 23 onto a plane representing the surface of the resin 20 is parallel to the line A-B along which the resin 20 is stripped. In that case, the resin 20 can be stripped and removed more easily compared to a situation where the resin 20 is stripped non-parallelly to the projection of the normal 23 onto the plane representing the resin surface.

To strip the resin 20 in this manner, the pattern of the electroformed mold 18 needs to be transferred onto the resin 20 in such a manner that the line A-B (i.e., the direction 22) along which the resin 20 is transported as shown in FIG. 16 and a normal to one of the three planes of each micro corner cube on the electroformed mold 18 are always present within the same plane (e.g., on the paper of FIG. 16). This positional relationship is easily realizable by adjusting the direction that the electroformed mold 18 being attached onto the surface of the roller 19 faces.

Also, when the electroformed mold 18, which has been made from the GaAs substrate having a surface tilted from the (111)B plane by about 5 degrees, is used as in this preferred embodiment, the resin 20 can be stripped and removed more easily compared to using an electroformed mold made from the GaAs substrate having a surface parallel to the (111)B plane as in the first preferred embodiment.

The micro corner cube array obtained in this manner has its optical axis tilted away from a normal to the reference plane of the substrate. Thus, as for a retroreflector obtained from this micro corner cube array, a range where the incoming light ray can be retro-reflected from the retroreflector appropriately (which will be herein referred to as an "incoming light ray range") is defined around the tilted optical axis. In this case, any light ray going from this incoming light ray range toward the retroreflector is retro-reflected appropriately, whereas a light ray going from outside of this incoming light ray range toward the retroreflector may be retro-reflected inappropriately. Accordingly, where a light source is located above a display device, if the retroreflector is disposed such that its optical axis is tilted from a normal to the panel plane of the display device toward the light source (i.e., upward), then the retroreflector can retro-reflect any light ray coming from the light source. As a result, the display device can display color black even more satisfactorily.

In the preferred embodiment described above, the substrate is supposed to have a surface that is tilted from the {111} planes of the crystals by about 5 degrees. However, the tilt angle of the substrate surface is not limited thereto but may be equal to or greater than about 0 degrees and equal to or smaller than about 10 degrees. The angle defined between the surface of the substrate and the {111} planes is equal to the angle defined by the optical axis of each micro corner cube to be formed with a normal to the substrate surface. In this case, the optical axis of each micro corner cube is defined as a line that is equally distant from the three perpendicularly opposed planes that make up the corner cube. Generally speaking, a micro corner cube exhibits its best retro-reflectivity along its optical axis. In other words, if the optical axis of a micro corner cube is directed toward a light source, then any light ray that has come from the light source onto the micro corner cube is reflected from the micro corner cube right back to the light source. As a result, color black can be displayed just as intended. However, if the optical axis of a micro corner cube is overly tilted from a normal to the substrate surface, then the retro-reflectivity of the micro corner cube is not so good for an observer who is watching the display approximately along the normal to the substrate surface. Then, in the black display mode, the observer may also sense an unnecessary light ray that has been emitted from a light source distant from his or her eyes (or pupils) and then reflected from the micro corner cube back to the observer. In that case, color black might be displayed inappropriately. In view of these considerations, the present inventors carried out experiments to define an appropriate tilt angle range for the optical axis of a corner cube. The results of the experiments revealed that the optical axis of a corner cube preferably has a tilt angle of equal to or greater than about 0 degrees and equal to or smaller than about 10 degrees. Accordingly, to make a corner cube having such an optical axis, a substrate, having a surface that is tilted from the {111} planes by about 0 degrees to about 10 degrees, is preferably used.

Figure 18:
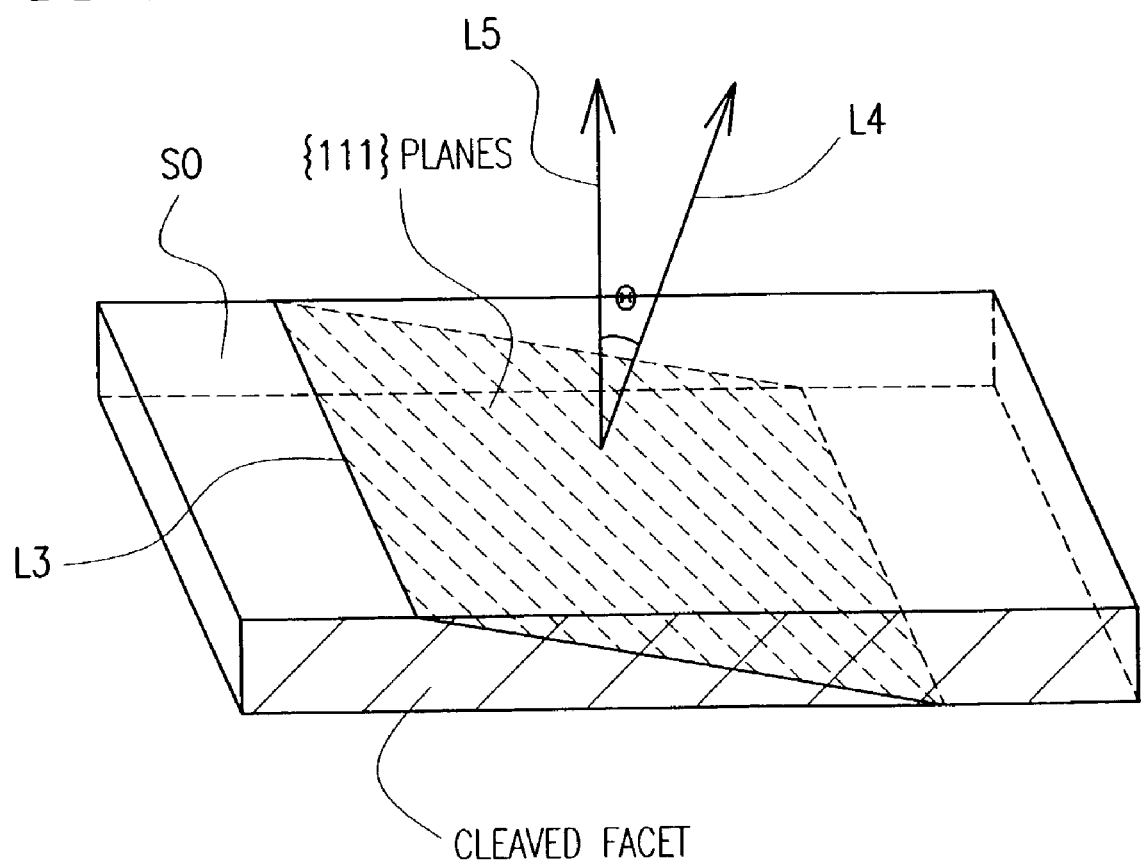
FIG. 18 is a perspective view illustrating a substrate that has a surface tilted from {111} planes.

Also, as shown in FIG. 18, when a single crystalline substrate, having a surface S0 that is tilted away from the {111} planes of crystals by an angle θ, is used, the intersection L3 between the {111} planes and the surface S0 preferably crosses a predetermined cleaved facet of the single crystalline substrate at right angles. If the substrate is made of GaAs single crystals, the predetermined cleaved facet is a (01-1) plane. In other words, a plane that includes a normal L4 to the {111} planes and a normal L5 to the substrate surface S0 is preferably parallel to the predetermined cleaved surface of the substrate. In that case, the respective planes that make up a corner cube can have their symmetry increased. For example, as shown in FIG. 17B, each corner cube may have a shape which is vertically symmetrical about a line. Also, when an array of corner cubes obtained in this manner is used as a die, the material can be removed from the die easily.

EMBODIMENT 8

As described above, the fifth preferred embodiment of the present invention relates to a reflective type liquid crystal display device 100 including a retroreflector that has been made from a micro corner cube array 10 as shown in FIG. 9. Hereinafter, a reflective type liquid crystal display device of that type will be described in further detail as an eighth specific preferred embodiment of the present invention.

Figure 40:
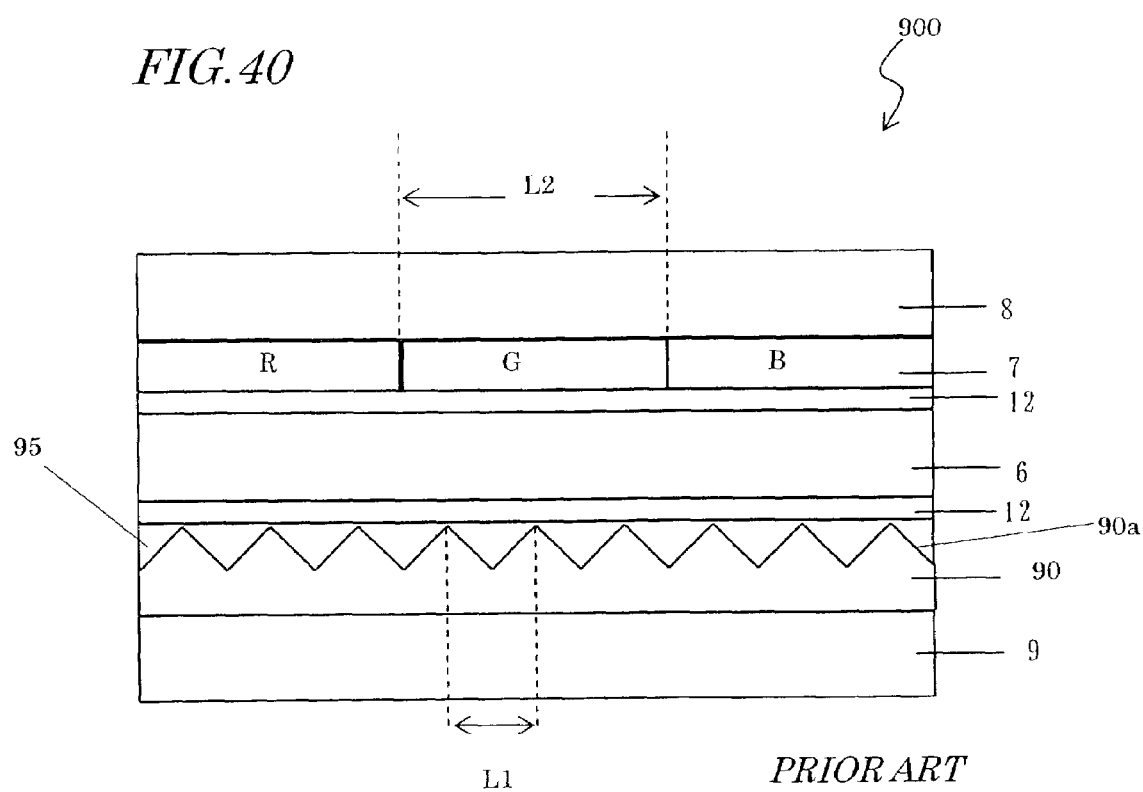
FIG. 40 is a cross-sectional view illustrating a configuration for a conventional reflective type liquid crystal display device including a micro corner cube array.

The present inventors carried out an intensive research to improve the display performance of a reflective type display device including a scattering type liquid crystal layer as a light modulating layer and a retroreflector. As a result, the present inventors discovered that if the scattering type liquid crystal layer is disposed adjacent to the reflective planes of the retroreflector, the desired black and white display modes are both realizable by utilizing the transmitting and scattering states of the scattering type liquid crystal layer, respectively. In such an arrangement, the unwanted absorption of light into the electrode 12 or the flattening member 95 as observed in the conventional reflective type liquid crystal display device 900 shown in FIG. 40 is avoidable. Thus, the incoming light can be utilized much more efficiently. Furthermore, since no flattening member 95 is provided for the reflective type display device 100 of the present invention, the process load necessary for fabricating the display device can be lightened and the fabrication cost can be reduced.

It should be noted that the light modulating layer (e.g., the scattering type liquid crystal layer in this embodiment) and the reflective planes of the retroreflector are herein regarded as being "adjacent to each other" not only when the reflective planes of the retroreflector and the light modulating layer are actually in contact with each other but also when some additional member such as an alignment film is interposed between the reflective planes of the retroreflector and the light modulating layer. In the latter case, however, the lower surface of the light modulating layer needs to be defined as a surface that is aligned with the reflective planes of the retroreflector.

Also, this arrangement is applicable for use in not just the display device using the scattering type liquid crystal layer as a light modulating layer but also in a reflective type display device of any of various other types including a light modulating layer that can switch between the transmitting and scattering states.

Figure 34:
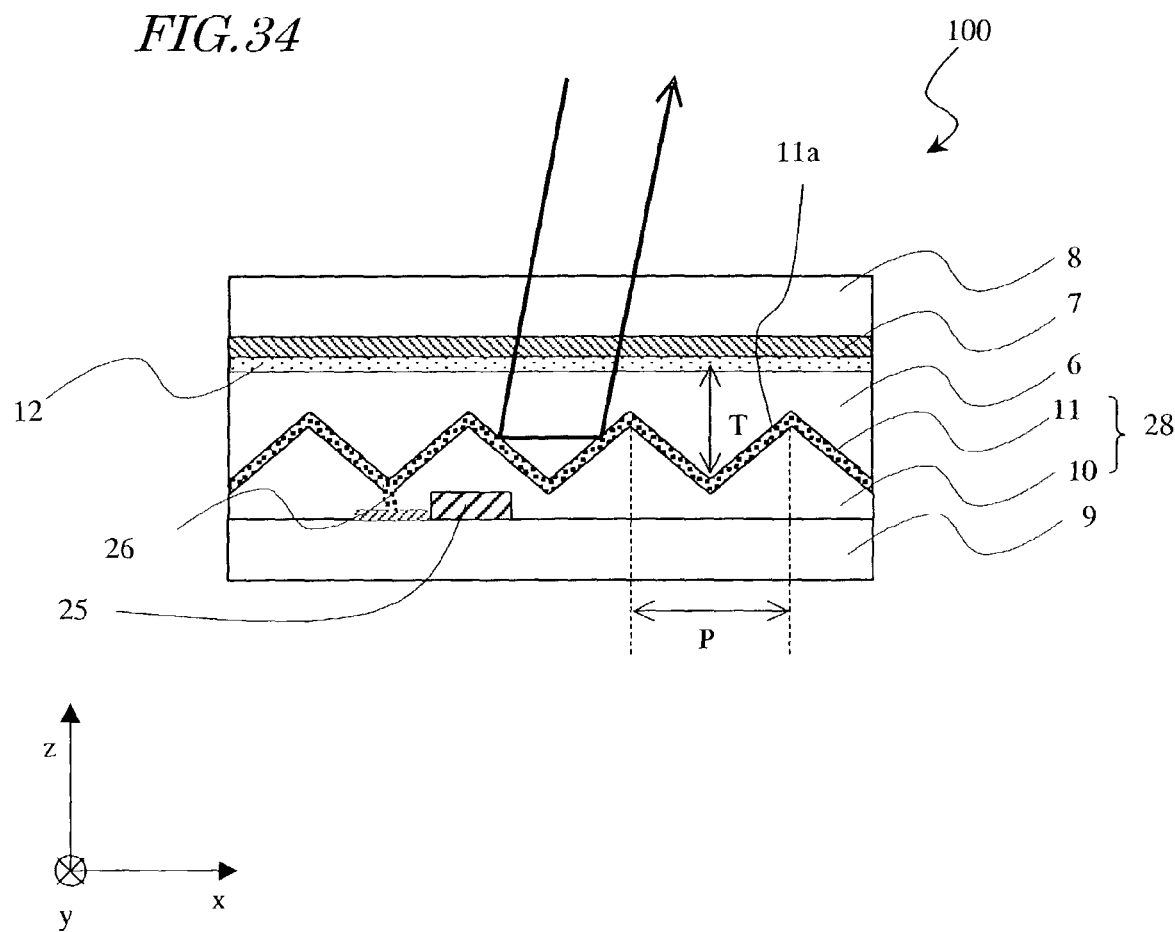
FIG. 34 is a cross-sectional view illustrating a part of the reflective type liquid crystal display device shown in FIG. 9 to a larger scale.

It should be noted, however, that when a corner cube reflector is used as the retroreflector having the reflective planes that are adjacent to the scattering type liquid crystal layer, an incoming light ray, which has been transmitted through the scattering type liquid crystal layer 6 in the transmitting state, sometimes goes a relatively long distance in the in-plane directions (i.e., x and y directions) of the liquid crystal layer 6 as shown in FIG. 34 while being reflected back to its source. In such a situation, to get the incoming light reflected back to its source just as intended, the scattering type liquid crystal layer in the transmitting state preferably scatter or reflect as small a quantity of light as possible in the in-plane (x and y) directions of the liquid crystal layer. This is because if there is any scattering factor in the optical path of the incoming light passing through the scattering type liquid crystal layer 6, then the retro-reflectivity decreases and the desired dark display is not realizable. A problem like this was not observed in the conventional reflective type liquid crystal display device 900 shown in FIG. 40.

Thus, in the reflective type display device of the present invention, the scattering type liquid crystal layer (or light modulating layer) in the transmitting state preferably exhibits good continuity in the orientation vectors of liquid crystal molecules not only in the thickness (z) direction thereof but also in the in-plane (x and y) directions thereof. In other words, according to the present invention, the liquid crystal layer preferably preserves good orientation continuity. It should be noted that if the liquid crystal molecules are oriented continuously in one of these predetermined directions, the transmittance of a light ray going in the predetermined direction with respect to the air is typically about 70% or more.

Alternatively, the scattering type liquid crystal layer in the transmitting state preferably exhibits good continuity in refractive indices with respect to not only the light going in the thickness (z) direction but also the light going in the in-plane (x and y) directions. It should be noted that if the liquid crystal layer exhibits good refractive index continuity in one of these predetermined directions, the transmittance of a light ray going in the predetermined direction with respect to the air is typically about 70% or more.

As such a scattering type liquid crystal layer, a polymer-dispersed liquid crystal layer, consisting essentially of a liquid crystal phase and a polymer phase, may be used. The polymer phase is formed by polymerizing a monomer having a liquid crystal skeleton. In the polymer-dispersed liquid crystal layer, the refractive indices of the liquid crystal and polymers phases are preferably substantially equal to (i.e., matched with) each other in any of the thickness and in-plane directions (i.e., x, y and z directions) thereof.

Alternatively, a scattering type liquid crystal layer, which creates liquid crystal domains having sizes of about 100 nm to about 20,000 nm in its scattering state and which scatters the incoming light by utilizing the difference in refractive index between the liquid crystal domains, may also be used. A scattering type liquid crystal layer like this may be a liquid crystal gel layer obtained by mixing a liquid crystal material with a gelling agent. While the scattering type liquid crystal layer is in the transmitting state on the other hand, the liquid crystal molecules thereof are aligned substantially uniformly over the entire liquid crystal layer. As used herein, the "liquid crystal domain" refers to a zone defined in the liquid crystal layer by the boundaries (or disclinations) in which the liquid crystal molecules are oriented discontinuously.

A scattering type liquid crystal layer like this is particularly effectively applicable for use in a display device in which the corner cubes are arranged at a relatively large pitch (or have a relatively great size) in the in-plane (x and y) directions of the liquid crystal layer. If the corner cubes are arranged at a relatively large pitch, then the light ray going in the in-plane (x and y) directions will have a longer optical path. In such a case, the degree of scattering of the light ray going in the in-plane (x and y) directions is changeable greatly depending on whether or not the liquid crystal molecules preserve good orientation or refractive index continuity in those directions. This dependency is especially noticeable when the optical path length of a light ray going in the in-plane (x and y) directions is greater than that of a light ray going in the thickness (z) direction. The optical path length of the light ray going in the z direction may be defined by the maximum thickness of the liquid crystal layer, for example, which may be about 1 µm to about 50 µm.

If the liquid crystal molecules can preserve good orientation or refractive index continuity in the in-plane (x and y) directions as described above, the unwanted scattering of the light can be minimized even when the corner cubes are arranged at a relatively large pitch. Thus, the retro-reflectivity can be increased, the desired dark display is realized, and an image can be displayed at a high contrast ratio.

The present inventors discovered and confirmed via experiments that to increase the retro-reflectivity, a scattering type liquid crystal layer like this is very effectively applicable for use in a display device in which the corner cubes are arranged at a pitch of about 1 µm or more. However, if the corner cubes have too large a size, then the unwanted light may much more likely reach the observer's eyes in the black display mode. For that reason, the arrangement pitch of the corner cubes is preferably about 1,000 µm or less.

Accordingly, by applying such a scattering type liquid crystal layer, in which the liquid crystal molecules preserve good orientation or refractive index continuity in the in-plane (x and y) directions, to a display device including corner cubes that are arranged at a pitch of about 1 µm to about 1,000 µm, the display device can display an image just as intended.

Hereinafter, a reflective type liquid crystal display device according to the eighth preferred embodiment of the present invention will be described in further detail.

FIG. 34 is a cross-sectional view illustrating a configuration for a part of the reflective type liquid crystal display device 100 shown in FIG. 9 to a larger scale. As shown in FIGS. 9 and 34, this liquid crystal display device 100 includes a pair of substrates 8 and 9 and a scattering type liquid crystal layer 6, which is provided as a light modulating layer between the substrates 8 and 9. The substrate 8 is located closer to the observer, while the substrate 9 is disposed so as to face the substrate 8. Both of these substrates 8 and 9 may be made of a transparent material and may be glass plates or polymer films.

On one surface of the substrate 8 that is opposed to the liquid crystal layer 6, a color filter layer 7, including R, G and B color filters, and a transparent electrode 12 are stacked in this order. On the other hand, on one surface of the substrate 9 that is opposed to the liquid crystal layer 6, a micro corner cube array 10 is provided. This micro corner cube array 10 is covered with a reflective electrode 11, which is made of a material with a high surface reflectivity (e.g., silver or aluminum) and has a substantially uniform thickness. The reflective electrode 11 may be formed so as to come into tight contact with the rugged surface of the micro corner cube array 10 by depositing silver to a thickness of about 200 nm by an evaporation process, for example. The reflective electrode 11 serves not only as reflective planes for reflecting the incoming light back to its source but also as an electrode for applying a voltage to the liquid crystal layer 6. In this reflective type liquid crystal display device 100, the micro corner cube array 10 and the reflective electrode 11 together make up a corner cube reflector 28 functioning as a retroreflector.

In this reflective type liquid crystal display device 100, the scattering type liquid crystal layer 6 is adjacent to the reflective plane 11a of the corner cube reflector 28 (i.e., the surfaces of the reflective electrode 11). It should be noted, however, that the scattering type liquid crystal layer 6 does not have to be in contact with the reflective plane 11a. Optionally, an alignment film (not shown) for providing orientation control capability for the scattering type liquid crystal layer 6 may be additionally formed on the reflective plane 11a.

The liquid crystal display device 100 having such a configuration displays an image thereon by controlling the light modulating states of the liquid crystal layer 6 on a pixel-by-pixel basis with a voltage applied from the transparent electrode 12 and reflective electrode 11 to the liquid crystal layer 6. As shown in FIG. 34, the reflective electrode 11 may be driven by a known active component 25 (such as a thin-film transistor) which is electrically connected to the reflective electrode 11 by way of a contact hole 26. Alternatively, the reflective electrode 11 may also be driven by any other driving means.

As already described for the fifth preferred embodiment, the scattering type liquid crystal layer 6 may be made of a polymer-dispersed liquid crystal material. However, the material of the liquid crystal layer 6 is not limited thereto. Examples of other preferred materials for the scattering type liquid crystal layer 6 will be described in further detail later.

Hereinafter, it will be described with reference to FIGS. 35A through 35E how the reflective type liquid crystal display device 100 may be fabricated.

Figure 35A:
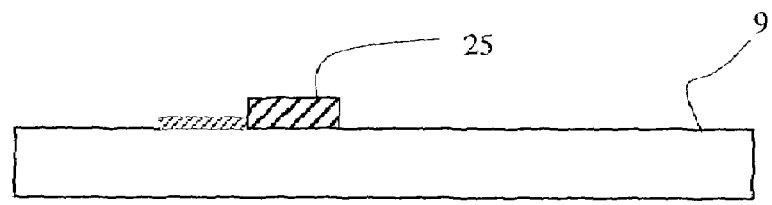
FIGS. 35A through 35E are cross-sectional views illustrating respective process steps for fabricating the reflective type liquid crystal display device shown in FIGS. 9 and 34.

First, as shown in FIG. 35A, an active component 25 and other members are formed on a substrate 9.

Figure 35B:
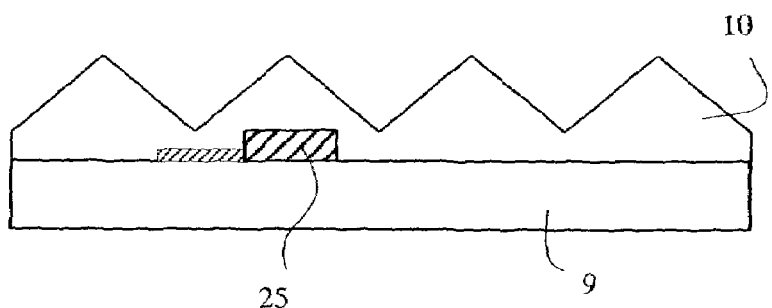

Next, as shown in FIG. 35B, a corner cube array 10 is formed over the substrate 9. The corner cube array 10 may be formed by depositing a resin film to a thickness of about 10 µm over the substrate 9 and then pressing a preformed corner cube array mold onto the resin film, for example.

Figure 39:
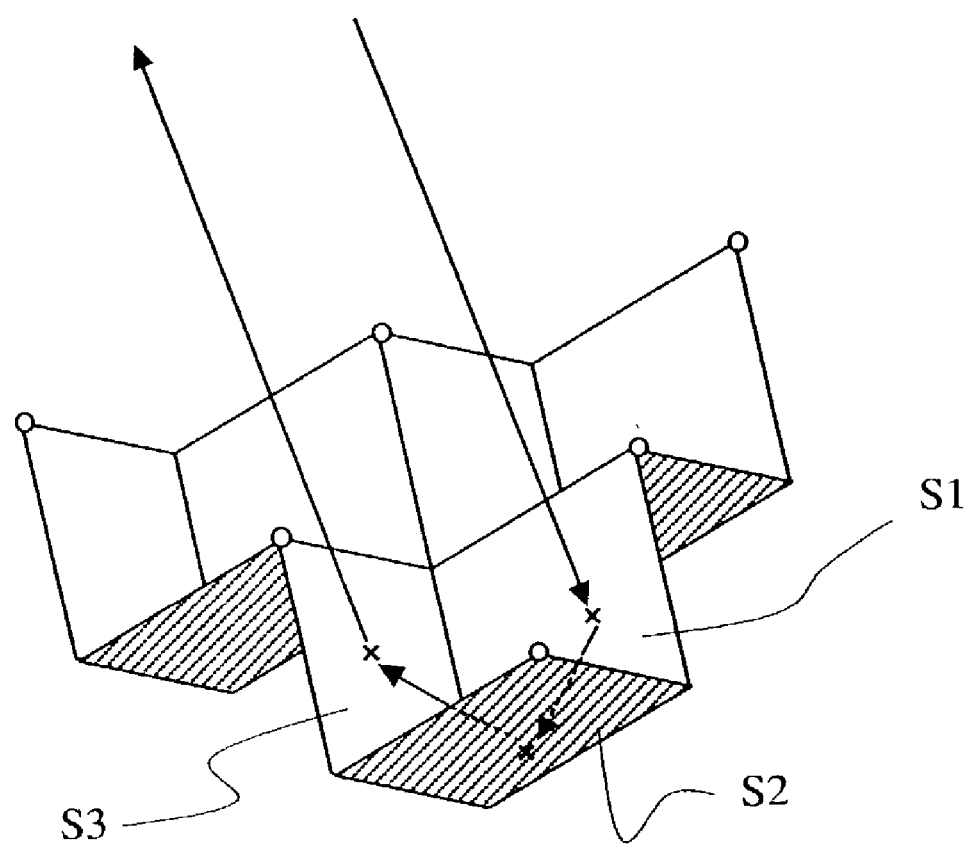
FIG. 39 is a perspective view illustrating a corner cube array for use in the reflective type liquid crystal display device of the eighth preferred embodiment.

As already described for the first through fourth preferred embodiments, if a substrate consisting of cubic single crystals is etched anisotropically by utilizing the difference in etch rate between two groups of crystal planes thereof, then an array of corner cubes, each being made up of three substantially square, substantially perpendicularly opposed planes S1, S2 and S3 as shown in FIG. 39, can be obtained. Also, if the mold is made from the corner cube array obtained in this manner and then pressed against the resin film that has been deposited over the substrate 9, then a corner cube array 10 can be made of the resin material in the same shape as that shown in FIG. 39. As can be seen from FIG. 34, the corner cube array 10 has a rugged surface. Accordingly, the thickness of the liquid crystal layer 6 is changeable from one position to another, thus possibly affecting the electro-optical properties of the liquid crystal layer 6 too much. Thus, it is not preferable that the size of the corner cubes is too large. For that reason, the arrangement pitch P of the corner cubes is preferably about 50 µm or less. In the corner cube array 10 having such a shape as that shown in FIG. 39, the level difference between the highest- and lowest-level points of the corner cube array 10 may be defined by the arrangement pitch P of the corner cubes. Accordingly, the preferable size of the corner cubes is defined in this preferred embodiment by the arrangement pitch P of the corner cubes.

Figure 35C:
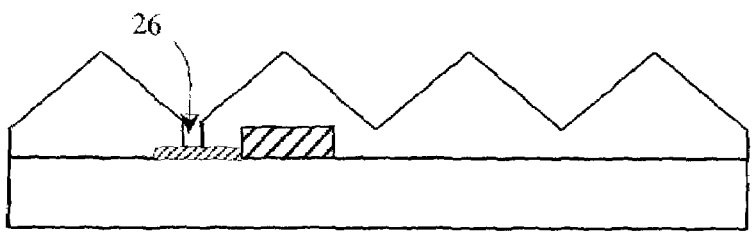

Next, as shown in FIG. 35C, the corner cube array 10 is subjected to some processing such as a plasma ashing process by using a predetermined resist mask (not shown), thereby forming contact holes 26, which will be used to establish electrical connection with the active components 25, at predetermined positions of the corner cube array 10.

Figure 35D:
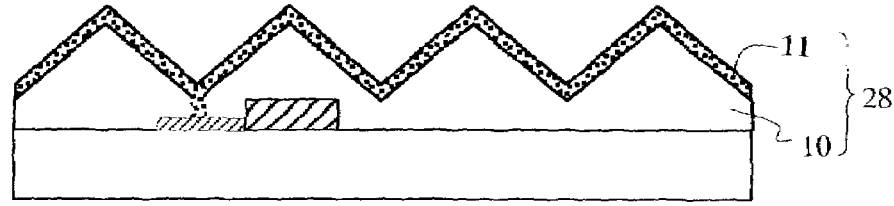

Subsequently, as shown in FIG. 35D, a conductive material such as silver is vertically deposited by an evaporation process, for example, to a thickness of about 200 nm over the surface of the corner cube array 10 so that the contact holes 26 thereof are also filled with the conductive material. Then, the conductive material deposited is patterned, thereby forming a reflective electrode 11, which is electrically connected to the active components 25 and other members, over the corner cube array 10. In this manner, a corner cube reflector 28, consisting of the corner cube array 10 and the reflective electrode 11 and functioning as a retroreflector, is obtained.

Figure 35E:
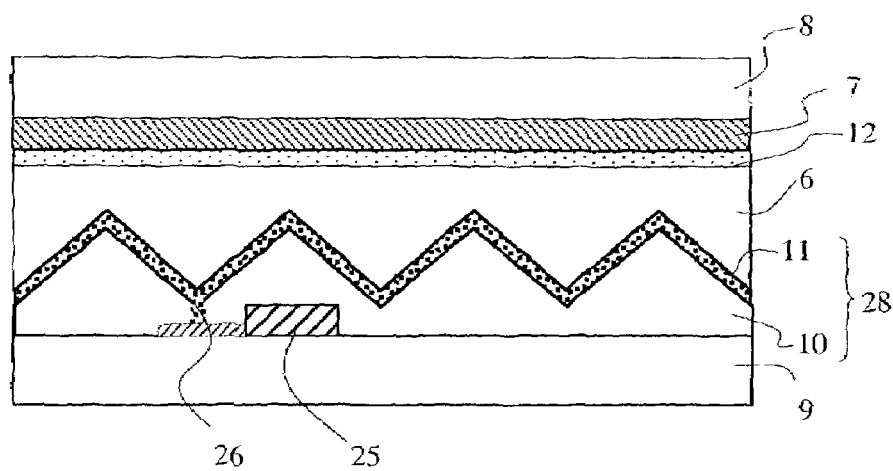

Thereafter, as shown in FIG. 35E, a color filter layer 7 and a transparent electrode 12 are formed by known techniques on a transparent substrate 8 to obtain a counter substrate. Then, the substrate 9 including the corner cube reflector 28 thereon and the counter substrate are bonded together with a predetermined gap left between them. Finally, a liquid crystal material is injected into the gap and the injection holes are sealed to form a scattering type liquid crystal layer 6. In this manner, a reflective type liquid crystal display device including a retroreflector is completed.

Hereinafter, it will be described with reference to FIG. 36 how the reflective type liquid crystal display device 100 operates. First, its white display mode operation will be described. In the white display mode, the liquid crystal layer 6 is controlled to exhibit a scattering state as shown in the right half of FIG. 36. While the liquid crystal layer 6 is in the scattering state, externally incoming light is scattered by the liquid crystal layer 6 after having been transmitted through the substrate 8, color filter layer 7 and transparent electrode 12. In this case, portion of the incoming light, which has been backscattered by the liquid crystal layer 6, returns to the observer. In addition, in the display device 100 of this preferred embodiment, another portion of the incoming light that has been transmitted straight through the liquid crystal layer 6 and still another portion of the incoming light that has been forward scattered by the liquid crystal layer 6 are also reflected by the reflective electrode 11 on the micro corner cube array 10. The reflected light is scattered again by the liquid crystal layer 6 in the scattering state while passing through the liquid crystal layer 6. As a result, a portion of the scattered light returns to the observer. In this manner, in the white display mode, not only the backscattered light but also a portion of the forward scattered light return to the observer, thus realizing a display of a highly bright image.

Next, the operation of the display device 100 in a black display mode will be described. In the black display mode, the liquid crystal layer 6 is controlled to exhibit a transmitting state by being supplied with a voltage as shown in the left half of FIG. 36. In such a situation, the externally incoming light is transmitted through the substrate 8, color filter layer 7, transparent electrode 12 and liquid crystal layer 6. The light that has been transmitted through the liquid crystal layer 6 is retro-reflected by the reflective electrode 11 on the micro corner cube array 10. That is to say, before entering the eyes of the observer who is watching an image on the display, the incoming light is refracted by the substrate 8 and liquid crystal layer 6, retro-reflected from the micro corner cube array 10 and then refracted by the liquid crystal layer 6 and substrate 8 again. Thus, only the light that has come from the vicinity of the observer's eyes goes out of this display device 100 toward the observer. In this case, if the vicinity of the observer's eyes is too narrow a region to allow any light source to be present there (i.e., if that region is smaller in area than the observer's pupil), then color black can be displayed just as intended.

As shown in FIG. 36, while the liquid crystal layer 6 is in the transmitting state (i.e., while the device 100 is in the black display mode), at least portion of the light that is passing through the liquid crystal layer 6 can go in any of the thickness (z) and in-plane (x and y) directions of the liquid crystal layer 6. Accordingly, to retro-reflect this light appropriately, the liquid crystal layer 6 in the transmitting state preferably scatters as small a fraction of the incoming light as possible in each of the x, y and z directions. Particularly when the arrangement pitch (or the size) of the corner cubes 10 is relatively large (e.g., about 1 µm or more) compared to the thickness of the liquid crystal layer 6 (e.g., about 1 µm to about 50 μm), the transparency of the liquid crystal layer 6 to the light going in the in-plane (i.e., x and y) directions thereof is a critical factor to be considered.

In this preferred embodiment, the scattering type liquid crystal layer 6 is made of a polymer-dispersed liquid crystal material as described above. In this case, the liquid crystal layer 6 includes a polymer phase not responding to an electric field applied (i.e., a matrix portion of the liquid crystal layer 6) and a liquid crystal phase made up of liquid crystal molecules responding to the applied electric field. If the polymer phase has a size large enough to scatter light (e.g., about 100 nm to about 20,000 nm), then it depends heavily on a difference in refractive index between the liquid crystal and polymer phases whether or not the light is scattered. It should be noted that the "size" of the polymer phase herein means the size of the polymer phase located between the liquid crystal phases and typically refers to a size corresponding to an average distance between the liquid crystal phases.

Accordingly, to minimize such scattering of the light due to the difference in refractive index between the liquid crystal and polymer phases, the polymer and liquid crystal phases of the liquid crystal layer in the transmitting state preferably have approximately equal refractive indices. That is to say, the refractive indices of these two phases preferably substantially match with each other. Particularly when the incoming light goes a relatively long distance not only in the thickness (z) direction but also in the in-plane (x and y) directions as in this preferred embodiment, the two types of phases of the scattering type liquid crystal layer in the transmitting state should have approximately equal refractive indices with respect to the light going in the thickness direction or to the light going in the x and y directions. If the polymer and liquid crystal phases have approximately equal refractive indices (i.e., if the refractive index does not change steeply in the interface between these two phases), then the liquid crystal layer can exhibit good refractive index continuity in each of the x, y and z directions (i.e., either in the thickness direction or in the in-plane directions). In that ideal situation, the liquid crystal layer can retro-reflect the incoming light appropriately.

Next, suppose a non-ideal situation where the two types of phases of a liquid crystal layer in the transmitting state have approximately equal refractive indices only in the thickness (z) direction and substantially different ones in the in-plane (x and y) directions. Examples of such scattering type liquid crystal layers include: a polymer-dispersed liquid crystal layer made up of a polymer phase, obtained by polymerizing a monomer with no refractive index anisotropy, and a liquid crystal phase; and a scattering type liquid crystal layer obtained by permeating a matrix of a material having an isotropic refractive index with a liquid crystal material.

When the liquid crystal layer is made of any of these materials, a network is formed by a transparent material having no refractive index anisotropy (e.g., the polymer phase) in the liquid crystal layer. Normally, an appropriate combination of materials is selected so that the refractive index $n_p$ of the transparent material is equal to the ordinary index $n_{oLC}$ of the liquid crystal material. However, the ordinary index $n_{oLC}$ of a liquid crystal material is usually smaller than the extraordinary index $n_{eLC}$ thereof (i.e., $n_{oLC} < n_{eLC}$). Accordingly, the extraordinary index of the liquid crystal material is not equal to the refractive index of the transparent material. In that case, such a scattering type liquid crystal layer exhibits a transparent state on the application of a voltage thereto. In the transparent state, the incoming light may enter the liquid crystal layer approximately vertically from over the liquid crystal layer. Since the refractive index $n_p$ of the transparent material is equal to the ordinary index $n_{oLC}$ of the liquid crystal material in the thickness (z) direction, the incoming light goes straight through the liquid crystal layer without being scattered.

Thereafter, the incoming light is reflected by a first reflective plane of the corner cube reflector and then translated horizontally inside the liquid crystal layer as shown in FIG. 36. In this case, the refractive index $n_p$ of the transparent material is not equal to the extraordinary index $n_{eLC}$ of the liquid crystal material in the in-plane (x and y) directions of the liquid crystal layer. Thus, due to the difference in refractive index, the light is scattered and cannot be retro-reflected appropriately. Consequently, the desired dark display is not realized.

In view of these considerations, while the liquid crystal layer is in the transmitting state, the difference in refractive index between the polymer phase (first phase) and the liquid crystal phase (second phase) is preferably as small as possible with respect to the light going in the thickness direction or the light going in the in-plane directions. More specifically, the difference is preferably within about 5%. In other words, the ratio of the refractive indices of these two phases is preferably about 0.95 to about 1.05. If the scattering type liquid crystal layer in the transmitting state can exhibit good refractive index continuity with respect to both the light going in the thickness direction and the light going in the in-plane directions, the unwanted scattering of the light can be minimized and an image can be displayed just as intended.

The technique of controlling the refractive indices described above is applied to a scattering type liquid crystal layer including a polymer phase that causes the incoming light to be scattered while the liquid crystal layer is in the transmitting state. However, the liquid crystal display device of this preferred embodiment may also include a scattering type liquid crystal layer which includes no scattering factors such as the polymer phase but in which the incoming light still may be scattered due to a difference in refractive index between the liquid crystal domains to be created therein as a result of a voltage control. It should be noted that even when some dispersion phases (e.g., particles) of too small a size to scatter the incoming light are present in a liquid crystal layer, that liquid crystal layer is also herein regarded as "including no scattering factors".

A scattering type liquid crystal layer of that type may exhibit the scattering state when a plurality of liquid crystal domains of a predetermined size (e.g., about 100 nm to about 20,000 nm) is formed therein on the application of a voltage thereto. On the other hand, when the liquid crystal molecules of the liquid crystal layer are oriented to form no liquid crystal domains therein, the liquid crystal layer may exhibit a transmitting state. Examples of such scattering type liquid crystal layers include: a liquid crystal gel; a micelle dispersed liquid crystal layer in which a micelle having a diameter of about 5 nm to about 100 nm has been formed and dispersed in a liquid crystal material; a liquid crystal suspension layer (or superfine particle dispersed liquid crystal layer) in which solid particles having a diameter of about 5 nm to about 100 nm are dispersed in a liquid crystal material; an amorphous nematic liquid crystal layer; and a cholesteric-nematic phase change type liquid crystal layer.

To achieve the desired transmitting state, such a scattering type liquid crystal layer in the transmitting state preferably exhibits good continuity in the orientation vectors of liquid crystal molecules not only in the thickness (z) direction thereof but also in the in-plane (x and y) directions thereof. That is to say, the liquid crystal layer should preferably preserve good orientation continuity in each of the x, y and z directions. In other words, the liquid crystal molecules are preferably aligned substantially uniformly in the entire scattering type liquid crystal layer in the transmitting state. If the liquid crystal layer in the transmitting state can also maintain good orientation continuity in the in-plane (x and y) directions, then the light going in those directions is not scattered. As a result, that light can also be retro-reflected just as intended.

It should be noted that such a scattering type liquid crystal layer may include some dispersion phases (such as the micelle described above) having a predetermined size (e.g., about 100 nm or less), which is too small to scatter the light, and may also have a plurality of liquid crystal domains formed through the misalignment of the liquid crystal molecules due to the presence of those dispersion phases. Those dispersion phases do not contribute to scattering of the incoming light. Thus, the refractive index of those dispersion phases does not have to be equal to that of the liquid crystal phase unlike the polymer phase described above.

As described above, the scattering type liquid crystal layer of the liquid crystal display device of this preferred embodiment may be made of any of various liquid crystal materials as long as the liquid crystal layer can switch between the scattering and transmitting states. In the transmitting state, the scattering type liquid crystal layer preferably exhibits good continuity in the orientation vectors of the liquid crystal molecules both in the thickness direction and in the in-plane directions that are perpendicular to the thickness direction. Alternatively, the scattering type liquid crystal layer in the transmitting state may exhibit good continuity in refractive index with respect to the light going in the thickness direction and the light going in the in-plane directions.

Hereinafter, specific examples of the reflective type liquid crystal display device of this eighth preferred embodiment will be described. In the following illustrative examples, various liquid crystal materials for the scattering type liquid crystal layer will be quoted.

EXAMPLE 1

Figure 37:
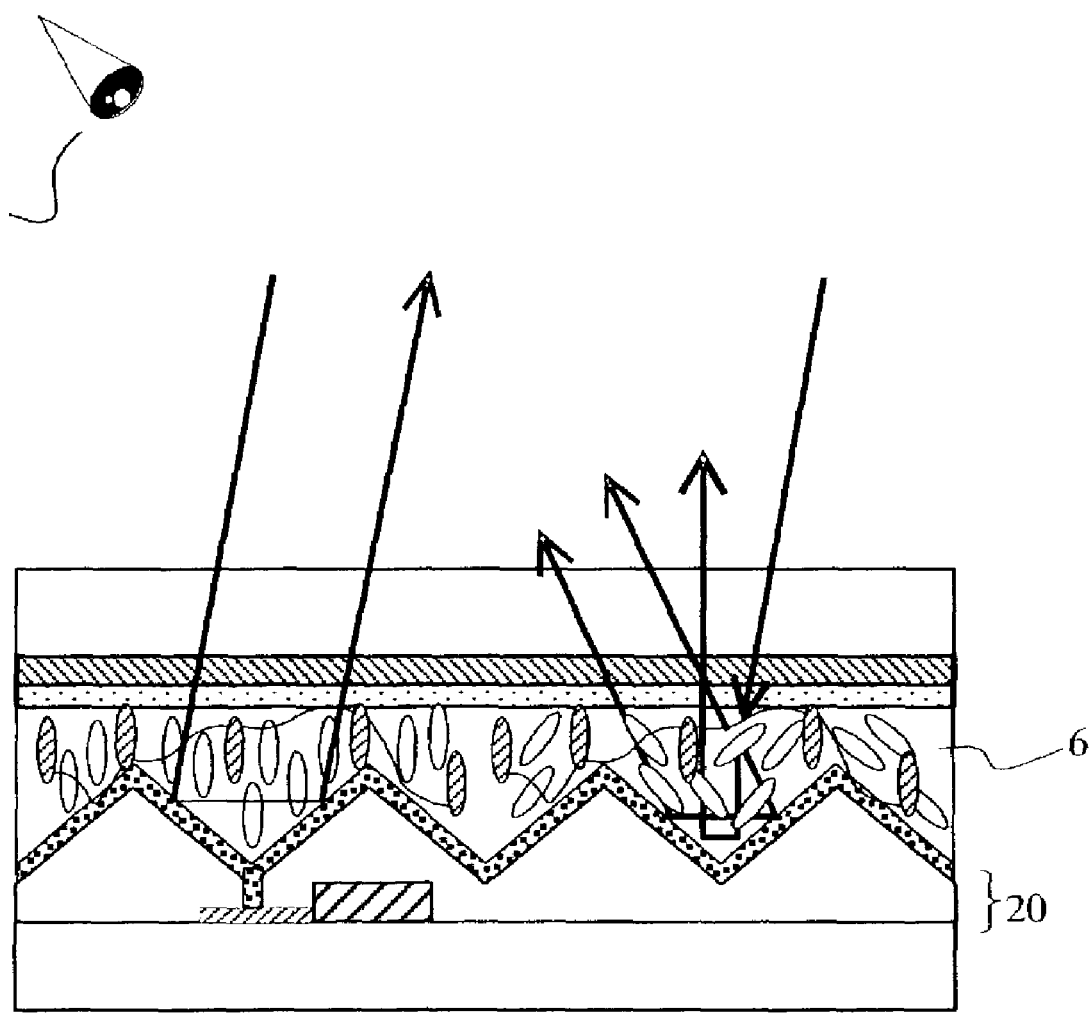
FIG. 37 is a cross-sectional view illustrating how the scattering type liquid crystal layer switches its states in a reflective type liquid crystal display device according to a first specific example of an eighth specific preferred embodiment of the present invention.

A first specific example of the reflective type liquid crystal display device of the eighth preferred embodiment will be described with reference to FIG. 37. In the first specific example, a UV-cured, polymer-dispersed liquid crystal layer is used as the scattering type liquid crystal layer.

The polymer-dispersed liquid crystal layer of the first example is obtained by preparing a mixture of a low-molecular-weight liquid crystal composition and an unpolymerized prepolymer having a liquid crystal skeleton in a miscible state, injecting the mixture into the gap between the substrates and then polymerizing the prepolymer. Any type of prepolymer may be used as long as the prepolymer has a liquid crystal skeleton and can be aligned with the liquid crystal composition. In this example, a mixture of a UV-curing prepolymer and a liquid crystal composition is photo-cured by being exposed to an active ray such as an ultraviolet ray, and the cured mixture (i.e., a UV-cured liquid crystal material) is used as the polymer-dispersed liquid crystal material. When such a UV-cured liquid crystal material is used as the polymer-dispersed liquid crystal material, the polymerizable liquid crystal material may be polymerized while maintaining its original liquid crystal orientation before the polymerization and without being heated unnecessarily.

The prepolymer-liquid crystal mixture of this specific example may be obtained by adding a small amount of polymerization initiator (produced by Ciba-Geigy Corporation, for example) to a mixture of a UV-curing material (e.g., Mix C produced by DIC Corporation) and a liquid crystal material having negative dielectric anisotropy (e.g., ZLI-4318 produced by Merck & Co., Inc.) that have been mixed at a weight ratio of about 10:90, for example.

In this specific example, a vertical alignment film that can align the liquid crystal molecules substantially vertically to the film is provided over each of the electrodes sandwiching the liquid crystal layer. Also, the liquid crystal molecules in this liquid crystal layer have negative dielectric anisotropy. Accordingly, while no voltage is being applied to the liquid crystal layer, the liquid crystal molecules existing over the reflective planes of the corner cube reflector or over the counter substrate have their orientation state controlled such that their major axes are substantially aligned with the thickness direction of the liquid crystal layer. It should be noted that when "the major axes of the liquid crystal molecules are substantially aligned with the thickness direction of the liquid crystal layer", the angle defined between the major axes of the liquid crystal molecules and the thickness direction of the liquid crystal layer is herein supposed to be less than about 45 degrees.

To display an image at a high contrast ratio, the liquid crystal layer of this liquid crystal display device should be as transparent as possible while no voltage is being applied to the liquid crystal layer. For that purpose, the UV-curing material Mix C needs to have its refractive index matched with that of the liquid crystal material. The refractive indices of these materials may be matched by adjusting the difference Δn in refractive index between these materials and/or by selecting an appropriate combination of materials. For example, before polymerized, Mix C has an extraordinary index of about 1.66 and an ordinary index of about 1.51 at room temperature. On the other hand, after having been polymerized, Mix C has an extraordinary index of about 1.64 and an ordinary index of about 1.52 at room temperature. Accordingly, the liquid crystal material to be combined with Mix C preferably has extraordinary and ordinary refractive indices falling within the ranges defined by those of Mix C before and after the polymerization. That is to say, the liquid crystal material preferably has an extraordinary index of about 1.64 to about 1.66 and an ordinary index of about 1.51 to about 1.52.

The refractive indices of these materials may also be matched with each other by controlling the refractive index of the polymer with an additive mixed with the prepolymer. By appropriately defining the type and the amount of the additive, the refractive index of the polymer may be substantially equalized with that of the liquid crystal material used. Thus, it is possible to use a liquid crystal material having an arbitrary refractive index for the liquid crystal layer while maintaining sufficient transparency.

In this specific example, a liquid crystal material having negative dielectric anisotropy is used for the liquid crystal layer and vertical alignment films are used. However, the liquid crystal material and the type of the alignment films are not limited, thereto. For example, a liquid crystal material having positive dielectric anisotropy and horizontal alignment films may also be used. Alternatively, a hybrid orientation state or a bent orientation state may also be created by selecting an appropriate combination of materials.

However, if the liquid crystal molecules are aligned horizontally, then the liquid crystal molecules of the liquid crystal layer in the transparent state have their orientation state affected or disturbed by the ruggedness of the corner cube array, thus creating disclinations and scattering the incoming light unintentionally. As a result, color black cannot be displayed as intended. The present inventors discovered and confirmed via experiments that if a liquid crystal material having negative dielectric anisotropy and vertical alignment films are used in combination, then the liquid crystal layer can exhibit good continuity in the orientation vectors of its liquid crystal molecules and can also show a high degree of transparency with no disclinations, thus displaying color black just as intended. For that reason, a liquid crystal material having negative dielectric anisotropy and vertical alignment films are used in this specific example.

Next, it will be described exactly how the reflective type liquid crystal display device, including such a polymer-dispersed liquid crystal layer as the scattering type liquid crystal layer, conducts a display operation. First, a white display mode operation thereof will be described. In the white display mode, while a voltage is being applied to the polymer-dispersed liquid crystal layer 6, the liquid crystal molecules of the liquid crystal phase have their orientation state changed in response to an electric field applied in the thickness direction of the cell (or the liquid crystal layer) while the polymer phase is polymerized and does not respond to the electric field as shown in the right half of FIG. 37. Thus, in such a state, the refractive indices of the liquid crystal and polymer phases are not equal to each other both in the thickness direction and in-plane directions of the liquid crystal layer. As a result, the liquid crystal layer 6 exhibits the scattering state. Accordingly, portion of the light that has entered the liquid crystal layer 6 is forward scattered by the liquid crystal layer 6, reflected from the retroreflector 28 and then scattered again by the liquid crystal layer 6 in the scattering state. Consequently, not only the backscattered light but also a lot of other light return to the observer.

That is to say, the reflective type liquid crystal display device of this specific example utilizes not only the inefficient backscattered light but also the forward scattered light that has passed through the liquid crystal layer 6, thereby displaying a bright image. In this specific example, no flattening member or transparent electrode is present on the substrate 9. Thus, no light is absorbed into any of these members in vain and a very bright image can be displayed.

Next, a black display mode operation thereof will be described. In the black display mode, while no voltage is being applied to the liquid crystal layer 6, the liquid crystal molecules and the polymer phase, which retains the orientation of the liquid crystal molecules, have their refractive indices substantially matched with each other in each of the x, y and z directions. Accordingly, the light that has entered the liquid crystal layer 6 is not scattered no matter which direction the light has taken, and is retro-reflected appropriately. Consequently, color black can be displayed just as intended.

EXAMPLE 2

Figure 38:
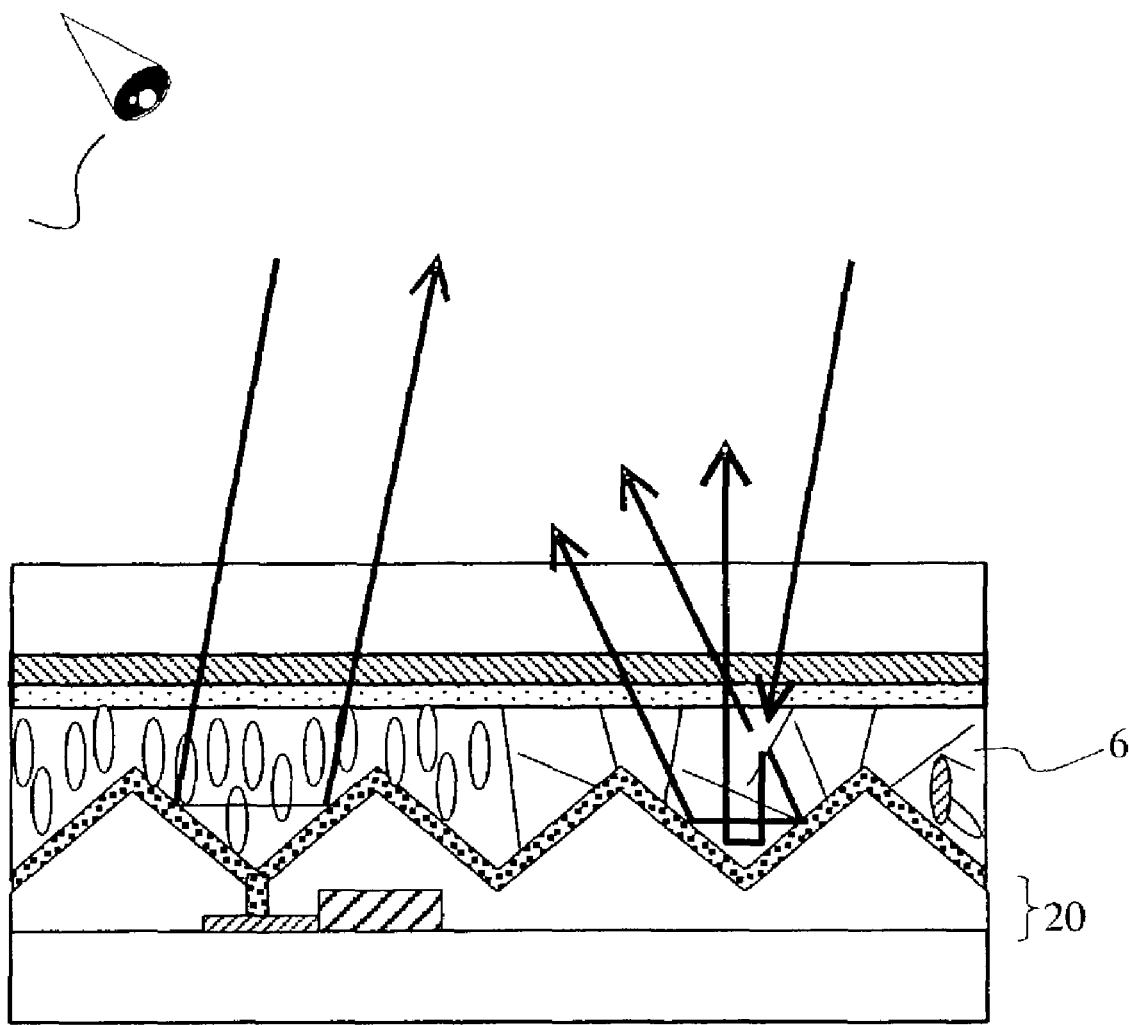
FIG. 38 is a cross-sectional view illustrating how the scattering type liquid crystal layer switches its states in a reflective type liquid crystal display device according to second through sixth specific examples of the eighth preferred embodiment.

Next, a second specific example of the reflective type liquid crystal display device, including a liquid crystal gel layer as the scattering type liquid crystal layer, will be described with reference to FIG. 38.

In this specific example, a liquid crystal gel layer is obtained by adding a hydrogen-bonding low-molecular-weight gelling agent, represented by the following chemical formula (1), to a nematic liquid crystal material:

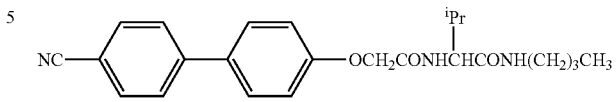

More specifically, a liquid crystal gel layer in the scattering state is obtained by adding about 0.5 mol/L of the gelling agent to a nematic liquid crystal material (e.g., TL-204 produced by Merck Ltd).

This gelling agent forms a random hydrogen-bonding network in the liquid crystal solvent, thus accelerating the creation of liquid crystal domains and causing the liquid crystal layer to exhibit a scattering state while no voltage is being applied thereto. It should be noted that the liquid crystal domains to be created may have a size of about 100 nm to about 20,000 nm and can scatter the incoming light. Also, in response to an electric field applied, the liquid crystal molecules of this liquid crystal gel layer are substantially aligned and the liquid crystal gel layer goes transparent. In this case, the liquid crystal gel layer exhibits good continuity in the orientation vectors of its liquid crystal molecules both in the thickness direction and in the in-plane directions thereof. Accordingly, the incoming light can be appropriately retro-reflected from this liquid crystal gel layer.

When an image was displayed by a reflective type liquid crystal display device including such a liquid crystal gel layer, the image displayed showed an excellent viewing angle characteristic. This is because in a liquid crystal gel layer in the transparent state, the refractive indices can be matched more perfectly than in a polymer-dispersed liquid crystal layer.

EXAMPLE 3

Next, a third specific example of the reflective type liquid crystal display device, including a liquid crystal emulsion layer as the scattering type liquid crystal layer that exhibits the scattering state when liquid crystal domains are created, will be described with reference to FIG. 38.

The liquid crystal emulsion layer of the third specific example is obtained by mixing a liquid crystal material with a liquid, which is not miscible with the liquid crystal material, and molecules behaving as a surfactant. In that case, emulsification occurs in the mixture, thereby forming a micro-emulsion, in which a liquid phase is dispersed in the liquid crystal material, as a dispersion phase.

By precisely controlling the droplet diameter of this micro-emulsion, the micro-emulsion can be used as a scattering medium that responds to an electric field created. Thus, an inverted micelle W/LC is formed by adding about 5 wt % of an aqueous solution of a didodecyl ammonium salt to a liquid crystal material (e.g., TL-204 produced by Merck & Co., Inc.) and used as a micro-emulsion in the scattering state for the reflective type liquid crystal display device.

The micelle colloid to be formed preferably has a size of about 100 nm or less so as not to constitute a scattering factor by itself when an electric field is applied thereto. However, if its size is too small, then the micelle colloid will have no influence on the orientation state of the liquid crystal molecules. For that reason, the micelle colloid preferably has a size of at least about 5 nm. By controlling the concentration and the size of the micelle colloid, the liquid crystal emulsion layer in the transparent state can increase its transparency and an image can be displayed at an increased contrast ratio.

In this specific example, the droplets dispersed in the emulsion (i.e., the dispersion phases) preferably have a size of about 5 nm to about 100 nm. The reason is as follows. First, the upper limit of about 100 nm is defined because while the liquid crystal emulsion layer is in the transparent state, the droplets should have a size sufficiently smaller than the wavelength of the incoming light (i.e., about 300 nm to about 800 nm) so as not to scatter the incoming light. On the other hand, the lower limit of about 5 nm is defined because of the following reason. Specifically, to have a significant effect on the orientation state of the liquid crystal molecules and realize the desired random orientation and scattering state, the dispersed particles should be sufficiently greater than the liquid crystal molecules having approximate dimensions of 2 nm by 0.5 nm. Thus, a minimum required size for controlling the orientation state of the liquid crystal molecules is herein defined at about 5 nm.

EXAMPLE 4

Next, a fourth specific example of the reflective type liquid crystal display device, including a micelle dispersed liquid crystal colloid layer as the scattering type liquid crystal layer, will be described.

The micro-emulsion of the third specific example described above is not particularly limited to a mixture of water and a liquid crystal material. In order to increase the reliability of the liquid crystal mixture, a mixture of fluorocarbon and a liquid crystal material is rather preferred. Thus, as another exemplary micro-emulsion, a scattering medium in which a micelle of fluorocarbon is dispersed in a liquid crystal material is made by mixing the liquid crystal material with an organic compound containing a small amount of perfluoro base as represented by the following chemical formula (2):

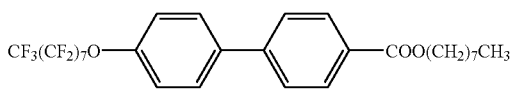

As in the third specific example, the micelle colloid to be formed in this specific example also preferably has a size of about 100 nm or less so as not to constitute a scattering factor when an electric field is applied thereto. However, if its size is too small, the micelle colloid will have no influence on the orientation state of the liquid crystal molecules. Accordingly, the micelle colloid preferably has a size of at least about 5 nm. When the scattering type liquid crystal layer of this specific example was used, the liquid crystal layer exhibited increased charge retention ability and the liquid crystal display device can be driven by active components just as intended.

EXAMPLE 5

Next, a fifth specific example of the reflective type liquid crystal display device, including a liquid crystal suspension layer as the scattering type liquid crystal layer, will be described.

The liquid crystal suspension layer of this specific example can be obtained by dispersing, as a colloid, fine particles of titanium oxide, which have been subjected to a surface treatment with butanol, stearic acid or other suitable substance, in a liquid crystal material. The surface treatment is conducted to align the liquid crystal molecules vertically to the surface of the titanium oxide fine particles. Those fine particles accelerate the creation of liquid crystal domains. Once those liquid crystal domains have been created, the liquid crystal suspension layer exhibits a scattering state. More specifically, fine particles of titanium oxide having an average diameter of about 50 nm, of which the surface had been treated with butanol, were uniformly dispersed at a concentration of about 5 wt % in a liquid crystal material (e.g., TL-204 produced by Merck & Co., Inc.), thereby obtaining a liquid crystal suspension layer.

To disperse those fine particles even more stably, a polymer material was added to the mixture. Because of the same reason as that already described for the third specific example, the superfine particles preferably have a size of about 5 nm to about 100 nm in this specific example also. However, by selecting an appropriate combination of type and size for the additive superfine particles, the liquid crystal layer in the transmitting state showed increased transparency and the liquid crystal display device realized a highly reliable display.

EXAMPLE 6

Next, a sixth specific example of the reflective type liquid crystal display device, including an amorphous nematic liquid crystal layer as the scattering type liquid crystal layer, will be described.

In the specific examples described above, an impurity that controls the orientation state of liquid crystal molecules is mixed with a liquid crystal material to randomize the orientation of the liquid crystal molecules. However, if the alignment film used is not subjected to any alignment treatment such as a rubbing treatment or if the liquid crystal molecules are in a cholesteric orientation state in which it is difficult to preserve good continuity in the orientation vectors of the liquid crystal molecules, no impurity needs to be mixed with the liquid crystal material on purpose. This is because in such a situation, liquid crystal domains can be created and a scattering state is realized without adding any impurity thereto.

In this specific example, no alignment films were provided for the pair of substrates that sandwiched the liquid crystal layer, and a display operation was conducted by using a nematic liquid crystal material (e.g., TL-204 produced by Merck & Co., Inc.) exhibiting positive dielectric anisotropy. As a result, an image could be displayed at a high contrast ratio, the liquid crystal layer showed increased charge retention ability and the liquid crystal display device could be driven just as intended by active components. In this specific example, a material exhibiting positive dielectric anisotropy was used for the liquid crystal layer. Alternatively, a liquid crystal material having negative dielectric anisotropy may also be used instead.

EXAMPLE 7

Next, a seventh specific example of the reflective type liquid crystal display device, including a cholestericnematic phase change type liquid crystal layer as the scattering type liquid crystal layer, will be described.

It is known that a cholesteric liquid crystal material, having a pitch approximately equal to an infrared wavelength, exhibits a planar orientation state and a transmitting state when no electric field is applied thereto but exhibits a focal conic orientation state, in which their screw axes are randomly oriented from one domain to another, and a scattering state when an electric field is applied thereto. This scattering medium can be produced without using any alignment film, which is advantageous for cost reduction. In addition, since its scattering state is memorized, a device that uses this medium can be driven at lower power dissipation. Thus, in this specific example, an appropriate chiral agent (e.g., S1011 produced by Merck & Co., Inc.) was mixed with a liquid crystal material (e.g., TL-204 produced by Merck & Co., Inc.) so that the liquid crystal molecules had a chiral pitch of about 1.0 μm, thereby forming a cholesteric-nematic phase change type liquid crystal layer. Even when the cholestericnematic phase change type liquid crystal layer obtained in this manner was used, an image could also be displayed at a high contrast ratio.

As described above, if the scattering type liquid crystal layer as a light modulating layer is made of an appropriate material, then the unwanted scattering of the incoming light can be minimized both in the thickness direction of the liquid crystal layer and in the in-plane directions thereof while the liquid crystal layer is in the transmitting state. As a result, color black can be displayed just as intended and an image can be displayed at a high contrast ratio. It should be noted that as long as the liquid crystal layer 6 can switch between the scattering and transmitting states, the liquid crystal layer 6 does not have to be the scattering type liquid crystal layer but may be any other type of light modulating layer. Specifically, examples of other usable liquid crystal layers include: a cholesteric liquid crystal layer, which can switch between transmitting and reflecting states and to which diffusion properties are imparted by controlling the sizes of liquid crystal domains; a polymer-dispersed liquid crystal layer with a holographic function, which switches between transmitting and reflecting states and to which diffusion properties are imparted by being exposed to diffusing radiation; and a polymer-dispersed liquid crystal layer, which switches between absorbing and scattering modes (e.g., a polymer-dispersed liquid crystal layer to which a dye has been added).

A corner cube array for the reflective type liquid crystal display device described above may be made by using a single crystalline substrate consisting of cubic crystals (i.e., cubic single crystalline substrate). The cubic single crystalline substrate may be made of a compound semiconductor having a sphalerite structure or a material having a diamond structure. More specifically, a cubic single crystalline substrate, having its surface disposed substantially parallelly to {111} planes of the crystals, is prepared and has that surface patterned by being subjected to an anisotropic etching process.

In this method, the surface of the substrate is patterned by an anisotropic etching process so that the etch rate of one crystal plane is different from that of another. For example, if the substrate is made up of GaAs crystals having a sphalerite structure, the etch rate of the {111}B planes of the crystals (i.e., the {111} planes of arsenic) is relatively high, while the etch rate of the {100} planes (i.e., crystal planes including (100), (010) and (001) planes) thereof is relatively low. Accordingly, the etching process advances anisotropically in such a manner as to leave the {100} planes of the crystals. As a result, concavo-convex portions are defined on the surface of the substrate by multiple unit elements, each being made up of the {100} planes of the crystals. Each of those unit elements that have been formed in this manner has three perpendicularly opposed planes (e.g., (100), (010) and (001) planes), thus forming a corner cube.

In a corner cube array formed by such a method, the three reflective planes of each corner cube are matched with the {100} crystallographic planes of a cubic crystal and exhibit very high shape precision. Also, the three reflective planes that make up each corner cube have good planarity, and each corner or edge, at which two or three of them intersect with each other, has sufficient sharpness. Furthermore, the corner cube array has a stereoscopic shape in which multiple corner cubes are arranged in a regularly pattern. In this array, the respective vertices of the corner cubes are located at substantially the same level (or within substantially the same plane). Thus, a corner cube array like this can be used effectively as a retroreflector for reflecting an incoming light ray back to its source.

Also, the size of each unit element (i.e., each corner cube) of the array formed by the method of the present invention may be several tens μm or less by controlling the feature size of a photoresist pattern (or mask) used in the etching process. Accordingly, a corner cube array of a very small size, which is suitably applicable for use as a retroreflector for a liquid crystal display device, for example, can be obtained.

In a micro corner cube array obtained in this manner, each unit element thereof has three substantially square planes that are defined by {100} planes of cubic single crystals, and can reflect an incoming light ray back to its source. Accordingly, in a black display mode, a liquid crystal display device, including such a micro corner cube array as a corner cube reflector, realizes desired dark display without reflecting unwanted light back to the observer. As a result, the contrast ratio also increases.

According to the present invention, a micro corner cube array is made by anisotropically etching the {111} planes of a cubic single crystalline substrate and forming a plurality of unit elements each being made up of crystallographic planes that have been etched at a relatively low etch rate (e.g., {100} planes). Thus, a micro corner cube array, consisting of very small unit elements of a size (e.g., about several tens μm) smaller than that of a picture element region of the display device and yet showing very high shape precision, can be made through relatively simple process steps.

A display device including such a micro corner cube array can display color black just as intended without using any polarizer, and can display a bright image at a high contrast ratio, a high color purity and highly visibility.

Also, in a reflective type display device according to the present invention, which includes a retroreflector and a light modulating layer that can switch between scattering and transmitting states, the light modulating layer is disposed adjacently to the reflective planes of the retroreflector. Thus, the reflective type display device can display color white at a high lightness and at a high contrast ratio.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method of making a micro corner cube array, the method comprising:

preparing a substrate, at least a surface portion of which consists of cubic single crystals and which has a surface that is substantially parallel to {111} planes of the crystals; and etching the surface of the substrate anisotropically, thereby forming a plurality of unit elements for the micro corner cube array on the surface of the substrate, each said unit element being made up of a number of crystal planes that have been formed at a lower etch rate than the {111} planes of the crystals, wherein the unit element comprises three substantially square planes that are oriented substantially perpendicularly to each other.

2. The method of claim 1, wherein the etching step comprises the step of forming {100} planes of the crystals at the lower etch rate than the {111} planes thereof.

3. The method of claim 2, wherein the etching step comprises the step of forming the unit elements so that each said unit element is made up of three {100} planes that are opposed substantially perpendicularly to each other.

4. The method of claim 3, wherein at least the surface portion of the substrate prepared in the preparing step is made of a compound semiconductor having a sphalerite structure.

5. The method of claim 4, wherein the compound semiconductor is gallium arsenide and the substrate has a surface that is substantially parallel to {111}B planes formed by arsenic atoms.

6. The method of claim 3, wherein at least the surface portion of the substrate prepared in the preparing step is made of a material having a diamond structure.

7. The method of claim 6, wherein at least the surface portion of the substrate consists of germanium single crystals.

8. The method of claim 1, wherein the etching step comprises the step of etching the surface of the substrate anisotropically so that a ratio of the etch rate of the {111} planes to the lower etch rate of the crystal planes is greater than 1.73.

9. The method of claim 1, further comprising, between the preparing and etching, covering the surface of the substrate with an etching mask layer, the etching mask layer including at least one masking element and at least one opening that have been arranged to form a predetermined pattern.

10. The method of claim 9, wherein the etching step comprises the step of forming the unit elements for the micro corner cube array so that the size of each said unit element is controlled in accordance with the pattern of the etching mask layer defined in the covering step.

11. The method of claim 9, wherein the covering step comprises the step of defining the etching mask layer that includes a plurality of masking elements, each said masking element having a median point that is substantially located at a honeycomb lattice point.

12. The method of claim 11, wherein the masking elements are spaced apart from each other.

13. The method of claim 9, wherein the masking element has a planar shape defined by at least three sides that are respectively parallel to (100), (010) and (001) planes of the crystals.

14. The method of claim 13, wherein the masking element has a triangular planar shape defined by the three sides.

15. The method of claim 9, wherein the masking element has a planar shape defined by at least three sides that are respectively parallel to (11-1), (1-11) and (-111) planes of the crystals.

16. The method of claim 15, wherein the masking element has a triangular planar shape defined by the three sides.

17. The method of claim 9, wherein the masking element has a planar shape that is symmetrical about a three-fold rotation axis.

18. The method of claim 17, wherein the masking element has a hexagonal, nonagonal or dodecagonal planar shape.

19. The method of claim 9, wherein the etching mask layer includes a plurality of openings, each said opening having a median point that is substantially located at a honeycomb lattice point.

20. The method of claim 9, wherein the at least one masking element accounts for more than 50% of the total area of the etching mask layer.

21. The method of claim 9, wherein the etching step comprises the step of stopping etching the surface of the substrate when a contact area between the surface of the substrate and the masking element is substantially minimized.

22. The method of claim 1, wherein the etching step comprises the step of subjecting the surface of the substrate to a wet etching process.

23. The method of claim 22, wherein the etching step further comprises the step of subjecting the surface of the substrate to a dry etching process at least once.

24. The method of claim 1, further comprising the step of transferring the shape of the unit elements, which have been formed on the surface of the substrate, to a resin material.

25. The method of claim 1, wherein the surface of the substrate prepared in the step defines an angle of greater than 0 degrees and equal to or smaller than 10 degrees with the {111} planes of the crystals.

26. The method of claim 25, wherein an intersection between the surface of the substrate and the {111} planes of the crystals is substantially perpendicular to a cleaved facet of the substrate.

27. A method of making an array of micro corner cubes, each said corner cube being defined by predetermined crystal planes of a crystal having a prescribed structure, the method comprising:

preparing a substrate, at least a surface portion of which consists of the crystals having the prescribed structure; and etching the substrate anisotropically in a manner so that the predetermined crystal planes are etched at a lower rate than {111} planes of the crystal, thereby exposing the predetermined crystal planes intentionally.

28. A method of making a micro corner cube array, the method comprising:

preparing a substrate, at least a surface portion of which comprises cubic single crystals and which has a surface that is substantially parallel to {111} planes of the crystals; and etching the surface of the substrate at least anisotropically, thereby forming a plurality of unit elements for the micro corner cube array on the surface of the substrate, each said unit element comprising a number of crystal planes that have been formed at a lower etch rate than the {111} planes of the crystals, wherein the unit element comprises three substantially square planes that are oriented substantially perpendicularly to each other.

29. The method of claim 28, wherein said etching comprises forming {100} planes of the crystals at the lower etch rate than the {111} planes thereof.

30. The method of claim 28, wherein said etching comprises forming the unit elements so that each said unit element is made up of three {100} planes that are opposed substantially perpendicularly to each other.

31. The method of claim 28, further comprising using the micro corner cube array in a display apparatus.

32. A method of making an array of micro corner cubes, each said corner cube comprising substantially square crystal planes of a crystal having a prescribed structure, the method comprising:

preparing a substrate, at least a surface portion of which comprises the crystals having the prescribed structure; and etching the substrate in a manner so that said crystal planes are etched at a lower rate than {111} planes of the crystal, thereby exposing the substantially square crystal planes.

* * * * *